(12) United States Patent
Chang

(10) Patent No.: US 7,865,359 B2
(45) Date of Patent: Jan. 4, 2011

(54) WAVEFORM MODULATED WIRELESS RURAL AREA NETWORK (WRAN) SYSTEMS AND MODULATION AND MULTIPLE ACCESS TECHNIQUES FOR WIRELESS COMMUNICATION SYSTEMS

(75) Inventor: Soo-Young Chang, Davis, CA (US)

(73) Assignee: FutureWei Technologies, Inc., Plano, TX (US)

( * ) Notice: Subject to any disclaimer, the term of this patent is extended or adjusted under 35 U.S.C. 154(b) by 981 days.

(21) Appl. No.: 11/680,609

(22) Filed: Feb. 28, 2007

(65) Prior Publication Data

US 2008/0207119 A1 Aug. 28, 2008

Related U.S. Application Data

(60) Provisional application No. 60/864,452, filed on Nov. 6, 2006.

(51) Int. Cl.
*G06F 15/00* (2006.01)
*H04K 1/10* (2006.01)
(52) U.S. Cl. ....................... 704/200; 375/260
(58) Field of Classification Search ............... 704/200; 375/260
See application file for complete search history.

(56) References Cited

U.S. PATENT DOCUMENTS 6,999,446 B2 * 2/2006 Hall et al. .................. 370/349

7,190,683 B2 * 3/2007 Giallorenzi et al. ......... 370/335
2005/0249266 A1 11/2005 Brown et al.

FOREIGN PATENT DOCUMENTS

EP 1606915 A0 12/2005

OTHER PUBLICATIONS

PCT International Search Report and PCT Written Opinion of the International Searching Authority for PCT/CN2007/071025, forms PCT/ISA/220, PCT/ISA/210 and PCT/ISA/237, mailed Nov. 6, 2006, Applicant: Huawei Technologies Co., Ltd., et al., 6 pages.

* cited by examiner

*Primary Examiner*—Richemond Dorvil
*Assistant Examiner*—Justin W Rider
(74) *Attorney, Agent, or Firm*—Slater & Matsil, L.L.P.

(57) ABSTRACT

A method and system for transmitting data in a wireless network. The method includes generating a plurality of waveforms corresponding to a plurality of frequency subbands for a predetermined frequency band. The predetermined frequency band is divided into a plurality of groups of subbands, and the plurality of groups of subbands being divided into the plurality of frequency subbands. Additionally, the method includes receiving a data signal, processing information associated with the received data signal, modulating the plurality of waveforms based on at least information associated with the received data signal, and transmitting the modulated plurality of waveforms. Any two of the plurality of waveforms are substantially orthogonal to each other. Each of the plurality of waveforms corresponds to a waveform frequency spectrum associated with a spectral amplitude as a function of a frequency.

25 Claims, 49 Drawing Sheets

| mod | Waveform mod | Bits sent per symbol duration | No of simulta neous users | Spectrum usage | One symbol duration (ns) | Data rate (Mbps) |
|---|---|---|---|---|---|---|
| Mod (1) | OOK | 8 | 16 | full | 500 | 16 |
| Mod (2) | BPSK | 8 | 16 | full | 500 | 16 |
| Mod (3) | OOK | 4 | 4 | quarter | 500 | 8 |
| Mod (4) | BPSK | 4 | 4 | quarter | 500 | 8 |
| Mod (5) | OOK | 16 | 1 | full | 500 | 32 |
| Mod (6) | BPSK | 16 | 1 | full | 500 | 32 |
| Mod (7) | OOK+BPSK | 16 | 4 | full | 500 | 32 |
| Mod (8) | OOK+BPSK | 6 | 4 | quarter | 500 | 12 |
| Mod (9) | OOK+BPSK | 24 | 1 | full | 500 | 48 |
| Mod (10) | BPSK | 6 | 1 | full | 500 | 12 |

WM
 OFDM

| correlation / correlation ratio | wi1 | wi2 | wi3 | wi4 |
|---|---|---|---|---|
| wi1 | 0.020984 <br> 1/1 | 0.0012155 <br> 17.264/9.7396 | $2.2562 \times 10^{-5}$ <br> 930.05/3957.3 | $3.4173 \times 10^{-6}$ <br> 6140.6/9681.8 |
| wi2 | 0.0012155 <br> 17.264/9.7396 | 0.020984 <br> 1/1 | $6.8651 \times 10^{-6}$ <br> 305.66/106.69 | $2.2562 \times 10^{-5}$ <br> 930.05/3957.3 |
| wi3 | $2.2562 \times 10^{-5}$ <br> 930.05/3957.3 | $6.8651 \times 10^{-6}$ <br> 305.66/106.69 | 0.020984 <br> 1/1 | 0.0012155 <br> 17.264/9.7396 |
| wi4 | $3.4173 \times 10^{-6}$ <br> 6140.6/9681.8 | $2.2562 \times 10^{-5}$ <br> 930.05/3957.3 | 0.0012155 <br> 17.264/9.7396 | 0.020984 <br> 1/1 |

FIG. 19

| Modulation | No. of levels | Complexity | Data rate | Detection method |
|---|---|---|---|---|
| OOK | 2 (+1, 0) | lowest | low | Non-coherent/coherent |
| Anti-podal BPSK | 2 (+1, -1) | low | low | Coherent/differential |
| QPSK | 4 | moderate | moderate | Coherent/differential |
| n level mod | n | high | high | Coherent/differential |
| nQAM | n | high | high | Coherent/differential |

FIG. 20

| mod | Waveform mod | Bits sent per symbol duration | No of simultaneous users | Spectrum usage | One symbol duration (ns) | Data rate (Mbps) |
|---|---|---|---|---|---|---|
| Mod (1) | OOK | 8 | 16 | full | 500 | 16 |
| Mod (2) | BPSK | 8 | 16 | full | 500 | 16 |
| Mod (3) | OOK | 4 | 4 | quarter | 500 | 8 |
| Mod (4) | BPSK | 4 | 4 | quarter | 500 | 8 |
| Mod (5) | OOK | 16 | 1 | full | 500 | 32 |
| Mod (6) | BPSK | 16 | 1 | full | 500 | 32 |
| Mod (7) | OOK+BPSK | 16 | 4 | full | 500 | 32 |
| Mod (8) | OOK+BPSK | 6 | 4 | quarter | 500 | 12 |
| Mod (9) | OOK+BPSK | 24 | 1 | full | 500 | 48 |
| Mod (10) | BPSK | 6 | 1 | full | 500 | 12 |

FIG. 30

WAVEFORM MODULATED WIRELESS RURAL AREA NETWORK (WRAN) SYSTEMS AND MODULATION AND MULTIPLE ACCESS TECHNIQUES FOR WIRELESS COMMUNICATION SYSTEMS

CROSS-REFERENCES TO RELATED APPLICATIONS

This application claims priority to U.S. Provisional Application No. 60/864,452, filed Nov. 6, 2006, which is incorporated by reference herein.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates in general to telecommunication techniques. More particularly, the invention provides a waveform modulated method and system. Merely by way of example, the invention is described as it applies to a wireless rural area network (WRAN), but it should be recognized that the invention has a broader range of applicability.

The frequency bands for TV channels can be used for unlicensed users so long as such usage does not interfere with the incumbent users. For example, these bands may be used for providing wireless high speed internet connections to the rural areas. Systems that can provide such connections often are called wireless rural area network (WRAN) systems.

Transceivers of the WRAN systems may use certain conventional technology, such as orthogonal frequency division multiplexing/orthogonal frequency division multiple access (OFDM/OFDMA) technology. But with this conventional technology, the entire frequency band often is not fully utilized, and the out-of-band emission may be difficult to suppress.

Hence it is highly desirable to improve techniques for WRAN systems.

BRIEF SUMMARY OF THE INVENTION

The present invention relates in general to telecommunication techniques. More particularly, the invention provides a waveform modulated method and system. Merely by way of example, the invention is described as it applies to a wireless rural area network (WRAN), but it should be recognized that the invention has a broader range of applicability.

According to an embodiment, a method for transmitting data in a wireless network includes generating a plurality of waveforms corresponding to a plurality of frequency subbands for a predetermined frequency band. The predetermined frequency band is divided into a plurality of groups of subbands, and the plurality of groups of subbands being divided into the plurality of frequency subbands. Additionally, the method includes receiving a data signal, processing information associated with the received data signal, modulating the plurality of waveforms based on at least information associated with the received data signal, and transmitting the modulated plurality of waveforms. Any two of the plurality of waveforms are substantially orthogonal to each other. Each of the plurality of waveforms corresponds to a waveform frequency spectrum associated with a spectral amplitude as a function of a frequency. The spectral amplitude for the frequency spectrum equals substantially zero outside a frequency subband selected from the plurality of frequency subbands, and equals substantially a constant number within the frequency subband.

According to another embodiment of the present invention, a system for transmitting data in a wireless network includes a data processing component configured to receive a data signal, a serial-to-parallel converter coupled to the data processing component, and a plurality of waveform generation and modulation components coupled to the serial-to-parallel converter and configured to generate a first plurality of waveforms and modulate the first plurality of waveforms based on at least information associated with the data signal. The first plurality of waveforms corresponds to a first plurality of frequency subbands for a predetermined band. The predetermined band is divided into a plurality of groups of subbands, and the plurality of groups of subbands is divided into the first plurality of frequency subbands. Additionally, the system includes a combination component configured to receive the modulated first plurality of waveforms and generate a combined waveform signal based on at least information associated with the modulated first plurality of waveforms, and an antenna configured to transmit the combined waveform. Any two of the first plurality of waveforms are substantially orthogonal to each other. Each of the first plurality of waveforms corresponds to a waveform frequency spectrum associated with a spectral amplitude as a function of a frequency. The spectral amplitude for the frequency spectrum equals substantially zero outside a frequency subband selected from the plurality of frequency subbands, and equals substantially a constant number within the frequency subband.

According to yet another embodiment of the present invention, a method for receiving data in a wireless network includes receiving a signal including a first plurality of modulated waveforms. The first plurality of modulated waveforms corresponds to a plurality of frequency subbands respectively for a predetermined frequency band. The predetermined frequency band is divided into a plurality of groups of subbands, and the plurality of groups of subbands is divided into the plurality of frequency subbands. Additionally, the method includes generating a second plurality of base waveforms corresponding to the plurality of frequency subbands respectively, processing information associated with the first plurality of modulated waveforms and the second plurality of base waveforms, and determining data carried by the first plurality of modulated waveforms based on at least information associated with the first plurality of modulated waveforms and the second plurality of base waveforms. Any two of the second plurality of base waveforms are substantially orthogonal to each other. Each of the second plurality of base waveforms corresponds to a waveform frequency spectrum associated with a spectral amplitude as a function of a frequency. The spectral amplitude for the frequency spectrum equals substantially zero outside a frequency subband selected from the plurality of frequency subbands, and equals substantially a constant number within the frequency subband.

According to yet another embodiment of the present invention, a system for receiving data in a wireless network includes an antenna configured to receive a combined waveform, a processing component configured to receive the combined waveform and generate a first plurality of modulated waveforms, and a plurality of waveform generation and correlation components coupled to the processing component and configured to generate a second plurality of base waveforms and determine data carried by the first plurality of modulated waveforms based on at least information associated with the first plurality of modulated waveforms and the second plurality of base waveforms. The second plurality of base waveforms corresponds to a plurality of frequency subbands respectively for a predetermined frequency band. The predetermined frequency band is divided into a plurality of groups of subbands, and the plurality of groups of subbands is divided into the plurality of frequency subbands. Any two of the second plurality of base waveforms are substantially orthogonal to each other. Each of the second plurality of base waveforms corresponds to a waveform frequency spectrum associated with a spectral amplitude as a function of a frequency. The spectral amplitude for the frequency spectrum equals substantially zero outside a frequency subband selected from the plurality of frequency subbands, and equals substantially a constant number within the frequency subband.

Many benefits are achieved by way of the present invention over conventional techniques. Certain embodiments can utilize more transmit power under frequency mask. For example, at least 3.8 dB more transmit power can be used by using full power under any frequency-power constraints with waveforms of some embodiments which can be adaptive to any frequency mask. Such implementation brings more spectrally efficient systems and more received signal power at the receiver. Hence, more chances can be given to intercept signals. Some embodiments of the present invention have very simple architecture. For example, a system architecture by which waveforms can be generated directly uses information stored in memory and process this information in digital methods through digital-to-analog converters (DACs) or analog-to-digital converters (ADCs). Such implementation does not need any analog devices (e.g., mixer, LO, and integrator in RF front end). In another example, the system can be implemented with low cost and low power consumption. Certain embodiments of the present invention can accomplish high out-of-band rejection. For example, waveforms used in some embodiments have steep out-of-band rejection. Since less guard band is needed for less interference to adjacent bands, more transmit power and effective bandwidth usage can be achieved. Thus high data rates also can be achieved. Some embodiments of the present invention can provide high adaptability to frequency, data rate, and/or transmit power requirements. For example, such adaptability enables high scalability in frequency, data rate, system configuration, and/or waveform.

Depending upon embodiment, one or more of these benefits may be achieved. These benefits and various additional objects, features and advantages of the present invention can be fully appreciated with reference to the detailed description and accompanying drawings that follow.

BRIEF DESCRIPTION OF THE DRAWINGS

FIG. 16 is a simplified spectrum with higher number of samples per waveform according to embodiments of the present invention;

FIG. 19 shows simplified correlations between two base waveforms with N=90 and 180 relatively according to an embodiment of the present invention;

FIG. 20 shows a simplified comparison of various modulation schemes applied to base waveforms according to embodiments of the present invention;

FIG. 30 is a simplified diagram showing comparison results of modulation schemes for a simple case with the symbol rate of 2 Msamples/sec, 4 groups in the whole band, and 4 subbands/group according to embodiments of the present invention;

DETAILED DESCRIPTION OF THE INVENTION

The present invention relates in general to telecommunication techniques. More particularly, the invention provides a waveform modulated method and system. Merely by way of example, the invention is described as it applies to a wireless rural area network (WRAN), but it should be recognized that the invention has a broader range of applicability.

Important objectives of wireless communications and even certain general "radio" systems and wired systems include flexibility for various environments and requirements/restrictions, and spectral and power efficiency in transmission. To achieve these objectives, it is desirable to adopt digital methodology to improve flexibility in system design and manipulation of signals, and to accommodate stringent user requirements. Another factor that should be considered is spectral and power efficiency for a given frequency band, especially for wireless communication systems. Many communication systems use wireless channels and consequently many frequency bands are occupied by and assigned to the rapidly increasing applications and services. Therefore it is important to use the frequency band efficiently without interference with other users. These problems can be solved by certain embodiments of the present invention.

In other words, some embodiments of the present invention have been motivated by overcoming one or more following myths:

Myth 1: "Digital implementation needs more complexity and is not easily realizable with the state-of-the art technologies." According to one or more embodiments of the present invention, digital implementation can be realized with less complexity and simple hardware, and can provide full flexibility and adaptivity.

Myth 2: "Lower frequency is not easy to manage or implement." According to one or more embodiments of the present invention, a digital processing method and system can be easily applied to lower frequency band without using more complex algorithms.

Myth 3: "Since this technology was not realizable yesterday, today also it is not easy to realize." According to one or more embodiments of the present invention, cost and complexity of a system and method can be greatly reduced.

Certain embodiments of the present invention provide systems utilizing full digital waveform signal processors with high flexibilities. Some advantages of the systems over conventional OFDM systems can be summarized according to some embodiments of the present invention:

Advantage 1

Figure 1:
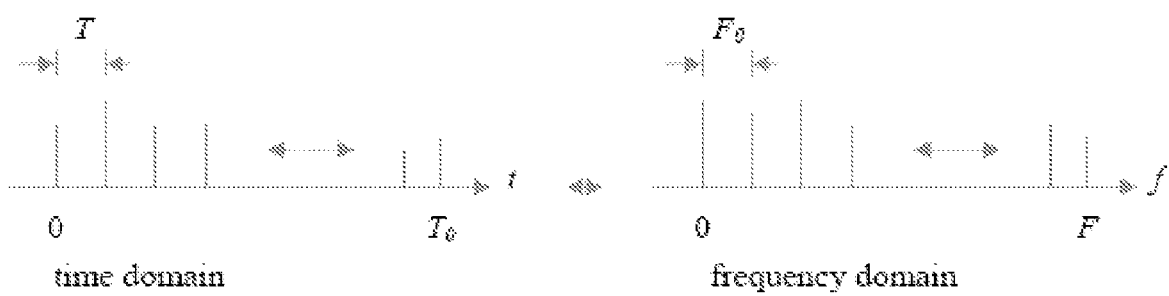
FIG. 1 is a simplified diagram showing conventional discrete Fourier transform.

The waveform modulation according to certain embodiments of the present invention is much simpler than the OFDM technique. Both the waveform modulation in some embodiments and the conventional OFDM technique use discrete Fourier transform (DFT) as shown in FIG. 1. FIG. 1 is a simplified diagram showing conventional discrete Fourier transform.

Advantage 2

Figure 2:
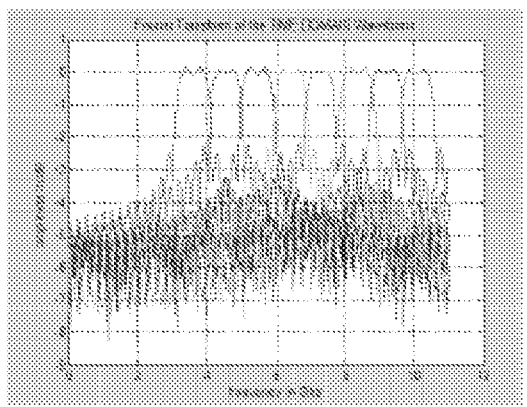
FIG. 2 is a simplified comparison between waveform modulation (WM) and OFDM according to an embodiment of the present invention.
Figure 2:
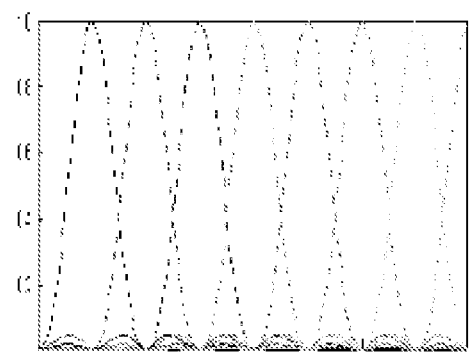

According to some embodiments of the present invention, the waveform modulation can provide almost a flat spectrum for each frequency segment. In contrast, the conventional OFDM technique often provides a sync function shape spectrum if the same parameters are applied. FIG. 2 is a simplified comparison between waveform modulation (WM) and OFDM according to an embodiment of the present invention. This diagram is merely an example, which should not unduly limit the scope of the claims. One of ordinary skill in the art would recognize many variations, alternatives, and modifications. As shown in FIG. 2, the waveform modulation (WM) has flat spectra inside the band with efficient suppression out of band.

For example, the waveform modulation does not use FFT/IFFT, but instead using de-emphasis at receiver. In one embodiment, the de-emphasis means a different value for each sampled component which is stored in memory at the receiver. In another embodiment, there is no burden for implementing the de-emphasis because only compensated sampling values needs to be stored after this de-emphasis.

Advantage 3

Figure 3:
FIG. 3 is a simplified comparison of band coverage between waveform modulation (WM) and OFDM according to an embodiment of the present invention.

According to certain embodiments of the present invention, the waveform modulation can cover entire TV bands. FIG. 3 is a simplified comparison of band coverage between waveform modulation (WM) and OFDM according to an embodiment of the present invention. This diagram is merely an example, which should not unduly limit the scope of the claims. One of ordinary skill in the art would recognize many variations, alternatives, and modifications. For example, the waveform modulation does not need to perform up/down conversions in order to translate frequencies while the conventional OFDM technique often needs to do so. Therefore, the conventional OFDM technique usually needs additional hardware or another signal processing branch to cover two bands simultaneously. Additionally, the waveform modulation according to some embodiments provides flexibility in band selection, and band expansion/reduction/elimination.

Some embodiments of the present invention relate generally to wireless communication systems that can provide wireless internet connections for sparsely-populated rural areas. For example, the systems are called wireless rural area network (WRAN) systems that can achieve good performance by using orthogonal waveforms and using full digital implementation. In another example, the systems are flexible to meet requirements from regulators or final users through waveform manipulations. In yet another example, the systems can be used as communication systems other than WRAN systems.

According to an embodiment, for a WRAN system, one TV channel frequency band is divided into a fixed number of subbands and each subband has its own waveform called as base waveform. In the time domain, these waveforms can be modulated, added, and transmitted. For example, these waveforms are substantially orthogonal to each other, and this orthogonality can be utilized to detect the signals and extract information from the received signals. In another example, various modulation schemes are provided. In yet another example, multiple access schemes are also provided suggested by applying subgroup technique and/or orthogonal pseudo random (PN) codes in the frequency domain.

According to another embodiment, a transmitter generates and modulates base waveforms by full digital processing. For example, the digital processing utilizes various types of delay devices in order to relax requirements for high sampling rates. In another example, a receiver can detect signals by full digital processing and utilize various types of delay devices also to relax requirements for high sampling rates.

Certain embodiments of the present invention make one or more of the following considerations for the waveforms:

(1) Using short duration waveforms that are purely processed in time domain:

According to an embodiment, these waveforms can be processed in the time domain and not in frequency domain. For example, simple digital processing can be applied, so the complexity and cost for implementation are low. In another example, no components are needed for processing frequency information such as filters, oscillators, etc. In yet another example, excellent co-existence capability can be achieved due to adaptive frequency band usage. The adaptive frequency band usage makes the system flexible to avoid forbidden bands (e.g. active incumbent TV user bands, active microphone bands) which are assigned to incumbent users like incumbent TV users or broadcasters. Using this type of waveforms, dynamically frequency bands can be assigned to WRAN systems and/or networks.

(2) Using waveforms that have steep out-of-band rejection around the edges of the band and are almost flat within the band:

According to an embodiment, interference with adjacent channels can be reduced. Also within the assigned band, the waveforms have almost flat spectra, so that almost full transmitted power can be utilized under frequency emission masks. For example, high transmitted power enables high amount of information to be delivered through given frequency channels or bands.

(3) Using signal processing in full digital ways to generate waveforms at transmitters and to process them at receivers According to an embodiment, waveforms are generated in full digital ways using digital-to-analog converters (DACs) at transmitters and processed using analog-to-digital converters (ADCs) at receivers to extract information. For example, information on base waveforms is stored in memory space in the systems. In another example, high speed sampling of these waveforms should be realized.

Methods According to Certain Embodiments

Figure 4:
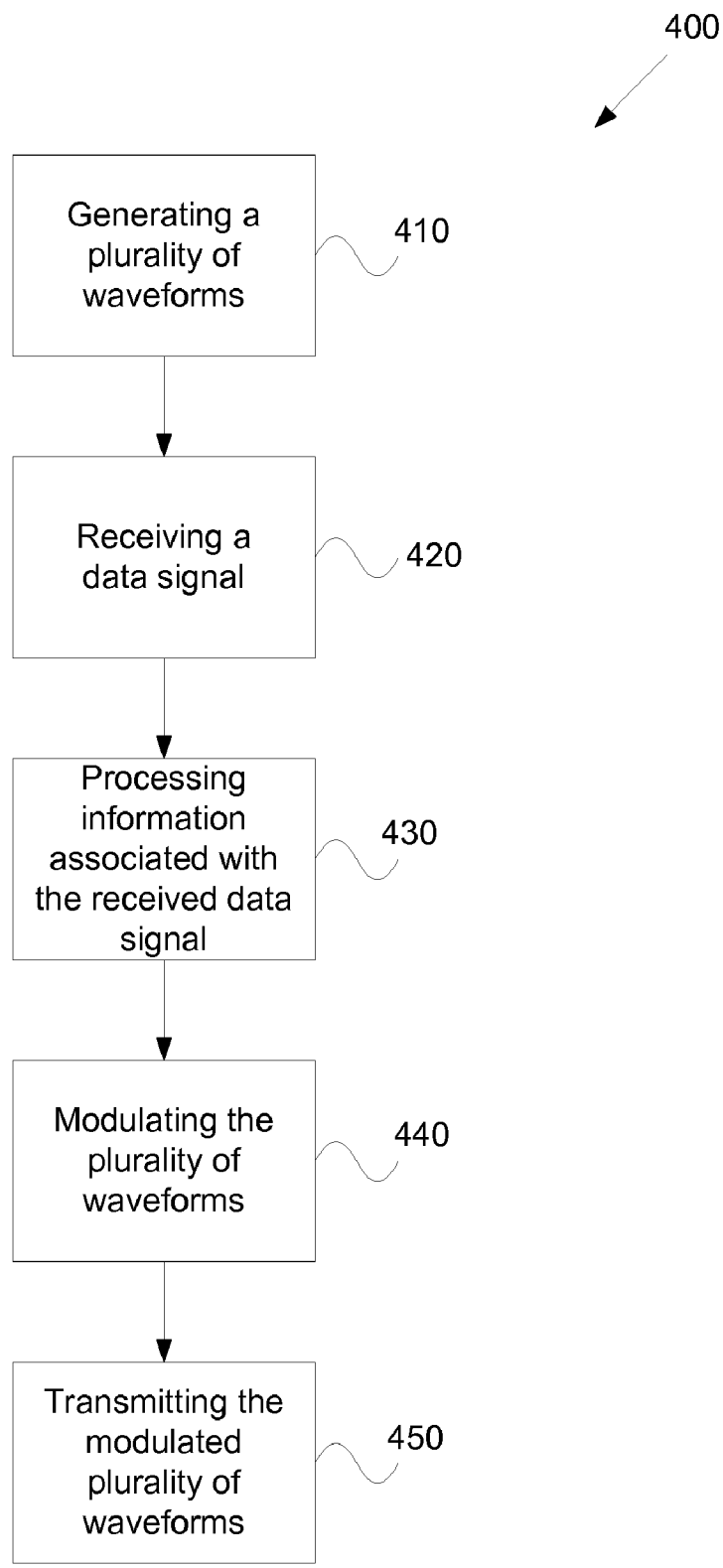
FIG. 4 is a simplified method for transmitting data in a wireless network according to an embodiment of the present invention.

FIG. 4 is a simplified method for transmitting data in a wireless network according to an embodiment of the present invention. This diagram is merely an example, which should not unduly limit the scope of the claims. One of ordinary skill in the art would recognize many variations, alternatives, and modifications. The method 400 includes process 410 for generating a plurality of waveforms, process 420 for receiving a data signal, process 430 for processing information associated with the received data signal, process 440 for modulating the plurality of waveforms based on at least information associated with the received data signal, and process 450 for transmitting the modulated plurality of waveforms. Although the above has been shown using a selected group of processes for the method 400, there can be many alternatives, modifications, and variations. For example, some of the processes may be expanded and/or combined. Other processes may be inserted to those noted above. Depending upon the embodiment, the sequence of processes may be interchanged with others replaced. Further details of these processes are found throughout the present specification and more particularly below.

At the process 410, a plurality of waveforms is generated. For example, the plurality of waveforms is a plurality of base waveforms. In another example, the plurality of waveforms corresponds to a plurality of frequency subbands within a predetermined frequency band. In one embodiment, the predetermined frequency band is continuous in the frequency domain. For example, the predetermined band is a TV channel band. In another embodiment, the predetermined frequency band is divided into a plurality of groups of subbands, which is further divided into the plurality of frequency subbands. For example, the bandwidth of the predetermined frequency band is equal to the sum of the bandwidths for the plurality of groups of subbands. In another example, the bandwidth of the predetermined frequency band is equal to the sum of the bandwidths for the plurality of frequency subbands.

In another embodiment, any two of the plurality of waveforms are substantially orthogonal to each other. In yet another embodiment, each of the plurality of waveforms has a one-to-one correspondence with one frequency subband selected from the plurality of frequency subbands. In yet another embodiment, each of the plurality of waveforms corresponds to a waveform frequency spectrum associated with a spectral amplitude as a function of frequency. For example, the spectral amplitude equals substantially zero outside the corresponding frequency subband, and equals substantially a constant number within the corresponding frequency subband.

According to certain embodiments of the present invention, the process 410 includes generating a first waveform in a time domain, modifying the first waveform in the time domain, determining a first frequency spectrum for the modified first waveform, modifying the first frequency spectrum, determining a second waveform in the time domain for the modified first frequency spectrum, modifying the second waveform in the time domain, determining a second frequency spectrum for the modified second waveform, processing information associated with the second frequency spectrum, and determining whether the second frequency spectrum satisfies one or more predetermined conditions.

For example, the process for modifying the first frequency spectrum includes, within the frequency subband, if the amplitude for the first frequency spectrum is larger than a predetermined value, setting the amplitude to the predetermined value, and outside the frequency subband, if the amplitude for the first frequency spectrum is larger than zero, setting the amplitude to zero. In another example, the process for modifying the first waveform in the time domain includes, outside a predetermined time period, if the amplitude for the first waveform is larger than zero in magnitude, setting the amplitude to zero. In yet another example, the process for modifying the second waveform in the time domain includes, outside a predetermined time period, if the amplitude for the second waveform is larger than zero in magnitude, setting the amplitude to zero.

In yet another example, the process for determining whether the second frequency spectrum satisfies one or more predetermined conditions includes, if the amplitude for the second frequency spectrum is substantially equal to or smaller than a predetermined value within the frequency subband and if the amplitude is substantially equal to zero in magnitude outside the frequency subband, determining the second frequency spectrum satisfies the one or more predetermined conditions.

For example, if the second frequency spectrum is determined to satisfy the one or more predetermined conditions, the second waveform is stored and/or used as one of the plurality of waveforms. In another example, if the second frequency spectrum is determined not to satisfy the one or more predetermined conditions, the following processes are performed: modifying the second frequency spectrum, determining a third waveform in the time domain for the modified second frequency spectrum, modifying the third waveform in the time domain, determining a third frequency spectrum for the modified third waveform, processing information associated with the third frequency spectrum, and determining whether the third frequency spectrum satisfies the one or more predetermined conditions.

At the process 420, a data signal is received. For example, the data signal includes data from multiple users. In another example, the data signal includes data from a single user, and does not include any date from any other user.

At the process 430, the received data signal is processed. For example, source encoding, channel encoding, interleaving, and/or encryption can be applied to the received data. In another example, serial-to-parallel conversion is applied to the received data.

At the process 440, the plurality of waveforms is modulated based on at least information associated with the received data signal. For example, the waveform modulation uses an OOK scheme, an antipodal BPSK scheme, an OOK and antipodal BPSK scheme, and/or an n-level modulation and nQAM scheme.

At the process 450, the modulated plurality of waveforms is transmitted. In one embodiment, the transmission includes transmitting, in parallel, data from a single user, not from any other user. For example, such transmission uses all groups of the plurality of groups of subbands. In another embodiment, the transmission includes transmitting, in parallel, data from multiple users. For example, such transmission for each user uses at least in part each of the plurality of groups of subbands. In another example, such transmission for each user uses only one group selected from the plurality of groups of subbands, and such transmission for different users use different groups selected from the plurality of groups of subbands.

Figure 5:
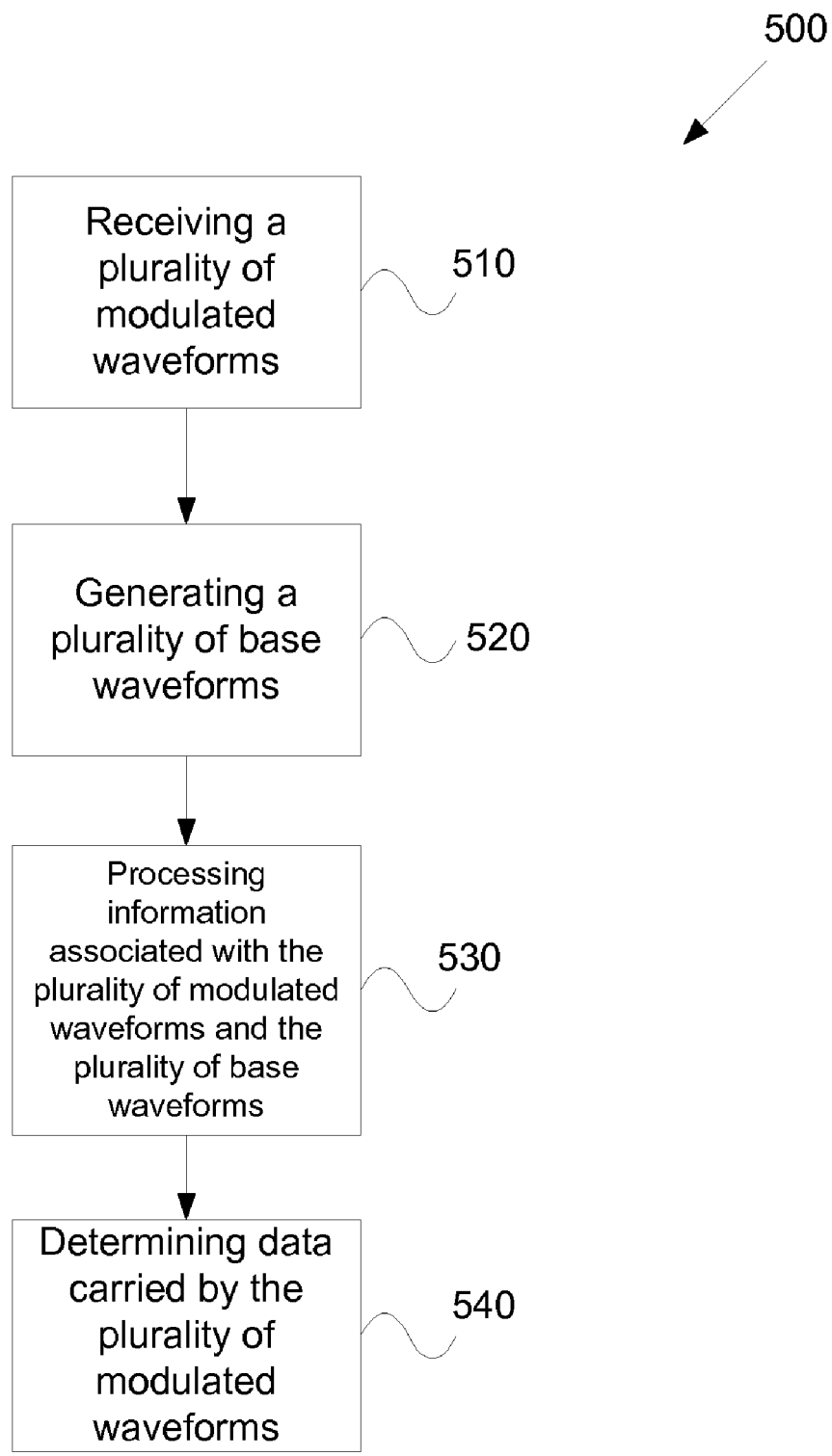
FIG. 5 is a simplified method for receiving data in a wireless network according to an embodiment of the present invention.

FIG. 5 is a simplified method for receiving data in a wireless network according to an embodiment of the present invention. This diagram is merely an example, which should not unduly limit the scope of the claims. One of ordinary skill in the art would recognize many variations, alternatives, and modifications. The method 500 includes process 510 for receiving a plurality of modulated waveforms, process 520 for generating a plurality of base waveforms, process 530 for processing information associated with the plurality of modulated waveforms and the plurality of base waveforms, and process 540 for determining data carried by the plurality of modulated waveforms. Although the above has been shown using a selected group of processes for the method 500, there can be many alternatives, modifications, and variations. For example, some of the processes may be expanded and/or combined. Other processes may be inserted to those noted above. Depending upon the embodiment, the sequence of processes may be interchanged with others replaced. Further details of these processes are found throughout the present specification and more particularly below.

At the process 510, a signal including the plurality of modulated waveforms are received. For example, the plurality of modulated waveform corresponds to a plurality of frequency subbands within a predetermined frequency band. In one embodiment, the predetermined frequency band is continuous in the frequency domain. For example, the predetermined band is a TV channel band. In another embodiment, the predetermined frequency band is divided into a plurality of groups of subbands, which is further divided into the plurality of frequency subbands. For example, the bandwidth of the predetermined frequency band is equal to the sum of the bandwidths for the plurality of groups of subbands. In another example, the bandwidth of the predetermined frequency band is equal to the sum of the bandwidths for the plurality of frequency subbands.

In another embodiment, any two of the plurality of modulated waveforms are substantially orthogonal to each other. In yet another embodiment, each of the plurality of modulated waveforms has an one-to-one correspondence with one frequency subband selected from the plurality of frequency subbands. In yet another embodiment, each of the plurality of modulated waveforms corresponds to a waveform frequency spectrum associated with a spectral amplitude as a function of frequency. For example, the spectral amplitude equals substantially zero outside the corresponding frequency subband, and equals substantially a constant number within the corresponding frequency subband.

At the process 520, the plurality of base waveforms generated. For example, the plurality of base waveforms corresponds to the plurality of frequency subbands within the predetermined frequency band. In another embodiment, any two of the plurality of base waveforms are substantially orthogonal to each other. In yet another embodiment, each of the plurality of base waveforms has an one-to-one correspondence with one frequency subband selected from the plurality of frequency subbands. In yet another embodiment, each of the plurality of base waveforms corresponds to a waveform frequency spectrum associated with a spectral amplitude as a function of frequency. For example, the spectral amplitude equals substantially zero outside the corresponding frequency subband, and equals substantially a constant number within the corresponding frequency subband.

According to certain embodiments of the present invention, the process 520 includes generating a first waveform in a time domain, modifying the first waveform in the time domain, determining a first frequency spectrum for the modified first waveform, modifying the first frequency spectrum, determining a second waveform in the time domain for the modified first frequency spectrum, modifying the second waveform in the time domain, determining a second frequency spectrum for the modified second waveform, processing information associated with the second frequency spectrum, and determining whether the second frequency spectrum satisfies one or more predetermined conditions.

For example, the process for modifying the first frequency spectrum includes, within the frequency subband, if the amplitude for the first frequency spectrum is larger than a predetermined value, setting the amplitude to the predetermined value, and outside the frequency subband, if the amplitude for the first frequency spectrum is larger than zero, setting the amplitude to zero. In another example, the process for modifying the first waveform in the time domain includes, outside a predetermined time period, if the amplitude for the first waveform is larger than zero in magnitude, setting the amplitude to zero. In yet another example, the process for modifying the second waveform in the time domain includes, outside a predetermined time period, if the amplitude for the second waveform is larger than zero in magnitude, setting the amplitude to zero.

In yet another example, the process for determining whether the second frequency spectrum satisfies one or more predetermined conditions includes, if the amplitude for the second frequency spectrum is substantially equal to or smaller than a predetermined value within the frequency subband and if the amplitude is substantially equal to zero in magnitude outside the frequency subband, determining the second frequency spectrum satisfies the one or more predetermined conditions.

For example, if the second frequency spectrum is determined to satisfy the one or more predetermined conditions, the second waveform is stored and/or used as one of the plurality of waveforms. In another example, if the second frequency spectrum is determined not to satisfy the one or more predetermined conditions, the following processes are performed: modifying the second frequency spectrum, determining a third waveform in the time domain for the modified second frequency spectrum, modifying the third waveform in the time domain, determining a third frequency spectrum for the modified third waveform, processing information associated with the third frequency spectrum, and determining whether the third frequency spectrum satisfies the one or more predetermined conditions.

At the process 530, information associated with the plurality of modulated waveforms and the plurality of base waveforms are processed. In one embodiment, the plurality of modulated waveforms and the plurality of base waveforms are correlated, such as compared.

At the process 540, data that are carried by the plurality of modulated waveforms are determined. For example, such determination is made based on at least information associated with the plurality of modulated waveforms and the plurality of base waveforms.

Frequency Plan for WRAN Systems According to Certain Embodiments

For some embodiments of the present invention, one TV channel band is divided into a fixed number of subbands by applying the following concepts to have the optimum system design for a given frequency band. For example, to be flexible enough to satisfy any frequency band given and to avoid any forbidden bands and even a small forbidden part of a subband, for each subband, a base waveform can be adaptively tailored to any frequency mask or band provided with any forbidden parts of this subband. In another example, with any given frequency band, the maximally allowed transmit power in the whole frequency band can be used to enjoy more transmitted power because almost flat spectra can be achieved with the waveforms. In one embodiment, this shape of spectrum has 3.8 dB more power than Gaussian pulse waveform's case with the same frequency band. For example, 3.8 dB more margin can be achieved for link budget in the system design.

According to some embodiments, frequency subbands in one TV channel band is assigned as following: one TV channel frequency band is divided into a fixed number of equally divided groups and each group has a fixed number of subbands. As an example, one TV channel is divided into four groups and each group is divided into four subbands. Consequently, the bandwidth of a subband is equal to the bandwidth of one TV channel divided by 16. If one TV band has a bandwidth of 6 MHz, the bandwidth of a subband is equal to 0.375 MHz. In one embodiment, each subband has its own waveform which is called base waveform, and base waveforms of a group consist of four base waveforms which can further processed with a modulation scheme and added together.

The base waveforms are flexible enough to satisfy any frequency mask and to avoid any forbidden bands according to certain embodiments. For example, base waveforms can be adaptively tailored to any frequency mask applied with any forbidden bands. If a part of a given band should be abandoned for WRAN systems, e.g., due to another active microphone operation, the base waveform is not generated for this subband.

Figure 6:
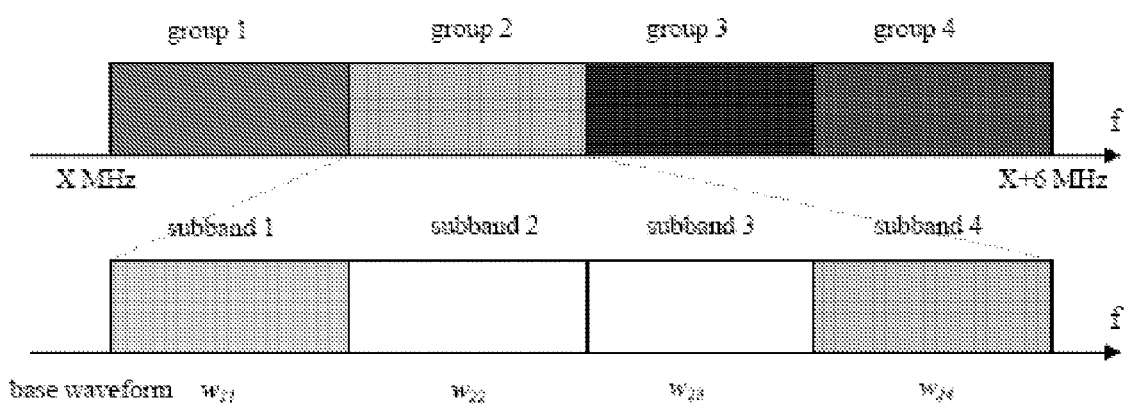
FIG. 6 shows a simplified division of frequency band into groups and subbands according to an embodiment of the present invention.

FIG. 6 shows a simplified division of frequency band into groups and subbands according to an embodiment of the present invention. This diagram is merely an example, which should not unduly limit the scope of the claims. One of ordinary skill in the art would recognize many variations, alternatives, and modifications. As shown in FIG. 6, one whole TV band is divided into four groups and each group band is again divided into four subbands. Such division results in a total of 16 subbands for one TV band.

Base Waveforms According to Certain Embodiments

As an example, the following processes can be done for generating and shaping some waveforms:

1. Ideal frequency domain rectangular shape band is initially obtained for the desired bandwidth;
2. The whole band is subdivided into a fixed number of groups, each of which occupies a unique frequency range in the target band and also has an equal bandwidth;

3. These groups are further subdivided into a fixed number of subbands, each of which occupies a unique frequency range within its corresponding group and also has an equal bandwidth;

4. Each subband is represented separately as a rectangular shape band in the frequency domain. For example, a fixed number of samples are used to define a subband.

5. An inverse fast Fourier transform (IFFT) is performed with a fixed number of points (samples) on each frequency domain subband in order to obtain a unique time domain waveform for the corresponding subband. For example, the size of this waveform depends on the IFFT sample points used. In another example, the number of the time domain waveform could be related to any number such as 100, 400 or 800.

6. The envelope represents a sinc function which depends on the bandwidth of the subband. The carrier frequency is equal to the centre frequency of the corresponding subband. Thus this waveform completely defines the bandwidth and location of the subband within the whole target band spectrum, e.g., one TV band.

However, the following problems are associated with implementation of such time domain waveforms according to some embodiments of the present invention:

1. The waveform extends to infinity in the time domain; and

2. The values for native times in the time domain represent past values which cannot be realized in real time system.

Figure 7:
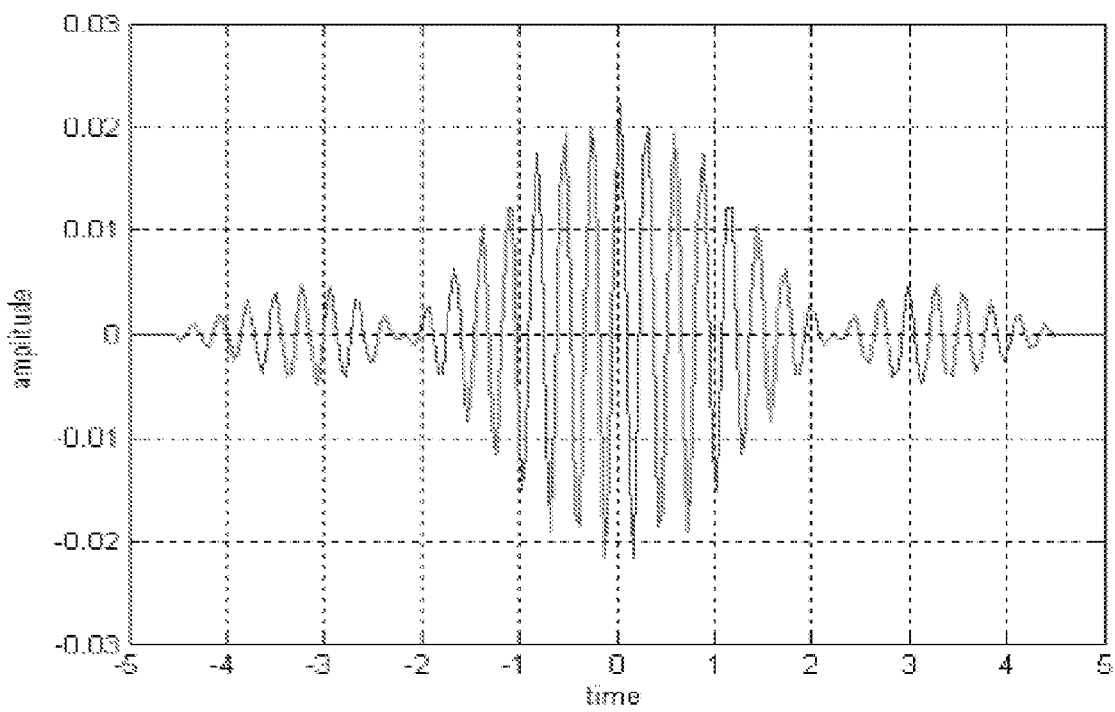
FIGS. 7 and 8 are simplified time-domain waveform that is time limited and its corresponding frequency-domain spectrum according to an embodiment of the present invention.
Figure 8:
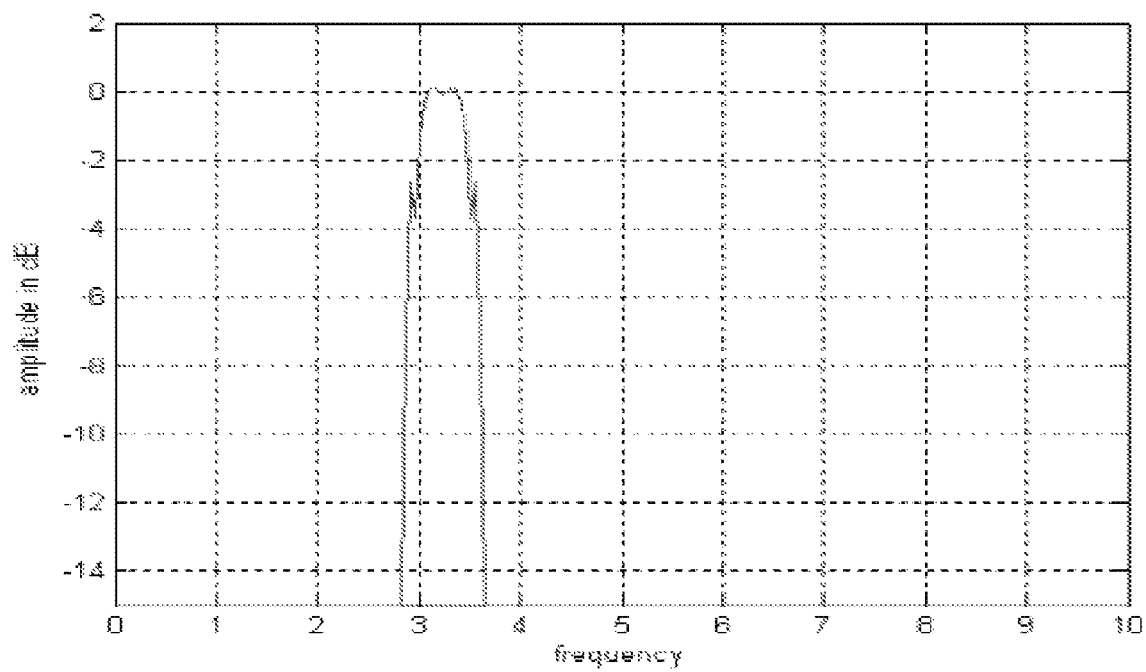

Consequently, the waveform needs to be made to be time limited. FIGS. 7 and 8 are simplified time-domain waveform that is time limited and its corresponding frequency-domain spectrum according to an embodiment of the present invention. These diagrams are merely examples, which should not unduly limit the scope of the claims. One of ordinary skill in the art would recognize many variations, alternatives, and modifications. As shown in FIG. 7, the waveform has a duration of 9 ns and consists of the main lobe and one side lobe on both sides. In one embodiment, the waveform needs to be shifted to entirely positive times.

Figure 9:
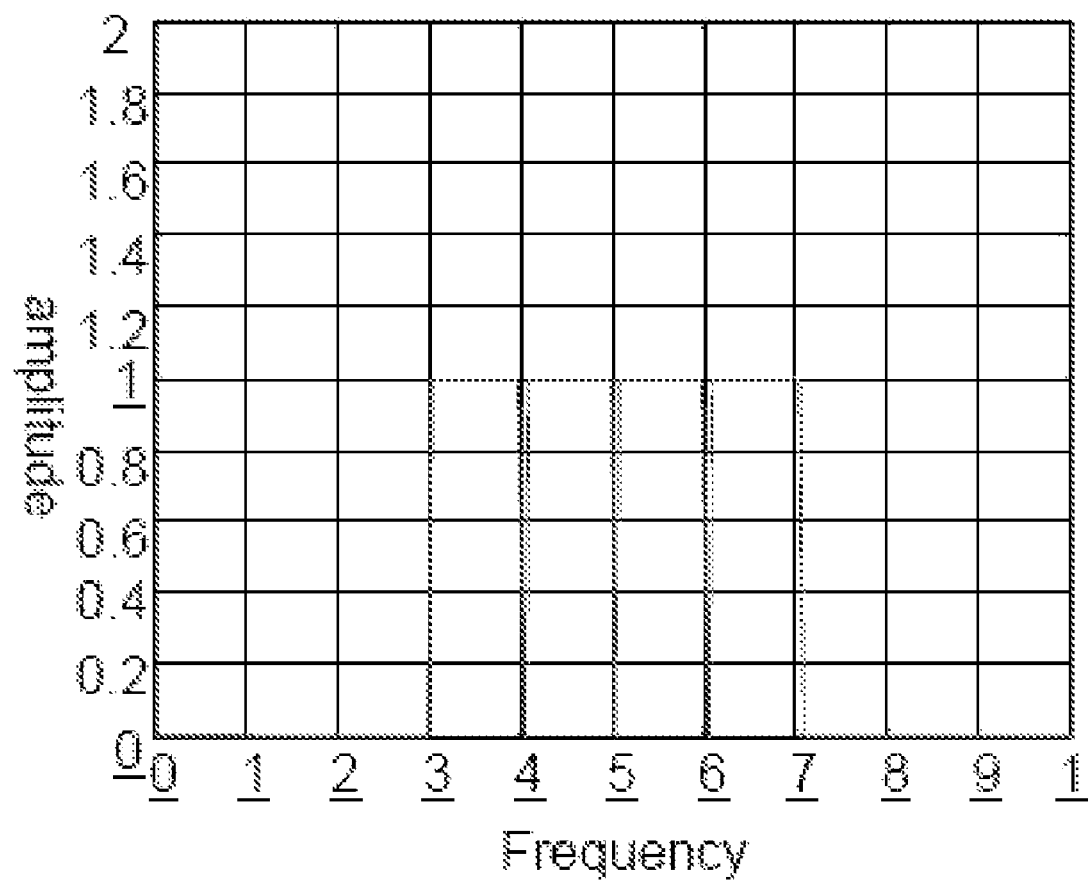
FIGS. 9 and 10 are simplified frequency-domain spectra and their corresponding time-domain waveforms for four subbands according to an embodiment of the present invention.
Figure 10:
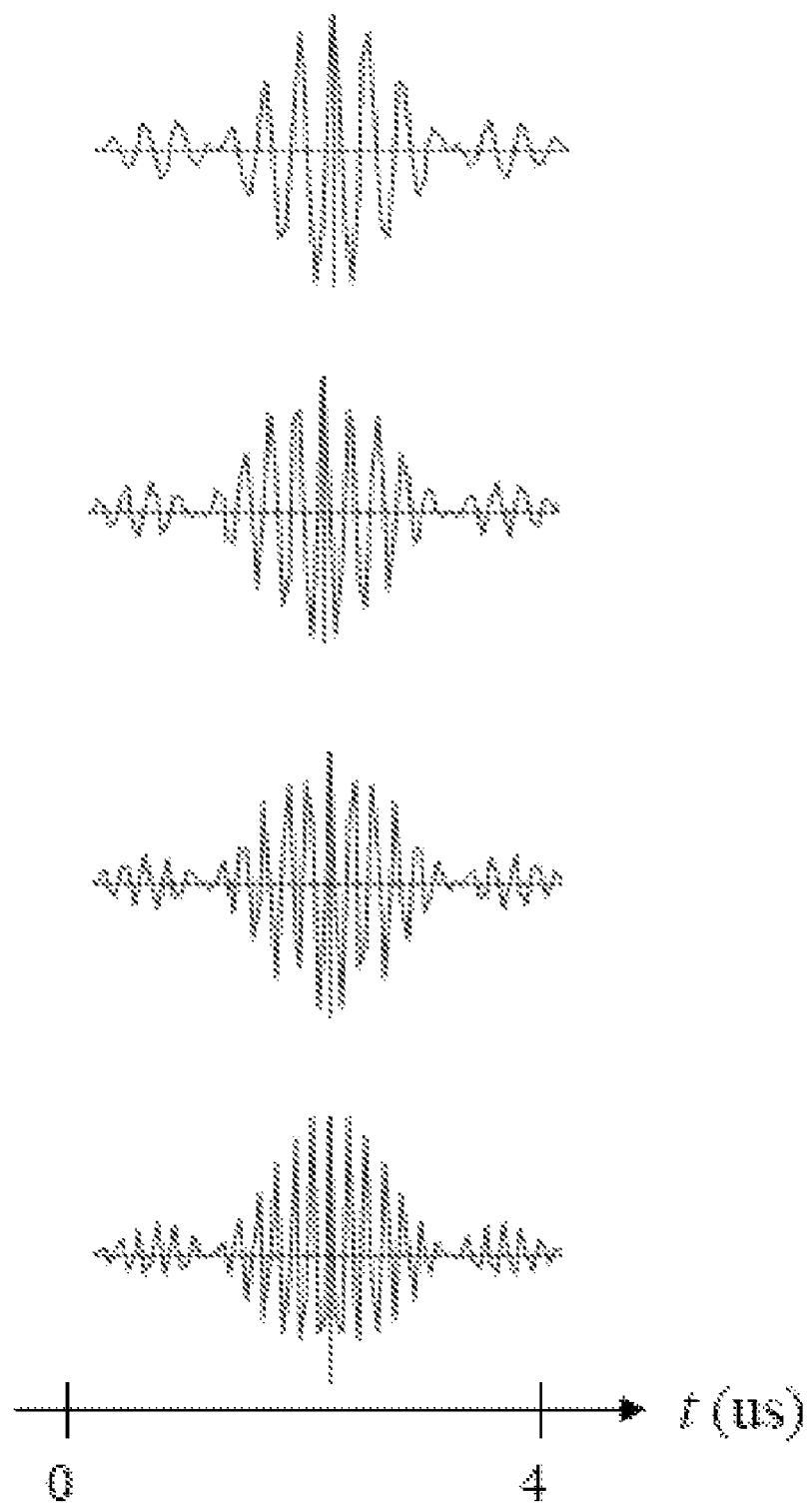

FIGS. 9 and 10 are simplified frequency-domain spectra and their corresponding time-domain waveforms for four subbands according to an embodiment of the present invention. These diagrams are merely examples, which should not unduly limit the scope of the claims. One of ordinary skill in the art would recognize many variations, alternatives, and modifications. As shown in FIG. 9, each subband has, for example, 1 MHz bandwidth (BW). In one embodiment, the smaller the bandwidth is, the larger its waveform duration becomes. For these four subbands, corresponding waveforms are shown in FIG. 10 for a center frequency.

According to an embodiment, for each subband, there is one waveform which has a flat spectrum almost throughout the subband as shown in FIG. 8. For example, Group i has four base waveforms: $w_{i1}$, $w_{i2}$, $w_{i3}$, and $w_{i4}$. In another example, Group i has 16 waveforms: $m_{i1}$, $m_{i2}$, $m_{i3}$, . . . , $m_{i16}$ where $m_{ij}=a*w_{i1}+b*w_{i2}+c*w_{i3}+d*w_{i4}$ and a, b, c, and d are determined by modulation method applied. Some examples of modulation methods include On-Off Keying (OOK) and Binary Phase Shift Keying (BPSK).

Digital Processing on Desired Spectrum According to Certain Embodiments

As an example, the IFFT is performed with a fixed number (e.g., 400 or 800) of points (or samples) on each subband in order to obtain a unique time domain waveform for the corresponding subband. One example of four base waveforms for the defined subbands of a group is shown in FIG. 10.

Figure 11:
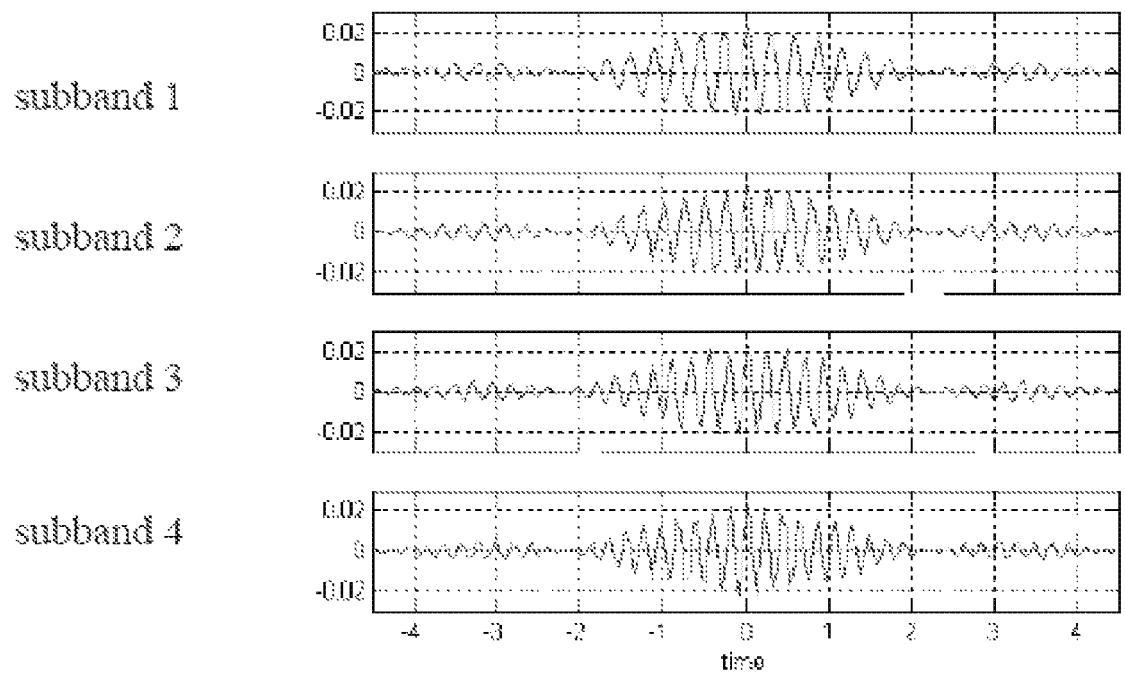
FIGS. 11 and 12 are simplified time-domain waveforms and their corresponding frequency-domain spectra for four subbands of a group according to another embodiment of the present invention.
Figure 12:
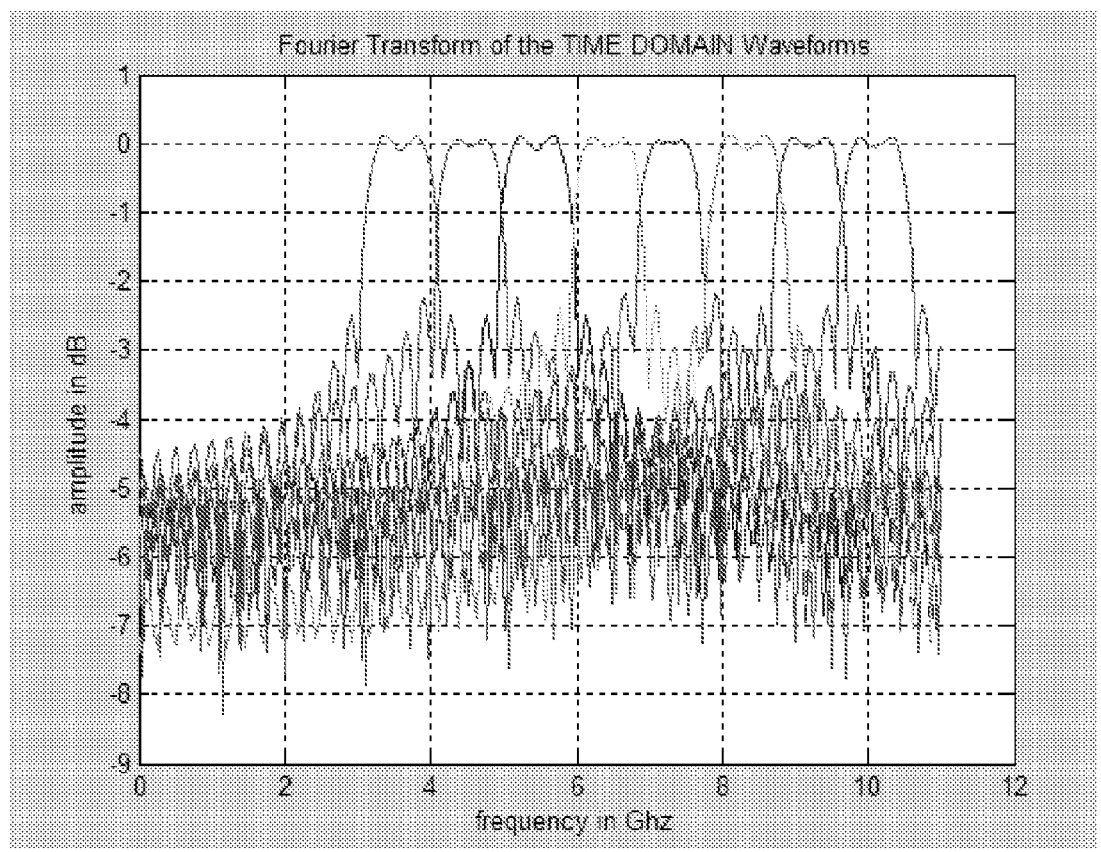

FIGS. 11 and 12 are simplified time-domain waveforms and their corresponding frequency-domain spectra for four subbands of a group according to another embodiment of the present invention. These diagrams are merely examples, which should not unduly limit the scope of the claims. One of ordinary skill in the art would recognize many variations, alternatives, and modifications. As shown in FIGS. 11 and 12, there are at least four subbands, each of which has, for example, a bandwidth of 0.469 MHz. In one embodiment, the time-domain waveforms need to be shifted to entirely positive times. Also, FIG. 12 shows four additional spectra corresponding to four other subbands.

According to some embodiments, the following observations can be made from FIG. 11 and FIG. 12:

(1) Envelope depends on the bandwidth of the subband. One waveform duration is inversely proportional to its bandwidth;

(2) Carrier frequency is equal to the center frequency of the corresponding subband; hence the envelope is modulated with the center frequency sinusoidal signal.

(3) Consequently, this waveform completely defines the bandwidth and location of the subband within the target band spectrum;

(4) A time limited waveform as shown in FIG. 11 can be applied to each subband. This waveform can be devised using an iteration method.

Figure 13:
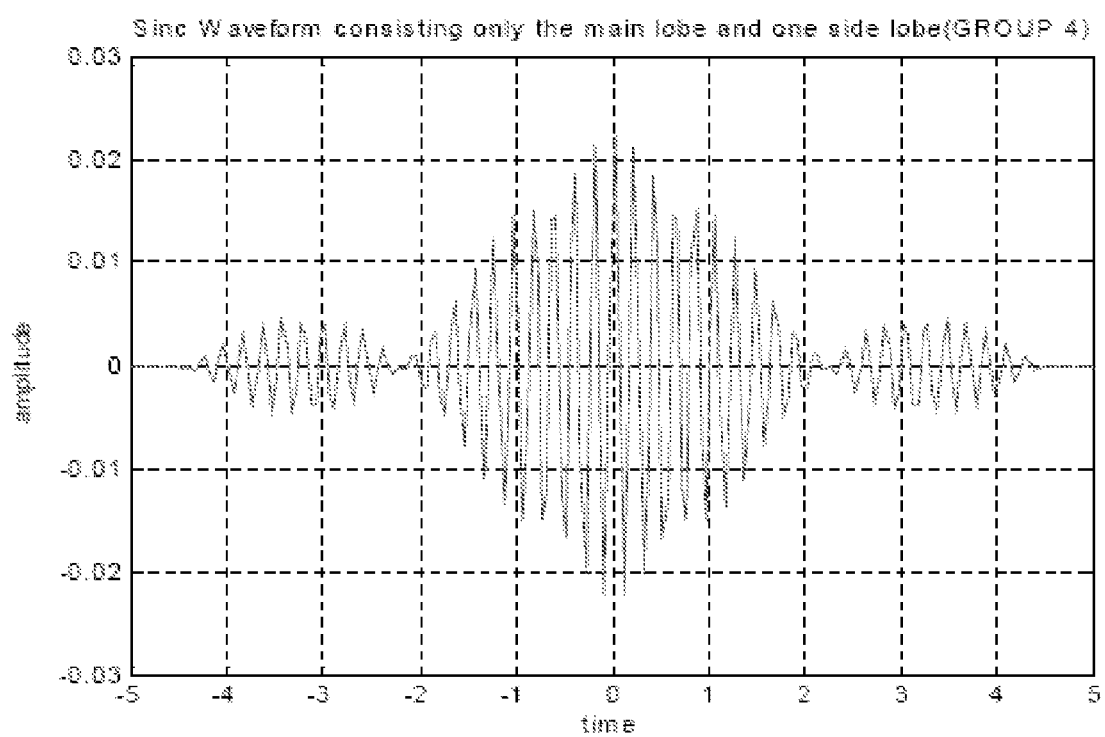
FIG. 13 shows a simplified time-limited base waveform with a carrier frequency different from that of a base waveform in FIG. 7 according to another embodiment of the present invention.

FIG. 13 shows a simplified time-limited base waveform with a carrier frequency different from that of a base waveform in FIG. 7 according to another embodiment of the present invention. This diagram is merely an example, which should not unduly limit the scope of the claims. One of ordinary skill in the art would recognize many variations, alternatives, and modifications. In one embodiment, the waveform needs to be shifted to entirely positive times.

Figure 14:
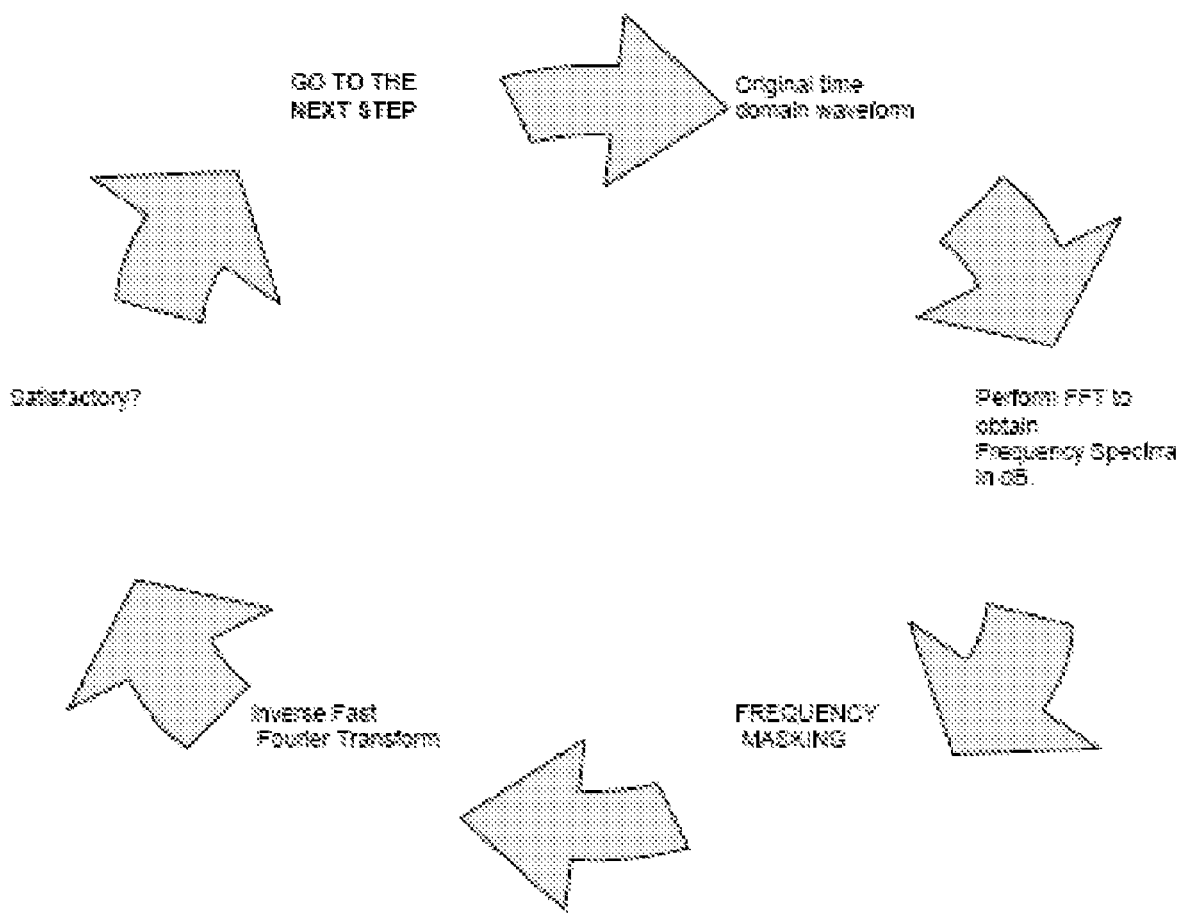
FIG. 14 is a simplified process for generating base waveforms according to an embodiment of the present invention.

Iteration Process to Obtain Time Domain Waveforms According to Certain Embodiments As an example, time-limited waveforms in the time domain should be devised while their spectra are kept relatively flat in the frequency domain. FIG. 14 is a simplified process for generating base waveforms according to an embodiment of the present invention. This diagram is merely an example, which should not unduly limit the scope of the claims. One of ordinary skill in the art would recognize many variations, alternatives, and modifications. For example, the process 1400 can be used for the process 410. In another example, the process 1400 can be used for the process 520.

As shown in FIG. 14, the process 1400 for generating base waveforms including:

(1) Performing Inverse Fourier Transform (IFT) with a rectangular shape frequency spectrum for a target band and getting a time-domain waveform. For example, the rectangular shape frequency band, e.g., an envelope, represents a sinc function which depends on the bandwidth of the subband. The carrier frequency is equal to the center frequency of the corresponding subband.

(2) Removing portions outside the main lobe and a fixed number of sidelobes of both sides. For example, only one sidelobe on each side is kept;

(3) Performing Fourier Transform (FT) with a particular sample size on the modified time-domain waveform;

(4) Taking logarithm for the result of Fourier Transform to express the frequency domain spectra in db.

(5) Frequency masking is performed in order to eliminate the parts of the spectrum above the mask. For example, the frequency components outside the desired frequency band are suppressed to a proper limit—within only the target band. In another example, the amplitude fluctuations are also eliminated inside the band. Thus by performing frequency masking, the closeness of the frequency spectra to ideal flat case can be maintained according to certain embodiments.

(6) Taking antilogarithm of the frequency-masked spectrum and again performing Inverse Fourier Transform (IFT) with a predetermined sample size to obtain a time-domain waveform.

(7) Performing Fourier Transform with a predetermined sample size on the time-domain waveform and checking whether that the resultant spectrum is close to the ideal flat case. If close enough, then proceeding with this time-domain waveform, else repeating the iteration process again.

According to an embodiment, the waveform shaping is done using the above iteration digital method. To generate the waveform, first the frequency band for a particular subband is considered and then Inverse Fourier Transform is carried out to get a time domain waveform. For the time domain waveform, as an example, only the main lobe and the first side lobe on each side are considered and all other side lobes are filtered out. On the resulting waveform, Fourier Transform is carried out to get a frequency domain spectrum. The frequency domain spectrum is expressed in dB and has the same bandwidth as the original spectrum. In order to improve the spectral shape by making its shape close to the ideal flat case such that the spectrum has flat amplitude in the band and more rejection out of the band, frequency masking procedure is carried out and almost all the unwanted components in the frequency domain are removed.

According to another embodiment, some parameters for carrying out the algorithms in MATLAB software which is used to simulate the waveforms are as follows:

(b 1) Number of samples per waveform=50, 90, 140, 180, 280, 400 (to observe for the optimum performance);

(2) Maximum duration of the time domain waveform=9 ns;

(3) Total number of base waveforms (for each group)=4;

(4) Total number of waveforms (for a total of 16 subbands)=16;

Additionally, as an example, 1440 or 7290 sample information will be stored in memory per group for the above parameters.

Spectral Flatness vs. No. of Samples Per Waveform According to Certain Embodiments The spectral flatness is the measure of flatness inside the desired frequency band while maintaining required suppression outside the band.

With the same waveform, spectral flatness depends on the number of samples for each waveform: More samples for a waveform make the spectrum be flatter—flatter inside the band and more suppression outside the band. For typical cases, for a bandwidth of 0.469 MHz, the width (or duration) of its waveform is 9 ns when the above iteration method is applied to have one main lobe and two side lobes. Numbers of samples per waveform of 50, 90, 140, 180, 280, and 400 can be considered.

Figure 15:
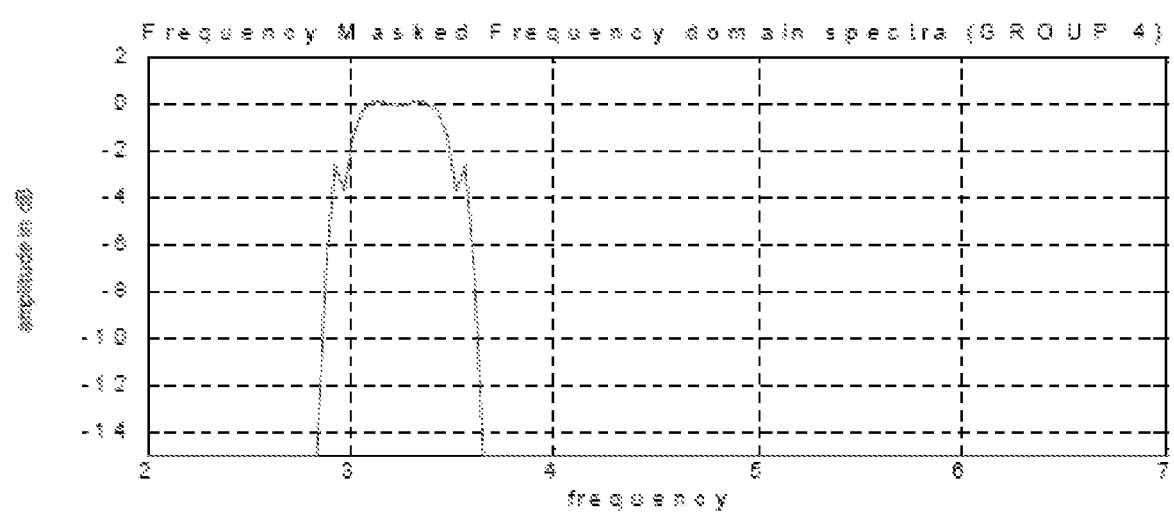
FIG. 15 is a simplified spectrum with less number of samples per waveform and FIG. 16 is a simplified spectrum with higher number of samples per waveform according to embodiments of the present invention.
Figure 16:
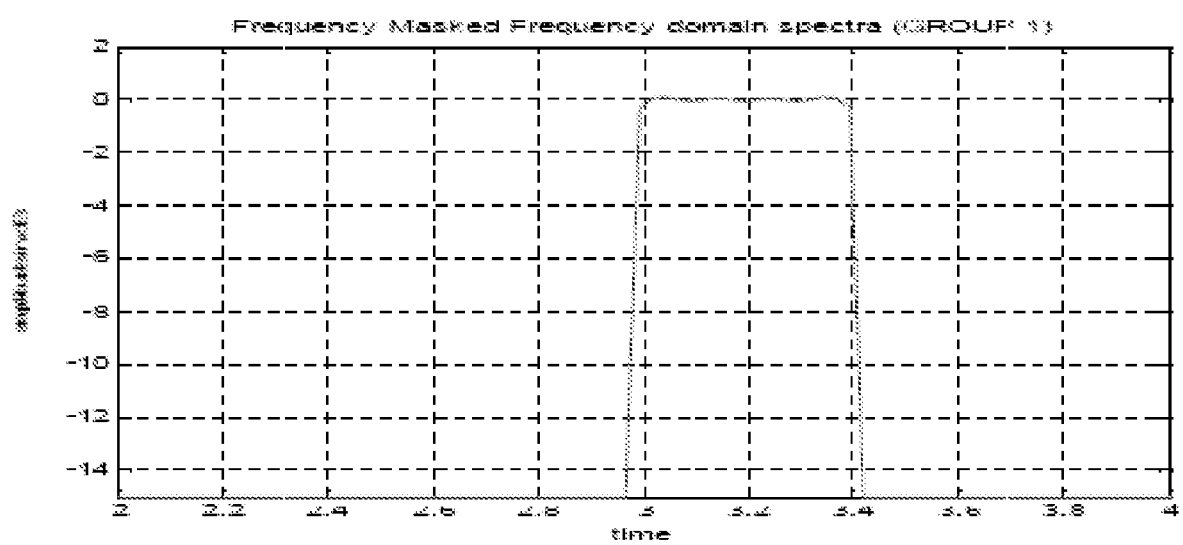

FIG. 15 is a simplified spectrum with less number of samples per waveform and FIG. 16 is a simplified spectrum with higher number of samples per waveform according to embodiments of the present invention. These diagrams are merely examples, which should not unduly limit the scope of the claims. One of ordinary skill in the art would recognize many variations, alternatives, and modifications. As shown in FIGS. 15 and 16, the spectrum with more samples per waveform has more flatness and more suppression.

Specifically, FIGS. 15 and 16 demonstrate the difference in the flatness for different values of N, the number of samples. With the same waveform, spectral flatness depends on the number of samples for each waveform. More samples taken make the spectrum be flatter: flatter inside the band and more suppression outside the band. Let power ratio be defined as power with perfectly flat spectrum vs power with less perfectly flat spectrum. Then the power ratio increases for a spectrum close to perfectly flat spectrum as the number of samples increases. For certain embodiments of the present invention, spectral flatness is observed for at least two cases. The first case is considered with 400 samples/waveform and the second case with 800 samples/waveform.

Figure 17:
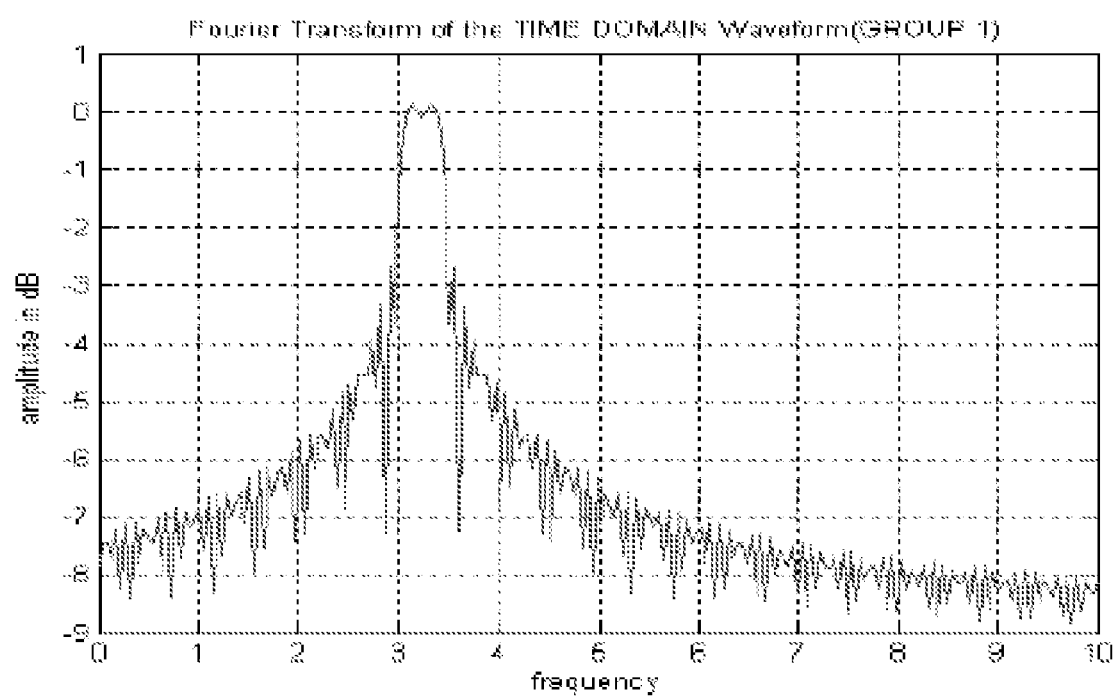
FIGS. 17 and 18 demonstrate simplified spectral flatness for a group of four subbands with the number of samples of 400 and 800 respectively according to embodiments of the present invention.
Figure 18:
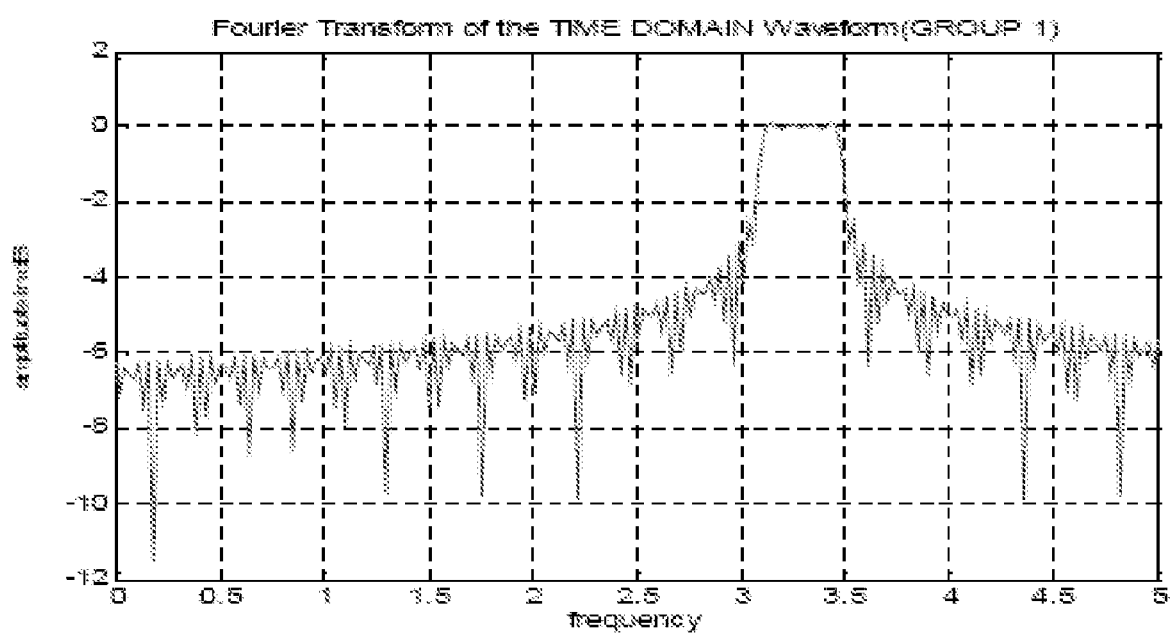

FIGS. 17 and 18 demonstrate simplified spectral flatness for a group of four subbands with the number of samples of 400 and 800 respectively according to embodiments of the present invention. These diagrams are merely examples, which should not unduly limit the scope of the claims. One of ordinary skill in the art would recognize many variations, alternatives, and modifications.

Waveform Orthogonality According to Certain Embodiments

Only one waveform completely represents a particular subband and should be distinguished from other waveforms by processing the signal combined with (or mathematically added to) other signals. For this purpose the wave shaping completely defines the orthogonality of waveforms.

Orthogonality of Sinusoids for Some Embodiments

A key property of sinusoids is that they are orthogonal at different frequencies. That is, for different two frequencies, $\omega_1 \neq \omega_2 \Rightarrow A_1 \sin(\omega_1 t + \phi_1) \perp A_2 \sin(\omega_2 t + \phi_2)$.

This is true whether they are complex or real, and whatever amplitude and phase they may have. All that matters is that the frequencies should be different. Note, however, that the sinusoidal durations must be infinity. For length$^{x=2,3}$ sampled sinusoidal signal segments, such as used by the discrete Fourier transform (DFT), exact orthogonality holds only for the harmonics of the sampling-rate-divided-by-$^{x=2,3}$, i.e., only for the frequencies $$f_k = k \frac{f_s}{N},$$
$$k = 0, 1, 2, 3, \ldots, N-1.$$

These are the only frequencies that have a whole number of periods in$^{x=2,3}$ samples. The complex sinusoids corresponding to the frequencies $f_k$ are $$s_k(n) \triangleq e^{j\omega_k nT},$$
$$\omega_k \triangleq k \frac{2\pi}{N} f_s,$$
$$k = 0, 1, 2, \ldots, N-1.$$

For the time domain spectrum, the carrier waveform is a sinusoid while the envelope is a sinc function. The zero crossing of the sinc function depends on the bandwidth of the subband. So the spectrum is not a pure sinusoid. Hence in certain embodiments of the present invention, the maximum orthogonality can be maintained by keeping the crosscorrelation minimum while maintaining maximum autocorrelation.

Correlation for Some Embodiments

Autocorrelation function is defined as:

$$Autocorrelation = \sum_{K=1}^{N} s_k(k) s_k^*(k) = \sum_{K=1}^{N} s_k(k)^2$$

where s(k) is the kth sample of ith base waveform of a group for N samples/waveform. Cross correlation also can be defined as:

$$Cross\ correlation = \sum_{K=1}^{N} s_i(k) s_j^*(k)$$

Each waveform should be orthogonal to other waveforms.

Orthogonality of waveforms is described as follows: For each subband, one base waveform exists. Sixteen base waveforms throughout whole band (four groups) are defined for the previous case as $w_{11}(t), w_{12}(t), w_{13}(t), w_{14}(t), w_{21}(t), \ldots, w_{43}(t), w_{44}(t)$.

Each waveform is almost orthogonal to each other or perfectly orthogonal after de-emphasis at the receiver. Each group has 16 waveforms for binary base waveform modulation (OOK or BPSK) or 81 waveforms for ternary base waveform modulation (OOK+BPSK) or 256 waveforms for quaternary base waveform modulation (QPSK).

$m1, 1 = 0, m1, 2 = w1, m1, 3 = w2, \ldots, m4,$ $16 = w13 + w14 + w15 + w16$ with $OOK$ $m1, 1 = -w1 - w2 - w3 - w4, \ldots, m4,$ $16 = w13 + w14 + w15 + w16$ with $BPSK$ These waveforms are orthogonal to each other after de-emphasis at the receiver.

Correlation of waveforms is defined as following: Ratio of correlations is defined as autocorrelation divided by crosscorrelation for various N values. Then orthogonality holds for sinusoidal waveforms with some conditions as explained in the above, but the waveforms used here are not sinusoidal with some envelope. At receiver, de-emphasis can be used to make pure sinusoidal signals for a period. Let us define $mij * \underline{mij} =$ $(a*wi1 + b*wi2 + c*wi3 + d*wi4)(a*\underline{wi1} + b*\underline{wi2} + c*\underline{wi3} + d*\underline{wi4})$ where mij is the waveform transmitted and $\underline{mij}$ is the waveform generated at receiver after de-emphasis. Then after integration for one waveform duration, only autocorrelation terms remain and orthogonality can hold at receiver during detection for matched waveforms. What is the best sampling frequency such that orthogonality can be achievable? It is a problem, but it can be solved with the above condition for orthogonality of sinusoids. Less than 8 bits/sample will be enough for orthogonality evaluation.

De-emphasis is applied at the receiver to compensate base waveforms generated to satisfy the condition of orthogonality of sinusoids. Base waveform devised here is not perfectly sinusoidal. Therefore it does not satisfy the condition of orthogonality of sinusoids. By emphasizing the small signal components to make the signal be a perfect sinusoidal signal for one period specified in the above section, Orthogonality of Sinusoids.

Orthogonality vs. Number of Samples per Waveform According to Certain Embodiments To evaluate this property, two correlations are considered as in the above. If two waveforms are orthogonal to each other, crosscorrelation should be zero while autocorrelation has a maximum value. If these two waveforms are less orthogonal to each other, the opposite results will be obtained. Therefore a ratio between these two correlations is defined as Correlation Ratio which is defined as ratio of autocorrelation and cross correlation. This ratio gives the measure of orthogonality. The ratio is observed for different N values and its effect on orthogonality is measured.

FIG. 19 shows simplified correlations between two base waveforms with N=90 and 180 relatively according to an embodiment of the present invention. This diagram is merely an example, which should not unduly limit the scope of the claims. One of ordinary skill in the art would recognize many variations, alternatives, and modifications.

As shown in FIG. 19, N is kept 90 and 180 for two different cases and corresponding correlation ratios are calculated. Correlation ratio is defined as autocorrelation divided by crosscorrelation. In each bin of the table, the numbers represent correlation values and correlation ratios for N=180 and N=90. It is noteworthy that correlations totally depend on the number of samples used.

Modulation According to Certain Embodiments

Modulation and multiple access efficiency can be determined by the following parameters:

Energy or power efficiency (joule/sec)

Energy is defined as power multiplied by time for signals transmitted or occupied in frequency band. Then this power is limited by spectral masks for wireless radio communications. Therefore the maximum power which is allowed to be used is the power spectral density per unit frequency times the bandwidth assigned to the application. To use more energy, more time for transmission is needed. It means the energy is totally related to transmit time. For WRAN, the bandwidth for one channel is given which is around 6 MHz in the United States and 7 or 8 MHz in other areas. Hence short duration waveforms can be used for higher data rates. Another possibility to increase energy is by using multiple (identical) waveforms in a row for one bit (or symbol). It is more desirable to use more power under a frequency mask to have higher transmit power for communications with the given constraints because the power is constrained with frequency mask for most wireless communication cases including WRAN case. New waveforms are needed to fit the frequency mask to have more transmitted power. The waveforms devised for certain embodiments of the present invention have almost flat spectra inside the given frequency bands. New time domain waveforms need to be designed in order to have more transmitted power.

Spectral Efficiency (bit/sec/Hz)

A limited bandwidth is given to a specific application for most wired and wireless communication systems. With the given bandwidth, to deliver more information more complex modulation schemes have to be applied which allows us to have higher spectral efficiency (which means more information can be delivered per unit frequency), but entails higher system complexity. Spectral efficiency is the amount of useful information that can be transmitted over a given spectrum (bandwidth) over a given period of time.

Time Efficiency or Data Rate (bit/sec)

For higher data rates, time efficiency is more important. It needs a short duration waveform for one symbol to achieve high time efficiency. Or it is needed to put more information in one symbol duration. Hence it depends on given frequency bandwidth and modulation efficiency. And also waveforms which represent information are one of key factors for time efficiency and well tailored waveforms should be devised for high time efficiency. In certain embodiments of the present invention, new waveforms are devised as introduced in the above.

Modulation for Each Base Waveform According to Certain Embodiments

The base waveforms devised in the above are modulated by some modulation schemes. FIG. 20 shows a simplified comparison of various modulation schemes applied to base waveforms according to embodiments of the present invention. This diagrams is merely an example, which should not unduly limit the scope of the claims. One of ordinary skill in the art would recognize many variations, alternatives, and modifications.

Figure 27:
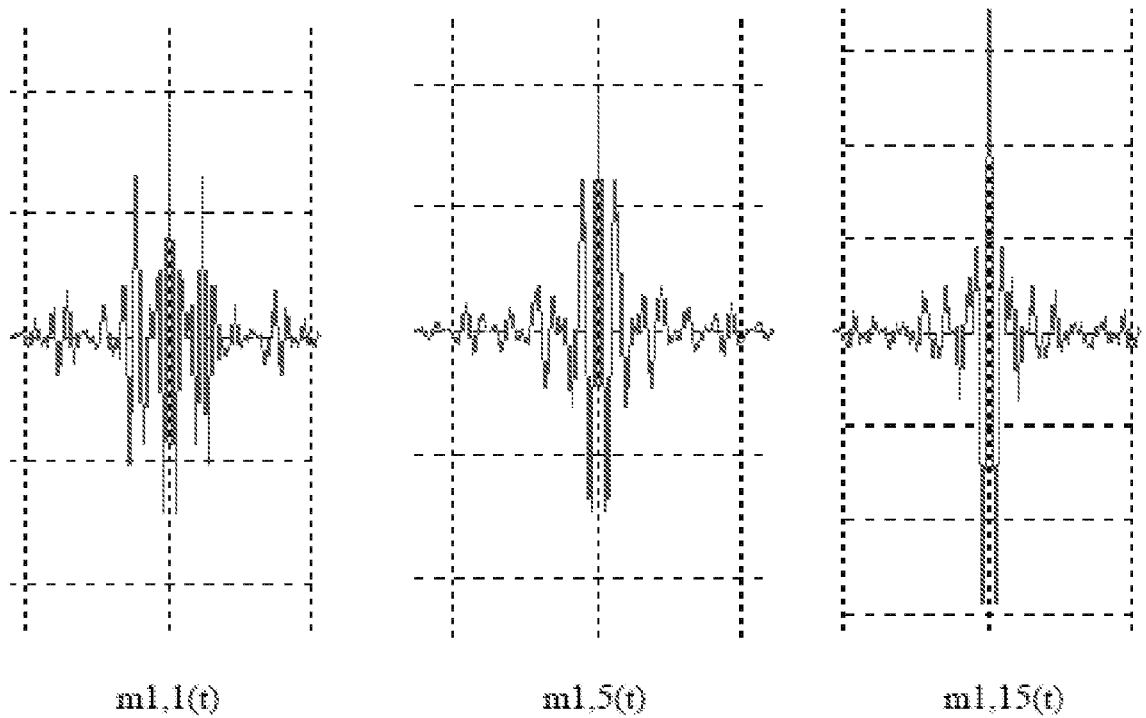
FIG. 27 shows simplified waveforms with OOK applied according to an embodiment of the present invention.

Possible modulations for each waveform are as suggested in FIG. 27. Each waveform can be modulated by using one of the following modulation schemes. The type of modulation to be chosen for a system depends on the required data rate, system complexity, detection method to be used, etc. Each waveform can be modulated using one of the following schemes:

OOK: This is the least complex modulation scheme for WRAN and most other communication systems. The signal can be modulated to two main levels. Either signal level high or low depends on whether the user sends a 1 or a 0.

Antipodal BPSK: This again is a less complex modulation scheme used for low data rate communications. The signal can be modulated using its original signal for a 1 or using a 180 degree phase shifted (or equivalently inverted) signal for a 0. Detection method could be a coherent or differential detection.

OOK+Antipodal BPSK: This scheme combines both OOK and antipodal BPSK schemes together and is mainly used for moderate data rates. A signal can be represented by three main levels, +1, 0, and −1.

n level modulation and nQAM: This can be realized by using multiple levels to represent information. While high date rates can be achieved, very precise signal processing is needed and higher complexity should be inevitable.

A base waveform for each subband can be modulated using one of the above modulation schemes as shown in FIG. 20.

Figure 21:
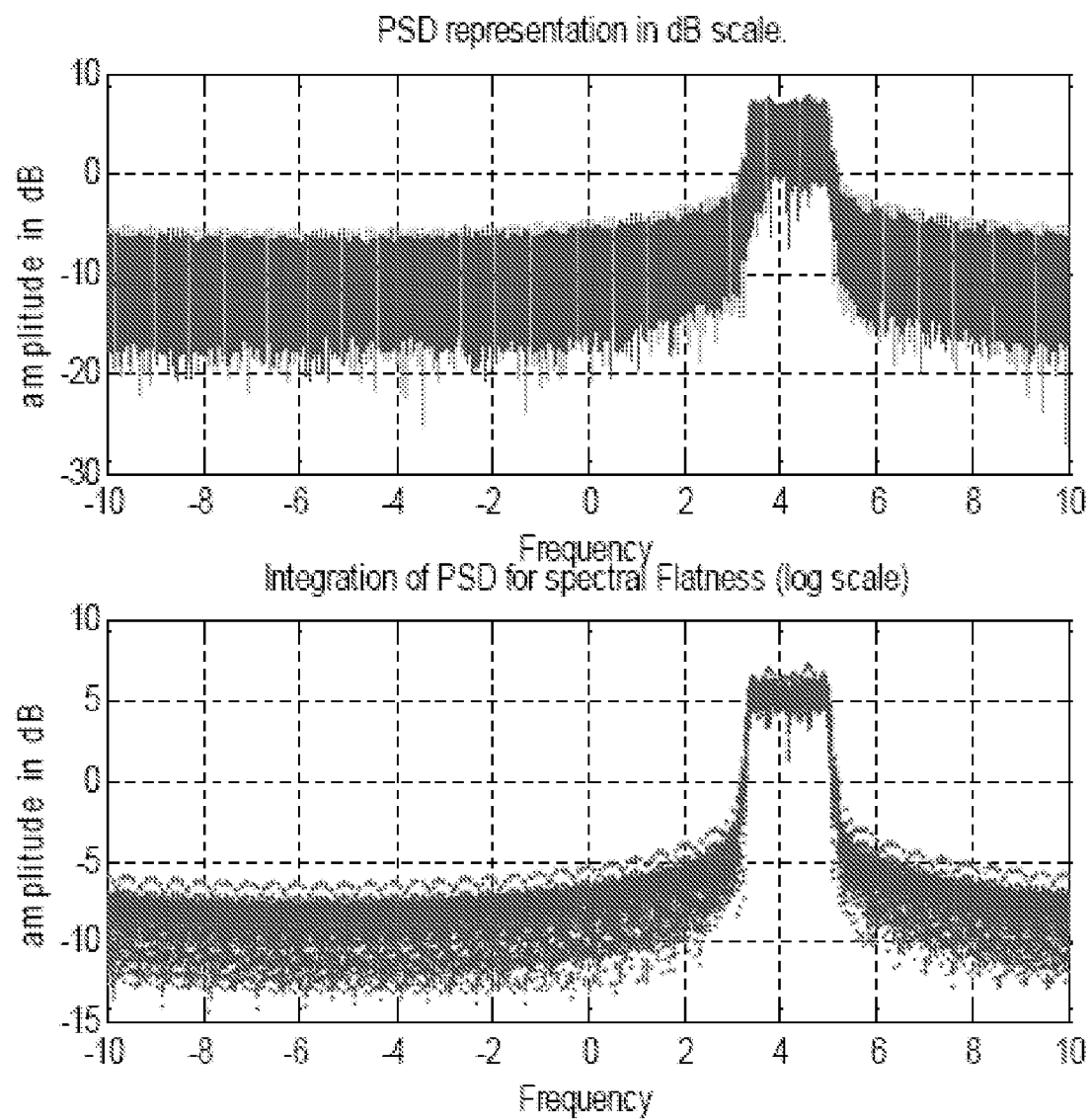
FIG. 21 shows a simplified spectra of base waveform according to an embodiment of the present invention.

Simple Example of Modulation Applied and Its Waveform Signal and Spectrum According to Certain Embodiments FIG. 21 shows a simplified spectra of base waveform according to an embodiment of the present invention. This diagram is merely an example, which should not unduly limit the scope of the claims. One of ordinary skill in the art would recognize many variations, alternatives, and modifications. As shown in this figure, inside the band almost flat spectrum and steep out-of-band rejection/suppression can be achieved. These flatness and our-of-band rejection totally depend on the number of samples for generation of base waveforms, N in certain embodiments of the present invention. As this number increases, they can be improved. The base waveforms invented here have strong points on these aspects. As they have almost flat spectra, more transmit power can be utilized for given frequency bands. Due to steep out-of-band rejection property, the adjacent channel interference can be much reduced.

Figure 22:
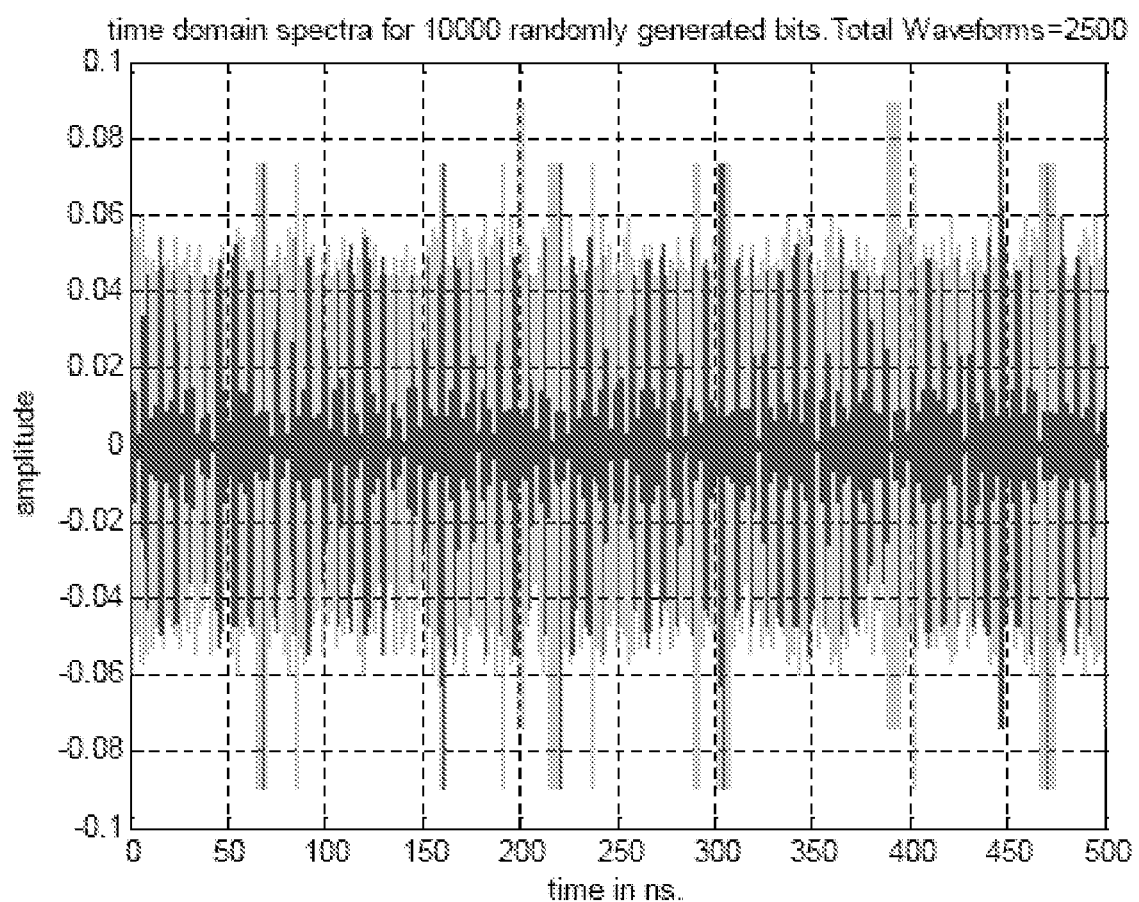
FIGS. 22 and 23 show a simplified signal in time domain and frequency domain respectively for 10000 randomly-generated bits modulated with 16 QAM according to certain embodiments of the present invention.
Figure 23:
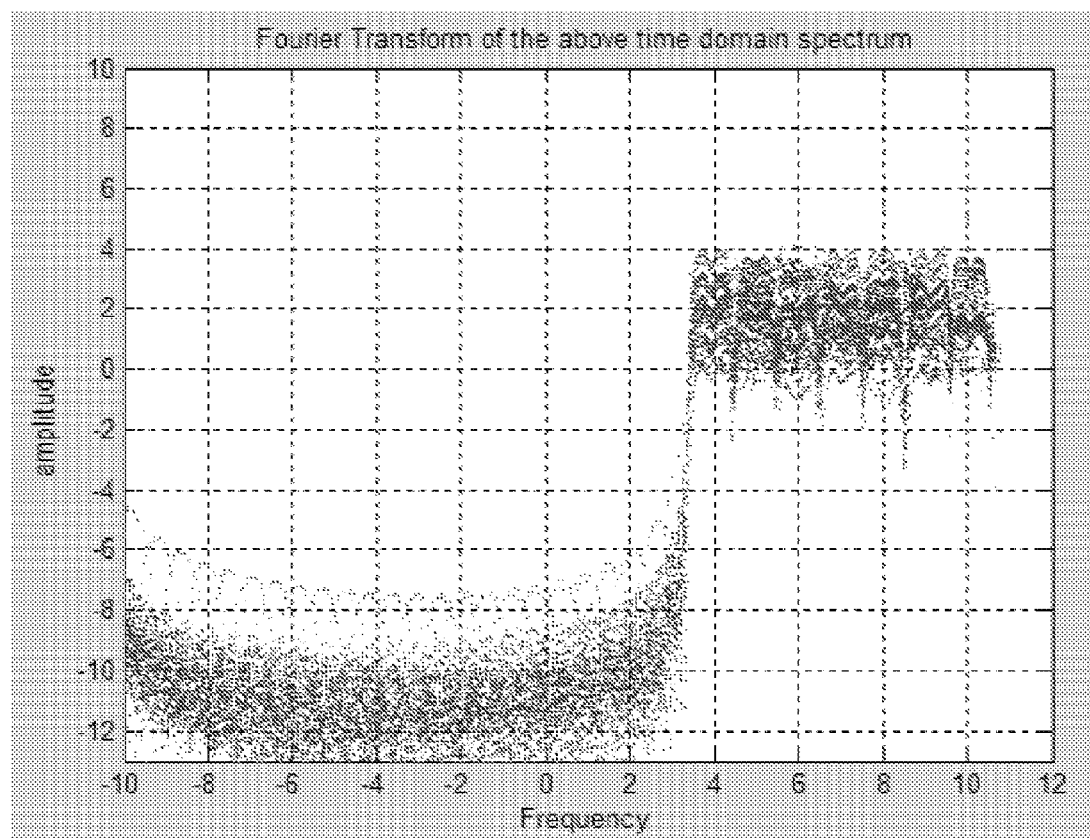

FIGS. 22 and 23 show a simplified signal in time domain and frequency domain respectively for 10000 randomly-generated bits modulated with 16 QAM according to certain embodiments of the present invention. These diagrams are merely examples, which should not unduly limit the scope of the claims. One of ordinary skill in the art would recognize many variations, alternatives, and modifications.

FIG. 22 shows a signal for randomly generated 10000 bits when 16 QAM modulation is applied to its base waveform. Hence 2500 waveforms are transmitted to deliver 10000 bit information. For this case, we are considering a data stream of 10000 bits. Firstly, every four adjacent bits in the data stream are grouped into one block and each block of four bits is represented by one particular time domain waveform. It can be done by just applying a modulation scheme to base waveforms described in the above or by applying one of various modulation schemes invented in the below. As described in the above, the whole frequency band is divided into a fixed number of groups and each group is divided into another fixed number of subbands. How a set of unique time domain waveforms for each group can be generated has been explained in the above. For the signal shown in FIG. 22, just 16 QAM is applied to each base waveform according to the value of a 4-bit block to get a stream of 2500 time domain waveforms. As shown in FIG. 23, spectral flatness of the spectrum for any data stream is preserved.

Number of Combinations for Binary Modulation According to Certain Embodiments

Figure 24:
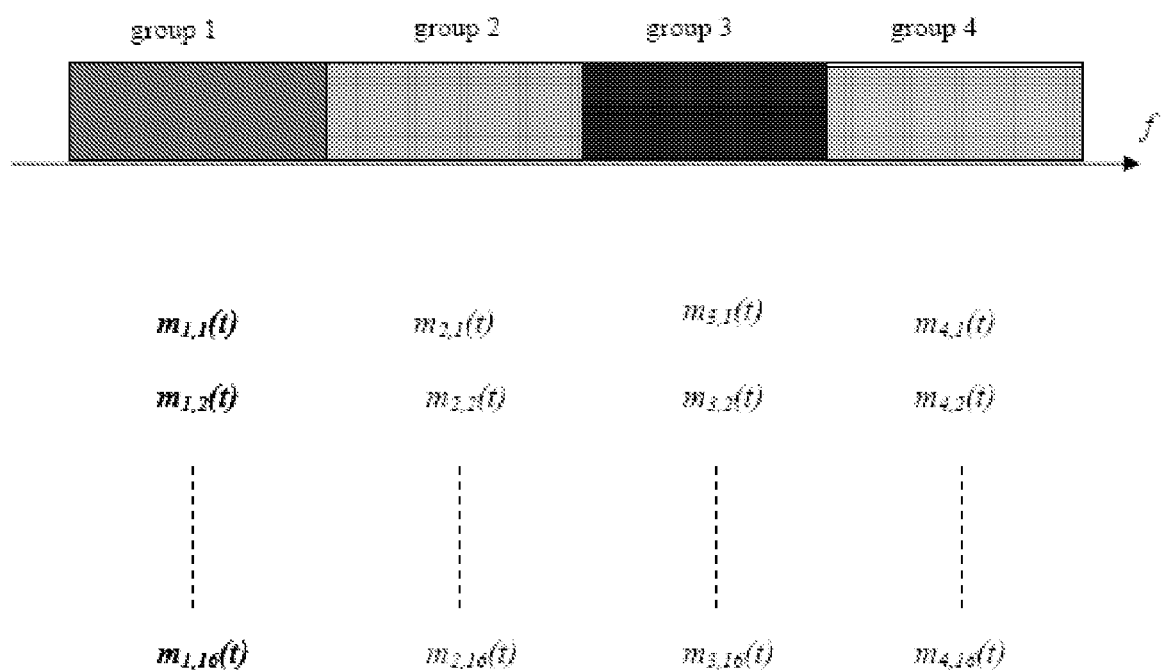
FIG. 24 shows simplified sixteen waveforms for each group with binary modulation applied for each base waveform according to an embodiment of the present invention.

For each subband, there is one base waveform with a unique frequency corresponding to the centre frequency of the subband. Hence there are 16 base waveforms throughout the whole band for the previous example where the whole band is divided into four groups and each group is divided into four subbands. Each waveform is almost orthogonal to each other. There are 16 possible combinations of four base waveforms corresponding to 16 waveforms per group. FIG. 24 shows simplified sixteen waveforms for each group with binary modulation applied for each base waveform according to an embodiment of the present invention. This diagram is merely an example, which should not unduly limit the scope of the claims. One of ordinary skill in the art would recognize many variations, alternatives, and modifications.

For one symbol duration there can be 16 waveforms per group: Each group has 16 waveforms:

$$m1, 1 = 0, m1, 2 = w1, m1, 3 = w2, \ldots ,$$
$$m4, 16 = w13 + w14 + w15 + w16 \text{ for } OOK$$
$$m1, 1 = -w1 - w2 - w3 - w4, \ldots , m4,$$
$$16 = w13 + w14 + w15 + w16 \text{ for } BPSK$$

If a symbol is assigned to each subband (or frequency bit) in a simple manner, sixteen symbols are assigned in the frequency domain because of 16 frequency bins. For n symbol durations in time domain, to provide multiple access and error control coding by having redundancy to represent information using waveforms, 8*n, 4*n, 2*n, and 1*n symbols can be considered while maximally 16*n symbols can be considered when multiple access and error control coding are not considered. n can be specified for each type of devices/communications/applications. Each symbol can be binary. Therefore during one symbol duration, basically up to 16 bit information can be delivered.

Number of Combinations for Ternary Modulation According to Certain Embodiments

This combinational scheme adopts ternary modulation such as OOK+BPSK (−1, 0, +1) modulation scheme. Each subband is assigned with a unique base waveform. Thus there exist a total of 16 base waveforms throughout the whole frequency band for the case considered in the above. Total number of combinational waveforms is (3 possible states)$^4$=81 waveforms per group. 64 waveforms are selected out of 81 waveforms per group so that each waveform can represent 6 bits of information.

Figure 25:
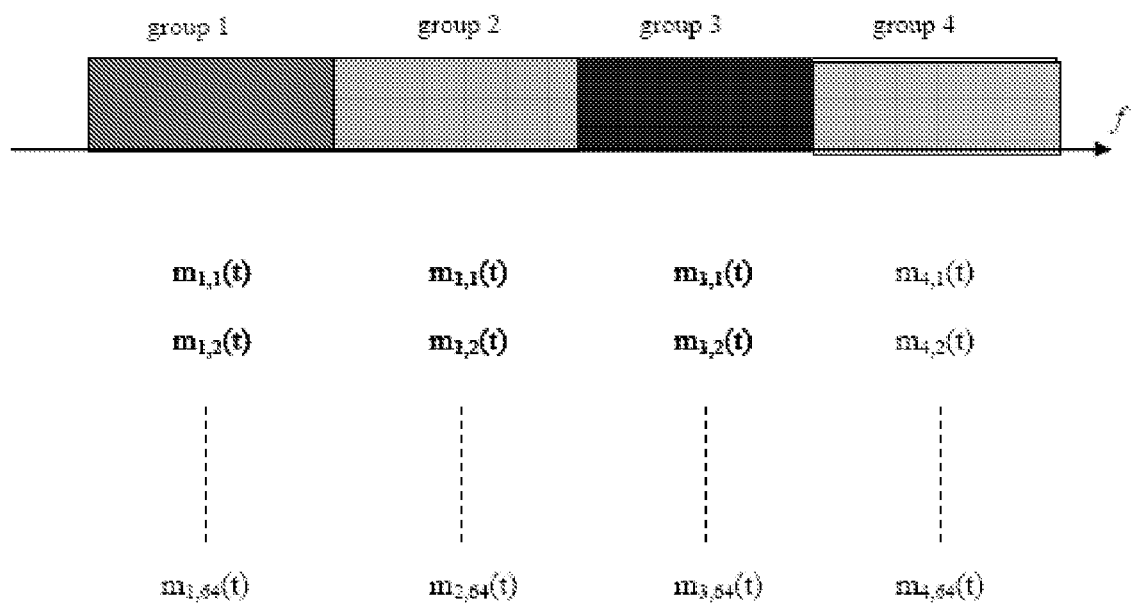
FIG. 25 shows simplified sixty-four waveforms selected for each group with ternary modulation applied for each base waveform according to an embodiment of the present invention.

FIG. 25 shows simplified sixty-four waveforms selected for each group with ternary modulation applied for each base waveform according to an embodiment of the present invention. This diagram is merely an example, which should not unduly limit the scope of the claims. One of ordinary skill in the art would recognize many variations, alternatives, and modifications.

$$m1, 1 = 0, m1, 2 = w1, m1, 3 = w2, \ldots ,$$
$$m4, 16 = w13 + w14 + w15 + w16 \text{ for } OOK$$
$$m1, 1 = -w1 - w2 - w3 - w4, \ldots , m4,$$
$$16 = w13 + w14 + w15 + w16 \text{ for } BPSK$$

If a symbol is assigned to each subband (or frequency bit) in a simple manner, sixteen symbols are assigned in the frequency domain because of 16 frequency bins. For n symbol durations in time domain, to provide multiple access and error control coding by having redundancy to represent information using waveforms, 8*n, 4*n, 2*n, and 1*n symbols can be considered while maximally 16*n symbols can be considered when multiple access and error control coding are not considered. n can be specified for each type of devices/communications/applications. Each symbol can be ternary. Therefore during one symbol duration, basically up to $\log_2(3^{16})$ bit information can be delivered. Additionally, for other m-ary cases, more information can be delivered depending on the value of m.

Modulation Devised for Systems According to Certain Embodiments

Following are the types of modulations introduced in certain embodiments of the present invention which can be applied for most wired or wireless communication systems as well as WRAN systems. Selection of the best modulation scheme totally depends on the operation requirements such as channel requirements, signal environments, services, applications, etc.

These modulation schemes described in the below adopt the concepts already introduced in the above such as base waveforms devised in certain embodiments of the present invention, division of groups and subbands in the frequency domain, and base waveform modulation.

Modulation 1 for Some Embodiments

Figure 26:
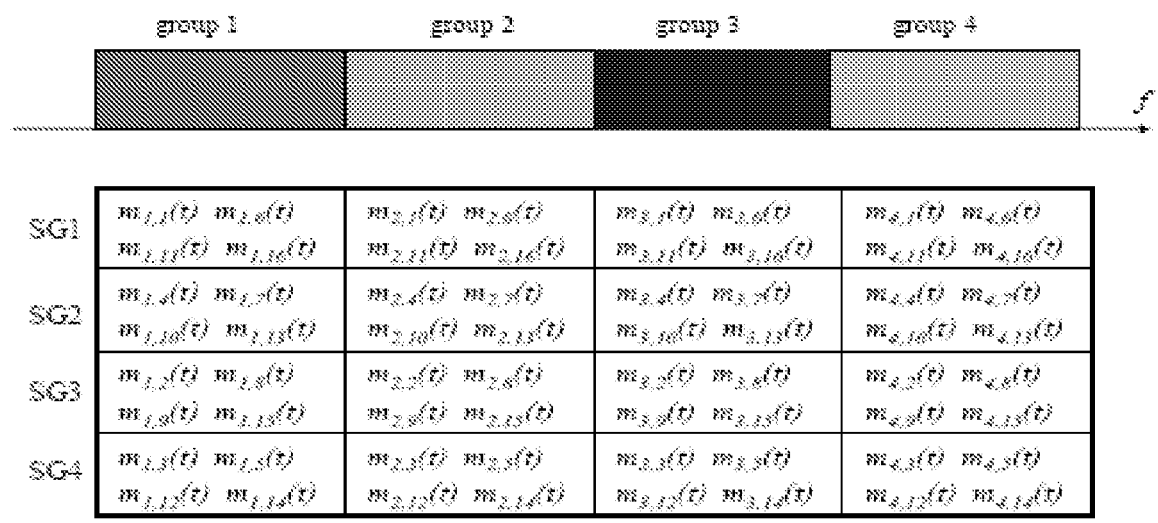
FIG. 26 is a simplified diagram showing subgroups for each group in binary case according to an embodiment of the present invention.

Waveforms of a group are divided into four subgroups. FIG. 26 is a simplified diagram showing subgroups for each group in binary case according to an embodiment of the present invention. This diagram is merely an example, which should not unduly limit the scope of the claims. One of ordinary skill in the art would recognize many variations, alternatives, and modifications.

Four waveforms of a subgroup are mapped to 2 bit information. For example,
m1,1(t)=00 m1,6(t)=01 m1,11(t)=10 m1,16(t)=11 for the first subgroup of Group 1.

Groups can be divided into subgroups so that Hamming distance of codewords represented by waveforms in a subgroup can be maximal. For example,
$m_{1,1}$ (t) represents 0000
$m_{1,2}$ (t) represents 0001
$m_{1,16}$ (t) represents 1111

SG1 picks up four waveforms whose Hamming distance of codewords represented by four waveforms in this subgroup is maximal so that in this subgroup erroneous detection can be minimized.

For this modulation, each user sends the information data using one of subgroups assigned to it while another user sends its information data using another subgroup assigned to it at the same time. Four waveforms for a single group are needed to represent all possible combinations of two bits (00, 01, 10, 11) for a user with a subgroup. Hence, each user incorporates 4 waveforms of a single group. Thus for a 4 group system, 2*4=8 bit information is delivered in one symbol time duration. Each base waveform is modulated using OOK.

FIG. 27 shows simplified waveforms with OOK applied according to an embodiment of the present invention. This diagram is merely an example, which should not unduly limit the scope of the claims. One of ordinary skill in the art would recognize many variations, alternatives, and modifications.

Modulation 2 for Some Embodiments

This modulation is exactly the same as Modulation 1 except that each waveform is modulated by BPSK rather than OOK. Waveforms of a group are divided into four subgroups, as shown in FIG. 26. Four waveforms of a subgroup are mapped to 2 bit information. For example,
m1,1(t)=00 m1,6(t)=01 m1,11(t)=10 m1,16(t)=11 for the first subgroup of Group 1.

Groups can be divided into subgroups so that Hamming distance of codewords represented by waveforms in a subgroup can be maximal. For example,
$m_{1,1}$ (t) represents 0000
$m_{1,2}$ (t) represents 0001
$m_{1,16}$ (t) represents 1111

SG1 picks up four waveforms whose Hamming distance of codewords represented by four waveforms in this subgroup is maximal so that in this subgroup erroneous detection can be minimized.

For this modulation, each user sends the information data using one of subgroups assigned to it while another user sends its information data using another subgroup assigned to it at the same time. Four waveforms for a single group are needed to represent all possible combinations of two bits (00, 01, 10, 11) for a user with a subgroup. Hence, each user incorporates 4 waveforms of a single group. Thus for a 4 group system, 2*4=8 bit information is delivered in one symbol time duration. Each base waveform is modulated using BPSK.

Figure 28:
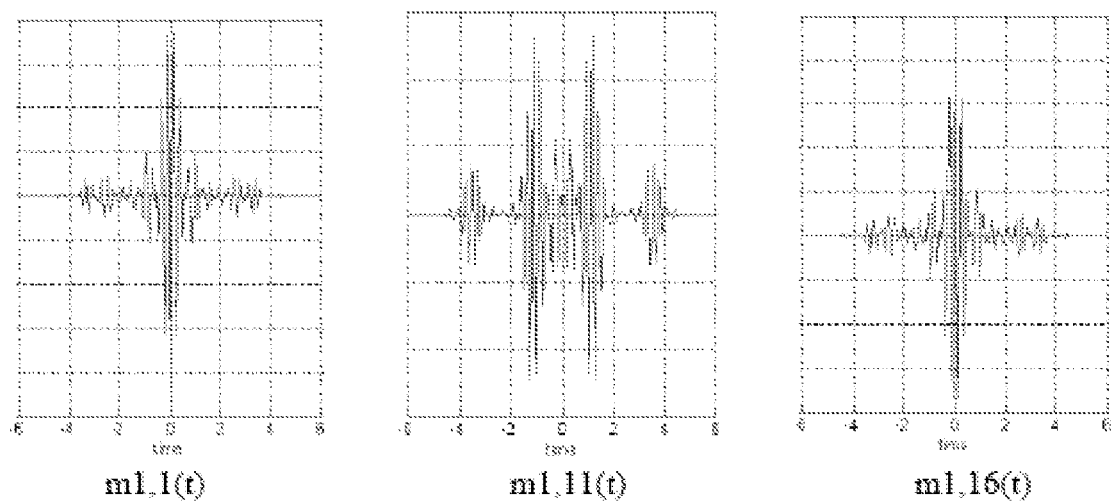
FIG. 28 shows simplified waveforms with BPSK applied according to an embodiment of the present invention.

FIG. 28 shows simplified waveforms with BPSK applied according to an embodiment of the present invention. This diagram is merely an example, which should not unduly limit the scope of the claims. One of ordinary skill in the art would recognize many variations, alternatives, and modifications.

Modulation 3 for Some Embodiments

Sixteen waveforms of a single group are mapped to 4 bit information. For example,
mi,1(t)=0000 mi,6(t)=0101 mi,22(t)=1010 mi,16(t)=1111
For this modulation, each group is assigned to only one user to send information. Thus for one waveform duration only one quarter of the available spectrum is utilized and 4 bit information is delivered. Each waveform is modulated using OOK (0,+1).

Modulation 4 for Some Embodiments

This modulation is exactly the same as Modulation 3 except that each waveform is modulated by BPSK. Sixteen waveforms of a single group are mapped to 4 bit information. For example,
mi,1(t)=0000 mi,6(t)=0101 mi,11(t)=1010 mi,16(t)=1111
For this modulation, each group is assigned to only one user to send information. Thus for one waveform duration only one quarter of the available spectrum is utilized and 4 bit information is delivered. Each waveform is modulated using BPSK (−1,+1)

Modulation 5 for Some Embodiments

Sixteen waveforms of a single group are mapped to 4 bit information. For example,
mi,1(t)=0000 mi,6(t)=0101 mi,11(t)=1010 mi,16(t)=1111.
For this modulation, each user sends information using all four groups at the same time. Thus in one symbol duration 16 bit information is delivered. Data stream is divided into blocks of 4 bits each: consecutive four blocks are assigned to four groups during one symbol duration. Each waveform is modulated using OOK (0,+1).

Modulation 6 for Some Embodiments

This modulation is exactly the same as Modulation 5 except that each waveform is modulated by BPSK. Sixteen waveforms of a single group are mapped to 4 bit information. For example,
mi,1(t)=0000 mi,6(t)=0101 mi,11(t)=1010 mi,16(t)=1111
For this modulation, each user sends information using all four groups at the same time. Thus in one time duration 16 bit information is delivered. Data stream is divided into blocks of 4 bits each: consecutive four blocks are assigned to four groups during one symbol duration. Each waveform is modulated using BPSK (−1,+1).

Modulation 7 for Some Embodiments

Such scheme uses ternary modulation (e.g., OOK+BPSK) to modulate base waveforms. The frequency spectrum is divided into 4 groups. Each group is further subdivided into 4 subgroups. As ternary modulation is used, total of 81 (3 possible states)$^4$=81) waveforms are available for a single group. We consider 64 waveforms for a single group which gives 16 waveforms per subgroup. These 16 waveforms for a single group are mapped to 4 bit (16-ary) information. For example
mi.1(t)=0000 mi.6(t)=0110 mi.11(t)=1011 mi.16(t)=1111
for the first subgroup of Group1.

Groups can be divided into subgroups so that Hamming distance of codewords represented by waveforms in a subgroup can be maximal. For example,
$m_{1,1}(t)$ represents −1,−1,−1−1
$m_{1,2}(t)$ represents −1,−1,−1,0
$m_{1,81}t)$ represents 1,1,1,1
SG1 picks up four waveforms whose Hamming distance of codewords represented by 16 waveforms in this subgroup is maximal so that in this subgroup erroneous detection can be minimized.

Each user sends information using one subgroup of each group. This scheme uses full frequency spectrum simultaneously. Thus, in one time duration 16 bit information is delivered. A total of four different users can send information signals using this modulation scheme at the same time. This scheme can be used as multiple access technique for small number of user groups up to four.

Modulation 8 for Some Embodiments

This scheme uses ternary modulation (e.g., OOK+BPSK) to modulate base waveforms. 64 waveforms of a group are mapped to 6 bit (64-ary) information. For example, $m1,1(t) = 000000$   $m1,7(t) = 000110$   $m1,12(t) = 001011$
$m1,17(t) = 010000$ $m1,18(t) = 010001$ $m1,34(t) = 100001$
$m1,51(t) = 110010$ $m1,64(t) = 111111$ Each user can send the information using no more than one group simultaneously for a given time duration. Therefore, in one time duration 6 bit information is delivered. Also, only a quarter of the complete spectrum is used during transmission. This scheme can be used as multiple access technique for small number of user groups up to four by assigning different group to four different users or user networks.

Modulation 9 for Some Embodiments

This modulation scheme uses ternary modulation (e.g., OOK+BPSK) to modulate base waveforms. 64 waveforms of a group are mapped to 6 bit (64-ary) information. For example, $m1,1(t) = 000000$   $m1,7(t) = 000110$   $m1,12(t) = 001011$
$m1,17(t) = 010000$ $m1,18(t) = 010001$ $m1,34(t) = 100001$
$m1,51(t) = 110010$ $m1,64(t) = 111111$ Each user in a communication network sends information using all four groups. In one time duration 4*6=24 bit information is delivered. This modulation scheme uses full frequency spectrum by one user at one instant (or in one symbol duration).

Modulation 10 for Some Embodiments

Figure 29:
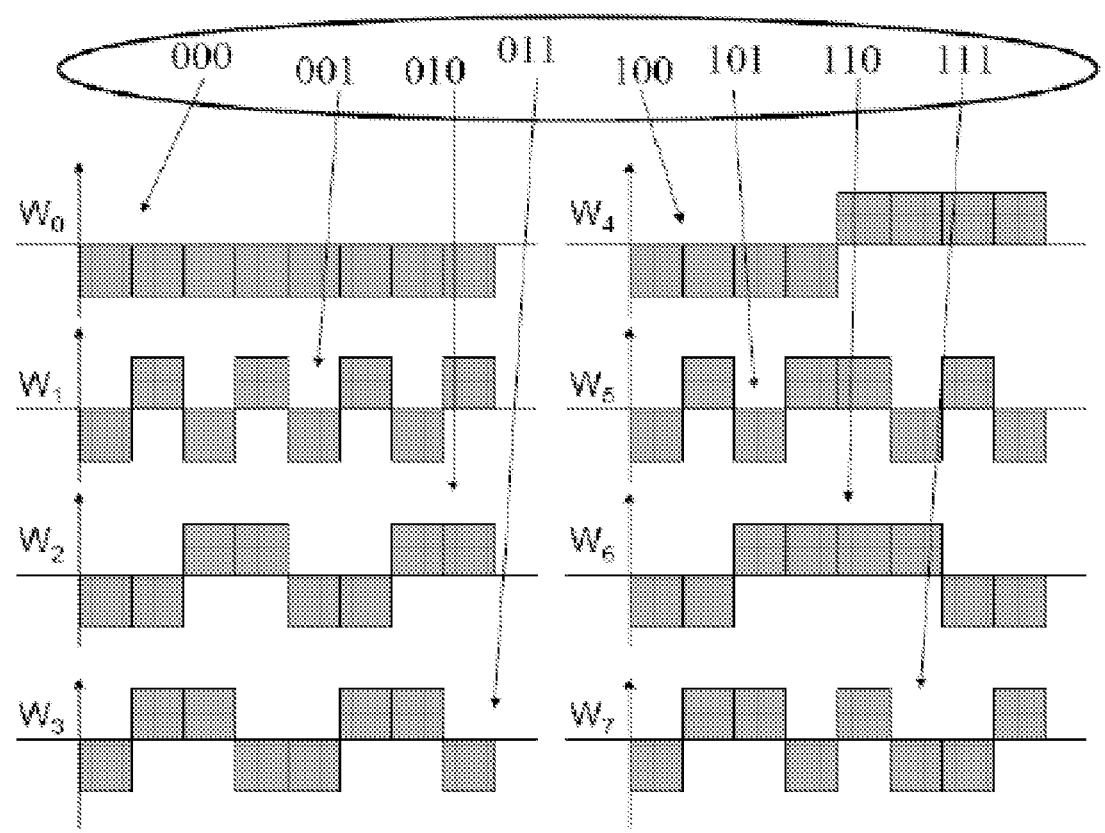
FIG. 29 is a simplified diagram showing short orthogonal code (Walsh code) used for embodiments of the present invention.

This modulation scheme uses short orthogonal PN (pseudo random) codes such as Walsh code. FIG. 29 is a simplified diagram showing short orthogonal code (Walsh code) used for embodiments of the present invention. This diagram is merely an example, which should not unduly limit the scope of the claims. One of ordinary skill in the art would recognize many variations, alternatives, and modifications.

For the case with this code, eight subbands of two groups are coded with an 8 bit Walsh code and represent 3 bits using BPSK because eight Walsh codes can represent 3 bit information. With four groups, 2*3=6 bit information can be coded. Each user sends information using all four groups. Thus for one symbol duration, 6 bit information is delivered. Each waveform is modulated by BPSK (+1,−1). This modulation scheme is more robust to interference because Hamming distance of Walsh codes is 4.

Data Rate According to Certain Embodiments

FIG. 30 is a simplified diagram showing comparison results of modulation schemes for a simple case with the symbol rate of 2 Msamples/sec, 4 groups in the whole band, and 4 subbands/group according to embodiments of the present invention. This diagram is merely an example, which should not unduly limit the scope of the claims. One of ordinary skill in the art would recognize many variations, alternatives, and modifications. If parameters are assumed to include a symbol rate of 2 Msymbols/sec, one symbol duration is about 500 ns.

Multiple Access According to Certain Embodiments

Multiple access schemes for WRAN systems are to be devised. Although the explanation is made only for WRAN systems, these schemes can be applied to other wireless systems depending on the environments and system requirements.

Possible multiple access schemes considered for WRAN systems are as follows:

Frequency hopping (FH) among subbands or groups: It is not efficient because of higher system complexity and less usage of power;

TDMA: It is less time efficient because small portion of time can be used and more difficult to synchronize;

Direct-sequence (DS) CDMA: It is less time efficient and more complex to process;

FDMA/OFDMA: It needs more complex processing.

Figure 31:
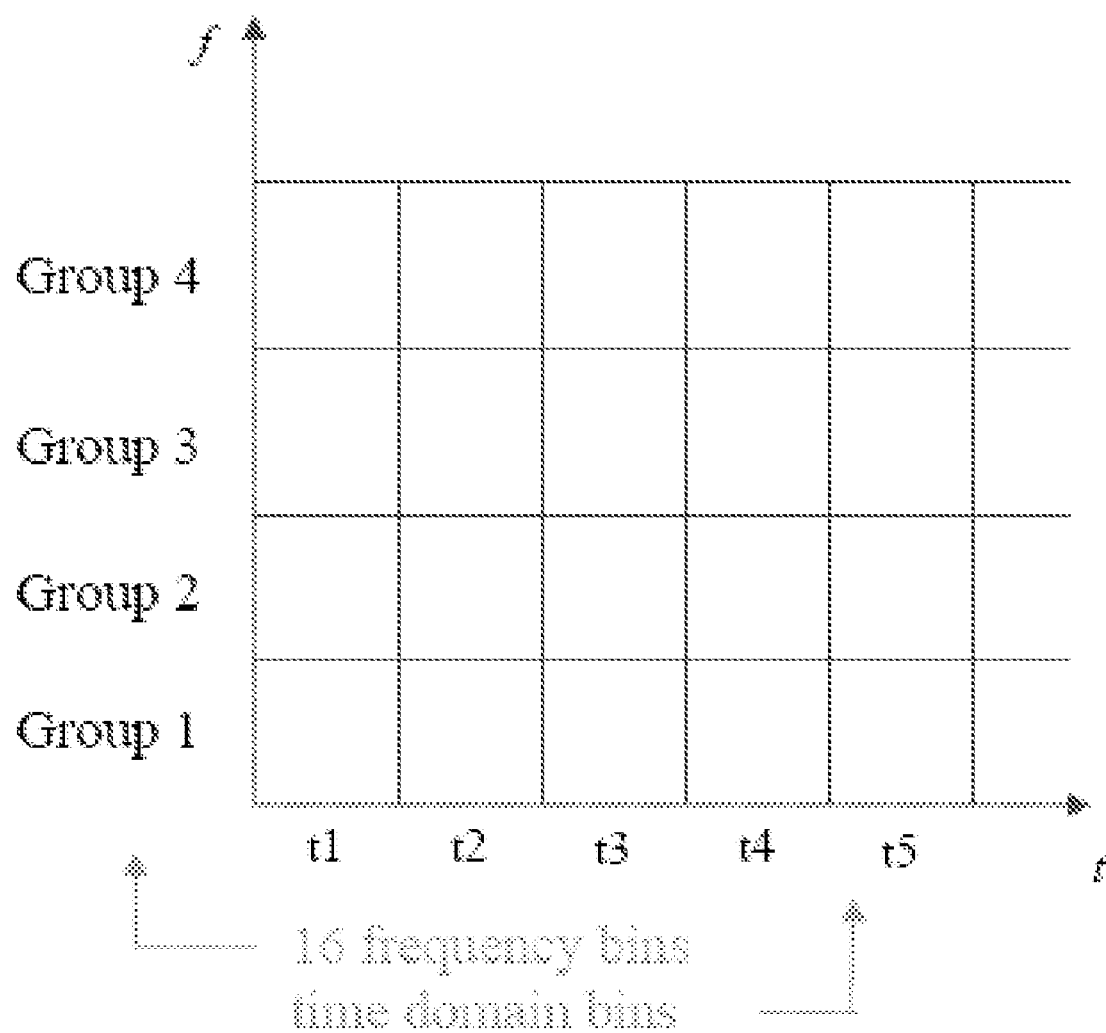
FIG. 31 is a simplified diagram showing frequency domain bins and time domain bins for multiple access according to an embodiment of the present invention.

Therefore new multiple access schemes need to be devised. In some embodiments of the present invention, frequency domain bins are considered as well as time domain bins. FIG. 31 is a simplified diagram showing frequency domain bins and time domain bins for multiple access according to an embodiment of the present invention. This diagram is merely an example, which should not unduly limit the scope of the claims. One of ordinary skill in the art would recognize many variations, alternatives, and modifications.

While most communication systems utilize only one of frequency domain bins and time domain bins to achieve multiple access such as FDMA, TDMA, and CDMA, multiple access schemes invented here utilize both domain bins. According to an embodiment of the present invention, one possible way is that each frequency bin is mapped to one of orthogonally encoded symbols using an orthogonal code.

Figure 32:
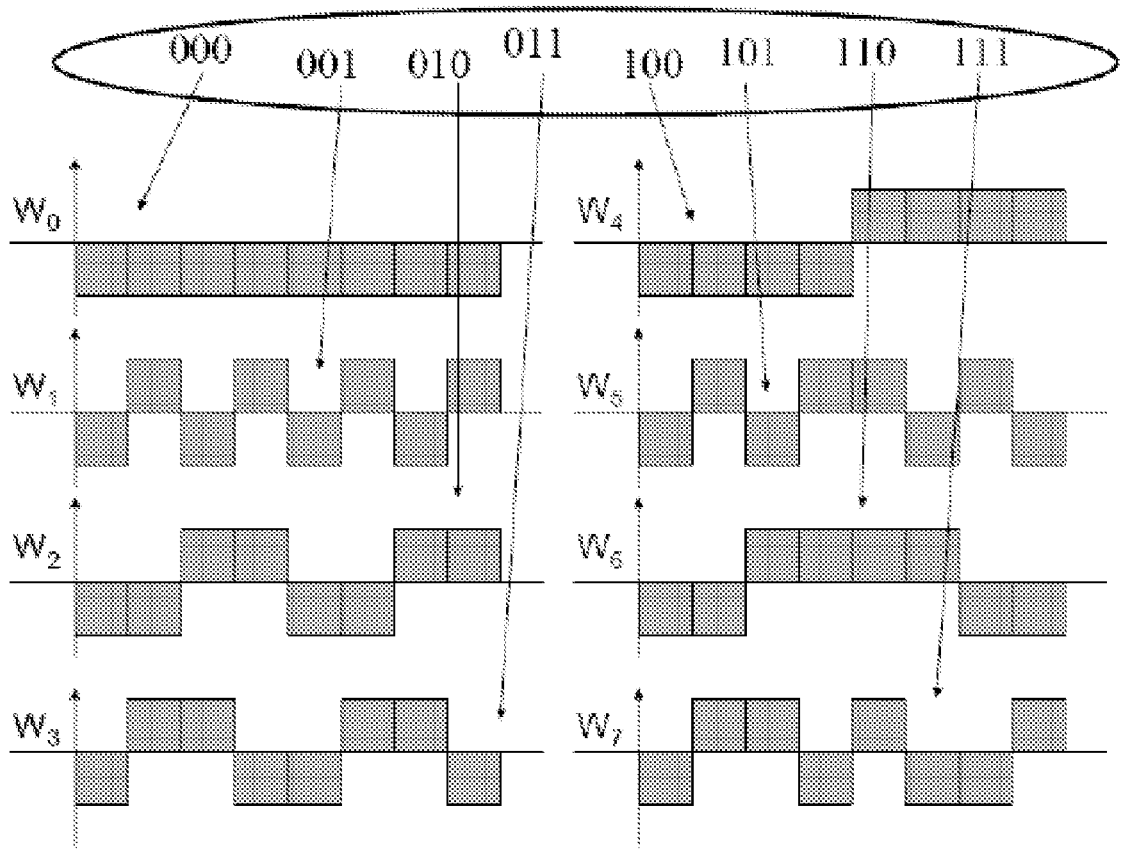
FIG. 32 is a simplified diagram showing orthogonal code, Walsh code, that can be applied to frequency bins for multiple access according to an embodiment of the present invention.

FIG. 32 is a simplified diagram showing orthogonal code, Walsh code, that can be applied to frequency bins for multiple access according to an embodiment of the present invention. This diagram is merely an example, which should not unduly limit the scope of the claims. One of ordinary skill in the art would recognize many variations, alternatives, and modifications. For example, two eight bit Walsh codes are assigned to four groups which have 16 bins—2*8 bins.

Devised multiple access schemes are as follows using an orthogonal PN (pseudo random) code. Any simple orthogonal codes can be applied, but in certain embodiments of the present invention, multiple access schemes are explained using Walsh codes:

An orthogonal set of 8 8-bit Walsh codes is used. This code has maximum autocorrelation and minimum (or actually zero) crosscorrelation with each other as other orthogonal codes do. One code consists of 8 bits which corresponds to 8 frequency domain bins. Minimal Hamming distance of this code set is 4. It means it has the largest Hamming distance among this kind of codes. Therefore one frequency bin error can be corrected while three bin errors can be detected. It works as an ECC code and hence increases robustness of the system. For the case that 16 subbands exist in the whole band, $8^2=64$ simultaneously operated users can be accommodated because two 8 bit codes can be assigned to whole 16 subbands. For one user, two Walsh codes (16 bits) are assigned. Thus one time domain bin is occupied by two codes; two codes represent one bit; one time domain bin represents one bit; one time domain bit deliver one bit. Hamming distances between two user codes are 4 and 8. It means considerable number of errors can be controlled. For each frequency bin waveform, any of base waveform modulation schemes such as BPSK, QPSK, and 64 QAM can be applied depending on signal environments—or depending on the distance between a user CPE and the base station.

Following are the multiple access schemes devised for WRAN systems according to embodiments of the present invention:

Multiple Access A for Some Embodiments

This multiple access scheme uses modulation techniques 1, 2 and 7 to transmit the data. The whole frequency spectrum given is divided into a fixed number of groups whish have equal bandwidths. Each of these groups has a fixed number of waveforms. These waveforms are grouped into another fixed number of subgroups as described in FIG. 33. Therefore each subgroup has equal number of waveforms assigned to it. One subgroup per group is assigned to each user or a user group. For a single waveform duration, in a typical case introduced in the above, four users or user groups can simultaneously transmit signals for the data. All frequency groups can be occupied by the signals simultaneously, thereby utilizing full spectrum for transmission purpose. An advantage of such systems is that full power allocated by the frequency mask can be used for transmission.

Multiple Access B for Some Embodiments

This multiple access scheme uses modulation techniques 3, 4 and 8 in order to transmit the data. For these modulation schemes, each user sends information using only one group at one instant. Thus in one time duration 4 symbol information is delivered. Total of four users or user groups can be operated using this scheme. Also this scheme uses frequency band of one group. Hence only a quarter of the total power allowed by frequency mask can be used.

Multiple Access C for Some Embodiments

For this scheme an orthogonal code is used as described in the above. As an example, an orthogonal set of 8 8-bit Walsh codes is used in such a way that they have maximum auto-correlations among them while maintaining minimum cross correlations with each other. A single code is assigned to 8 frequency bins in this example. Hamming distance of these codes is 4. One frequency bin error can be corrected while three bin errors can be detected. It works as an ECC code which increases robustness. With this scheme eight simultaneously operated users can be supported. For a single user, one code is assigned. One time domain bin is occupied by two codes. Each code represents one bit. Thus two bits of information are delivered during one time domain bin. Hamming distances between two codewords corresponding to two users is 4. For each frequency bin waveform, any symbol modulation such BPSK, QPSK, and nQAM can be applied according to signal environments.

Multiple Access D for Some Embodiments

For this scheme an orthogonal code is used as described in the above. As an example, an orthogonal set of 8 8-bit Walsh code is used in such a way that they have maximum autocorrelations among them while maintaining minimum cross correlations with each other. A single code is assigned to 8 frequency bins in this example. Hamming distance of these codes is 4. One frequency bin error can be corrected while three bin errors can be detected. It works as an ECC code which increases robustness. The difference between this scheme and Multiple Access C is that in this scheme two 8-bit Walsh codes are assigned to one user. Hence with this scheme 64 simultaneously operated users can be supported. For one user, two Walsh codes (16 bits) are assigned. One time domain bin is occupied by two codes. Two codes represent one bit. One time domain bin represents one bit. Thus with one time domain bin one bit can be delivered. Hamming distance of codewords corresponding to any two users or user groups is 4. For each frequency bin waveform, any symbol modulation such BPSK, QPSK, and nQAM can be applied according to signal environments.

Performance Analysis According to Certain Embodiments

Spectrum for a Randomly Generated Data Stream for Some Embodiments

For this case, a data stream of 10000 bits is considered. Firstly, every four adjacent bits in the data stream are grouped and these four bits are represented by one particular time domain waveform. How 16 unique time domain waveforms for each group can be generated has been described. Thus we get a stream of 2500 time domain waveforms.

Figure 33:
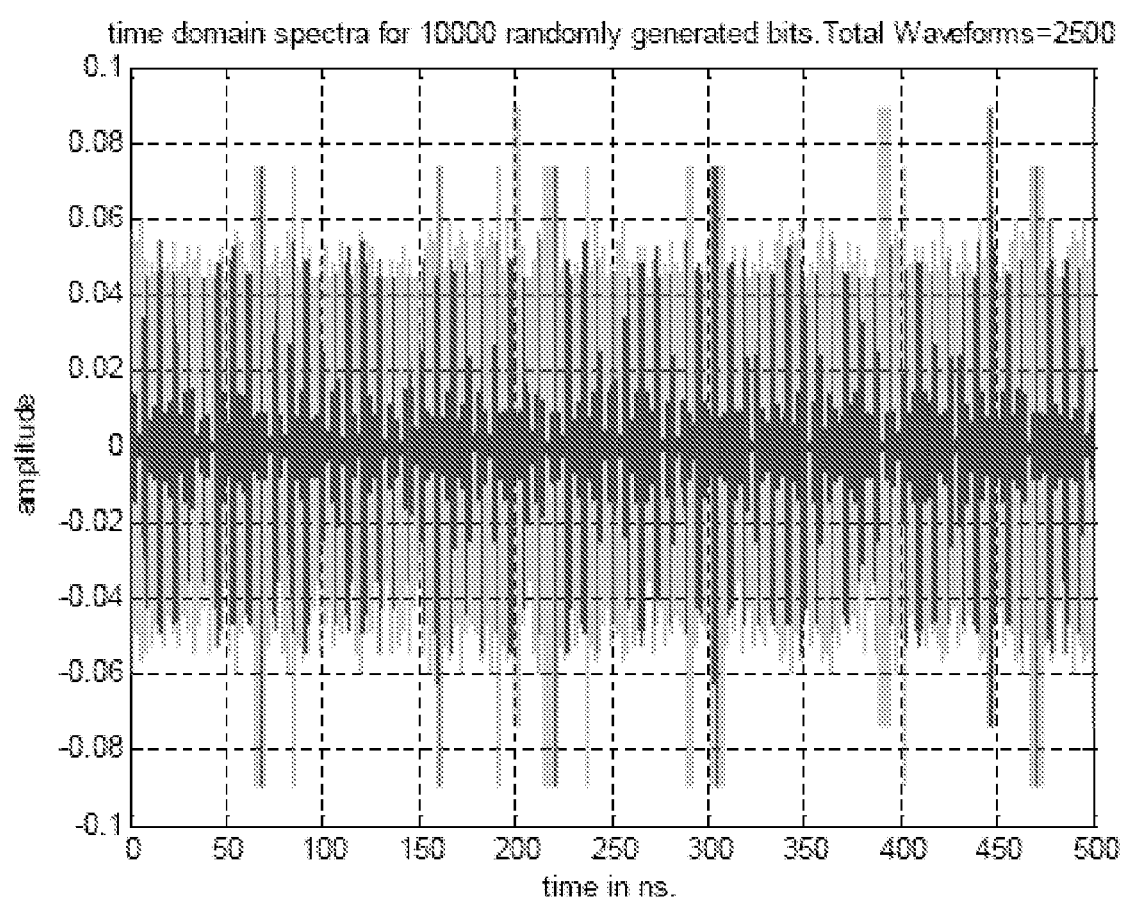
FIG. 33 is a simplified diagram showing a time-domain signal for 10000 randomly generated bits modulated with 16 QAM according to an embodiment of the present invention.

FIG. 33 is a simplified diagram showing a time-domain signal for 10000 randomly generated bits modulated with 16 QAM according to an embodiment of the present invention. This diagram is merely an example, which should not unduly limit the scope of the claims. One of ordinary skill in the art would recognize many variations, alternatives, and modifications.

Following are the two main criteria that we used to evaluate the technical properties of the waveforms after performing Fourier Transform—flatness inside the band and out-of-band rejection (or suppression):

Flatness Inside the Band for Some Embodiments

Figure 34:
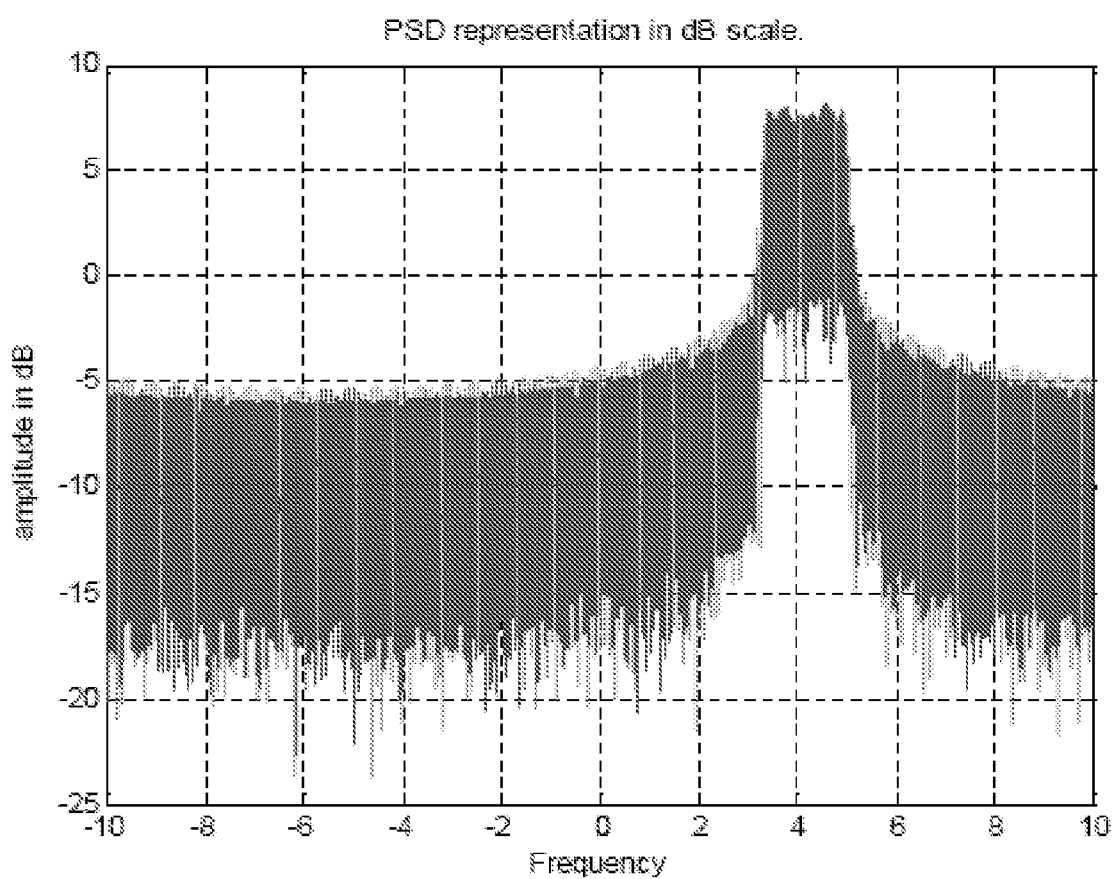
FIGS. 34 and 35 are simplified diagrams showing a frequency-domain spectrum of a group according to an embodiment of the present invention.
Figure 35:
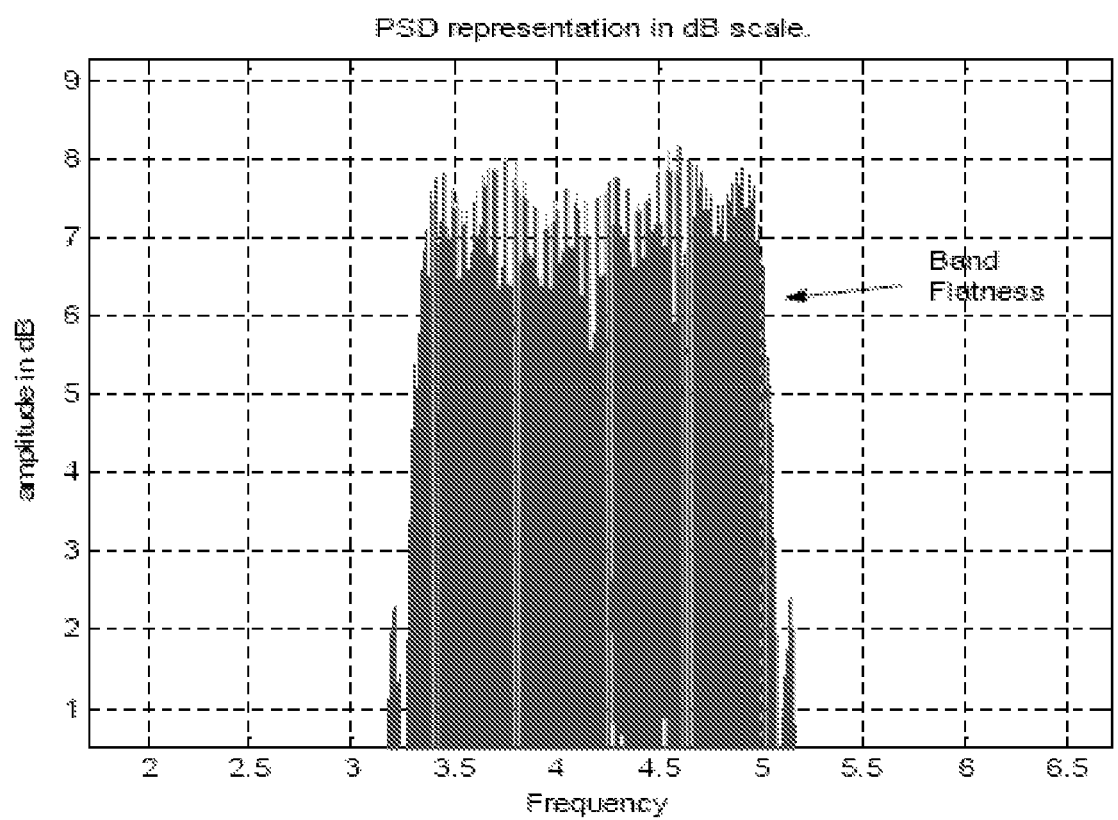

FIGS. 34 and 35 are simplified diagrams showing a frequency-domain spectrum of a group according to an embodiment of the present invention. These diagrams are merely examples, which should not unduly limit the scope of the claims. One of ordinary skill in the art would recognize many variations, alternatives, and modifications.

To represent the spectral flatness, one particular group has been chosen. It is important to note that PSD is represented in dB scale in FIGS. 34 and 35 as spectral flatness is measured in dB. From FIG. 35, which is obtained by zooming up the spectral deviations observed in FIG. 34, the band flatness is measured at around amplitude close to 6.5 dB. For a high quality system flatness should be below 1 dB. For the waveforms devised according to certain embodiments of the present invention, it is noteworthy that the flatness is less than 1 dB as shown in FIG. 35.

The band which extends from 3.1 GHz to 4.8 GHz is picked up to represent one group. Amplitude content is not constant throughout the band. One reason for greater deviation could be the presence of spikes and jitters at certain frequency components. Thus, smoothing process is required to eliminate the presence of spikes to achieve smoother PSD spectra.

Figure 36:
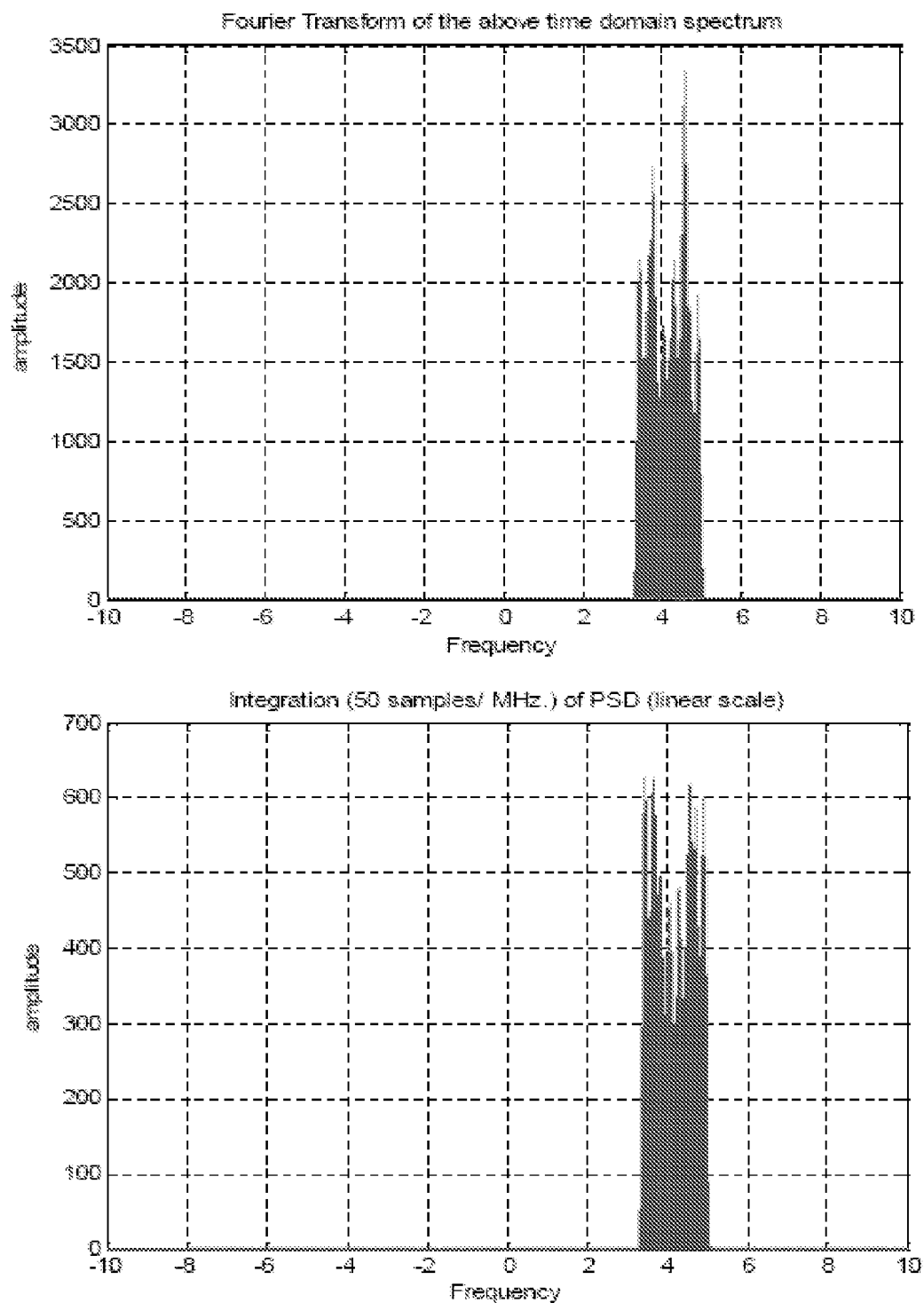
FIG. 36 shows simplified spectra of a signal for a randomly generated 100000 bit data for a group according to an embodiment of the present invention.
Figure 37:
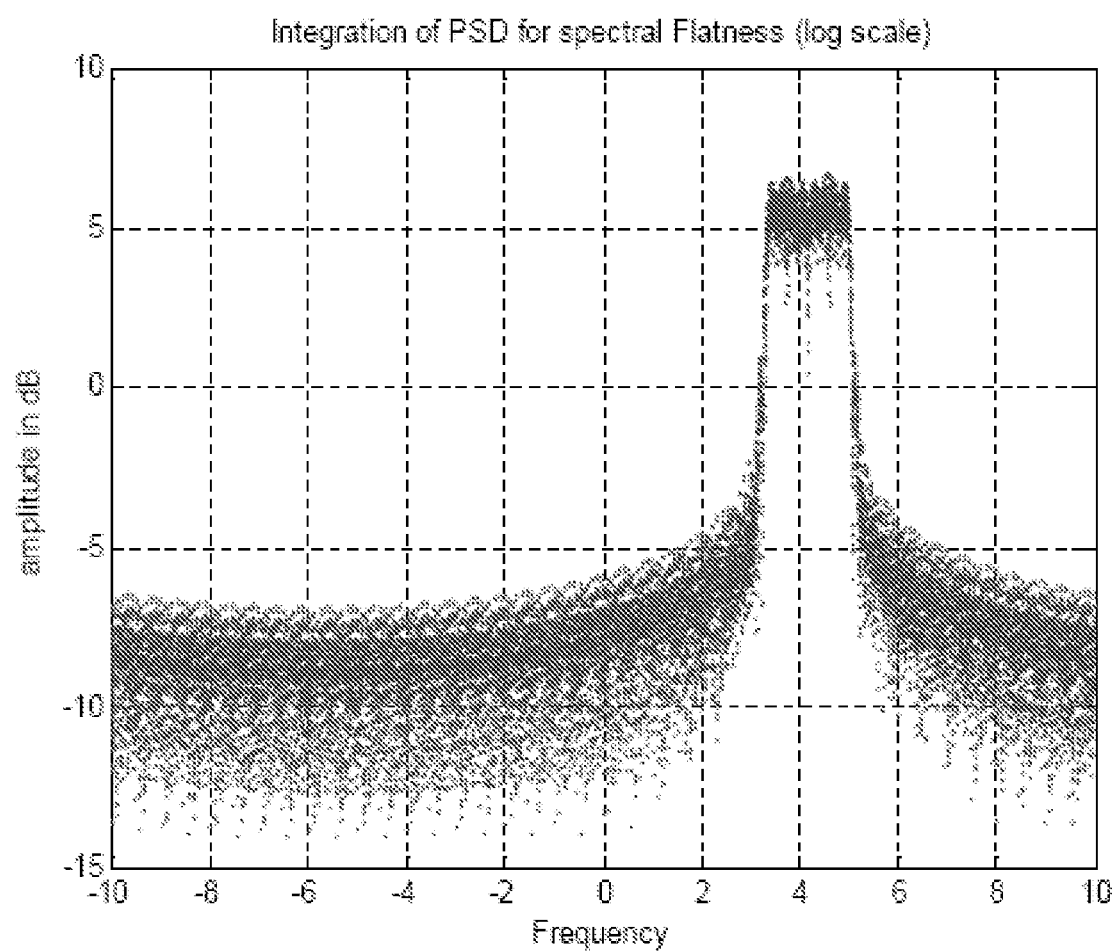
FIG. 37 shows a simplified spectrum of a signal for a randomly generated 100000 bit data for a group in a dB scale according to another embodiment of the present invention.

Total 1000000 samples are taken again to get the PSD spectrum. Integration on 50 samples/MHz using Matlab software is performed to get one PSD component in the spectrum. FIG. 36 shows simplified spectra of a signal for a randomly generated 100000 bit data for a group according to an embodiment of the present invention, and FIG. 37 shows a simplified spectrum of a signal for a randomly generated 100000 bit data for a group in a dB scale according to another embodiment of the present invention. These diagrams are merely examples, which should not unduly limit the scope of the claims. One of ordinary skill in the art would recognize many variations, alternatives, and modifications.

The above representation of PSD is done in dB for vertical amplitude axis while PSD is integrated for each MHz for horizontal axis. It can be observed from this figure that the spectral flatness in the above case is less than 1 dB which is a good improvement.

Figure 38:
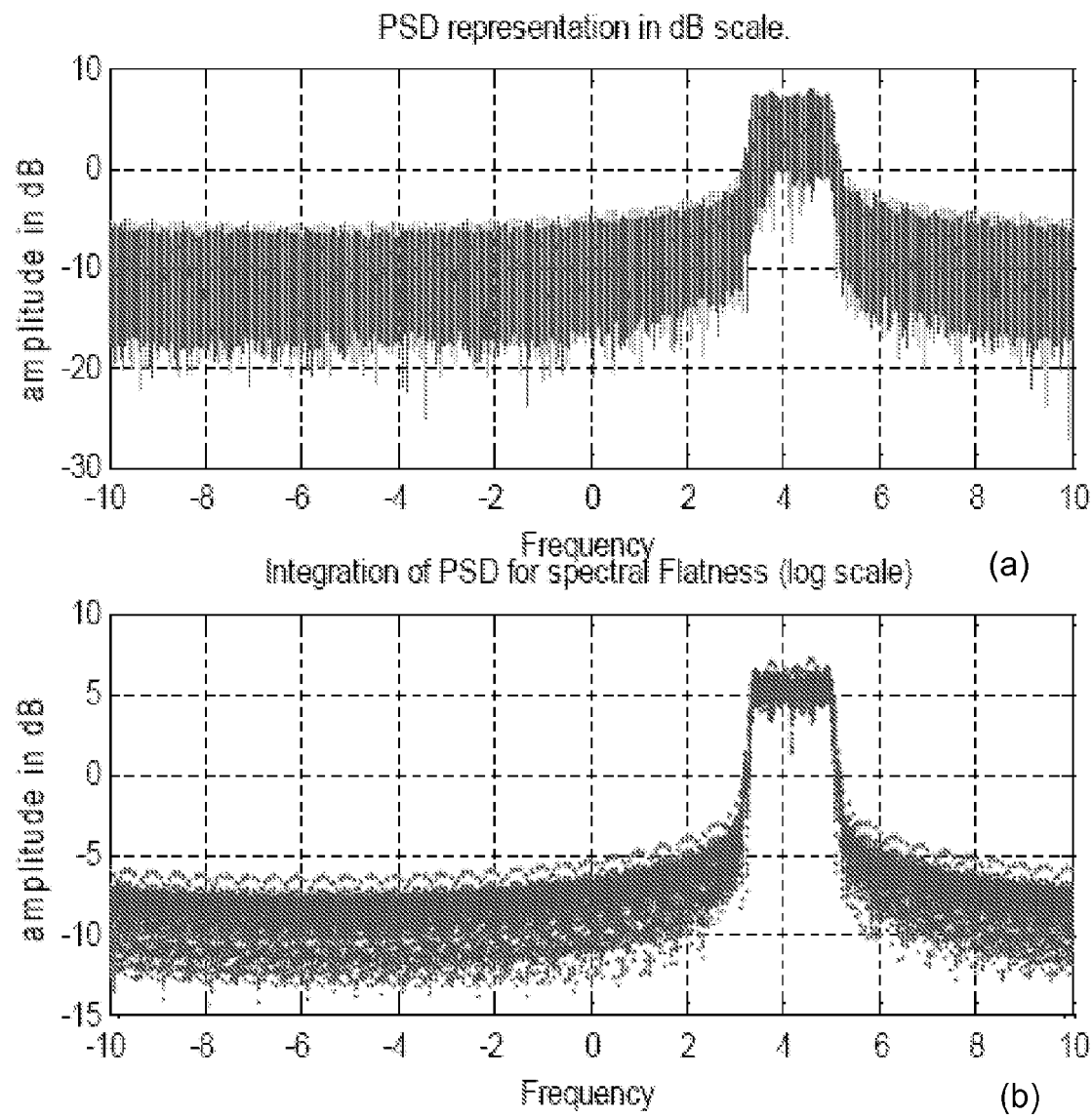
FIGS. 38(a) and (b) show simplified comparison of spectral flatness for two cases according to an embodiment of the present invention.

FIGS. 38(a) and (b) show simplified comparison of spectral flatness for two cases according to an embodiment of the present invention. These diagram are merely examples, which should not unduly limit the scope of the claims. One of ordinary skill in the art would recognize many variations, alternatives, and modifications. FIG. 38(a) shows frequency components taken in Hz and FIG. 38(b) shows frequency components taken in MHz.

Suppression for Some Embodiments

Another criterion for measuring the quality of the waveform is suppression in the out-of-band in its frequency domain spectra. From FIG. 38(a) and (b), it is observed that the suppression is around 14 dB for the case. However, as mentioned earlier, flatness and suppression depend on the number of samples per waveform. Therefore to achieve higher flatness and suppression, sampling rates should be increased for one fixed symbol duration.

Systems According to Certain Embodiments

Figure 39:
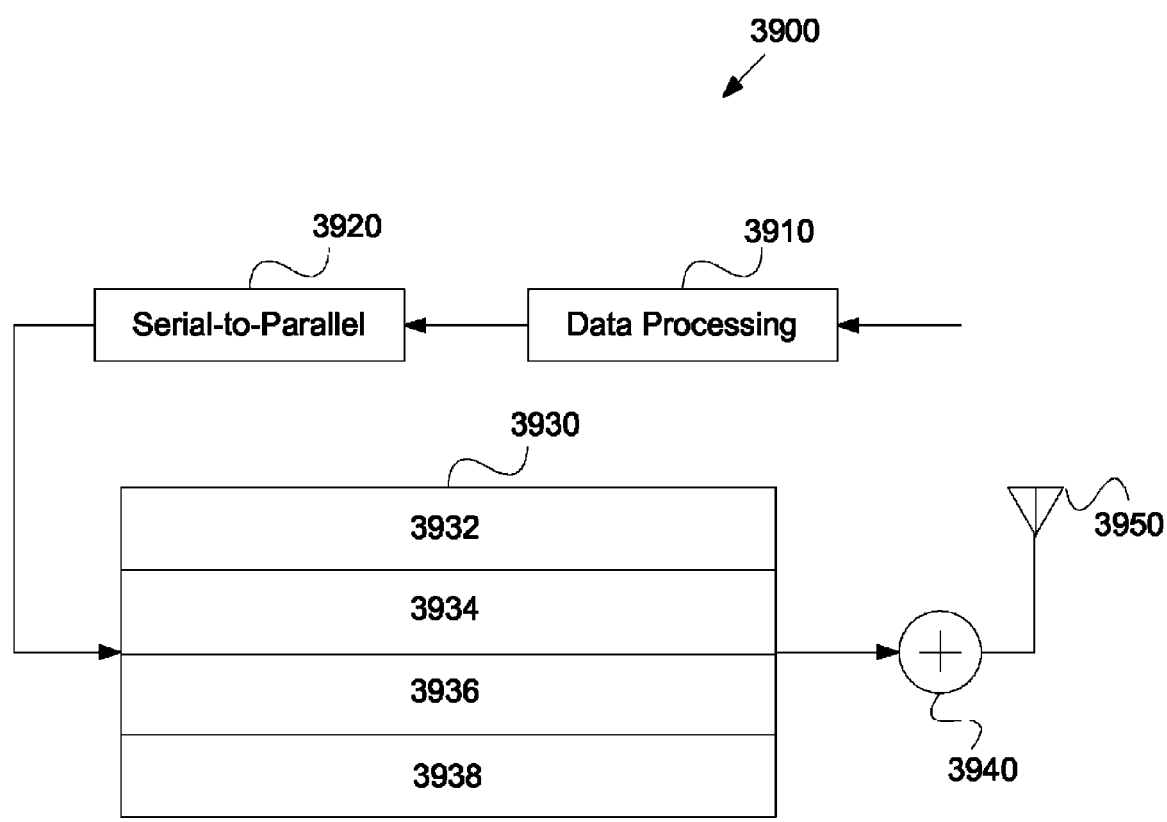
FIG. 39 is a simplified system for transmitting data in a wireless network according to an embodiment of the present invention.

FIG. 39 is a simplified system for transmitting data in a wireless network according to an embodiment of the present invention. This diagram is merely an example, which should not unduly limit the scope of the claims. One of ordinary skill in the art would recognize many variations, alternatives, and modifications. The system 3900 includes a data processing component 3910, a serial-to-parallel converter 3920, a plurality of waveform generation and modulation components 3930, a combination component 3940, and an antenna 3950. Although the above has been shown using a selected group of components for the system 3900, there can be many alternatives, modifications, and variations. For example, the plurality of waveform generation and modulation components 3930 is combined into or replaced by one waveform generation and modulation component. In another example, the system 3900 can perform the method 400. Other components may be inserted to those noted above. Depending upon the embodiment, the arrangement of components may be interchanged with others replaced. Further details of these components are found throughout the present specification and more particularly below.

The data processing component 3910 is configured to receive and process a data signal. For example, source encoding, channel encoding, interleaving, and/or encryption are applied to the received data signal. The serial-to-parallel converter 3920 is coupled to the data processing component. For example, serial-to-parallel conversion is applied to data carried by the data signal.

The plurality of waveform generation and modulation components 3930 is coupled to the serial-to-parallel converter 3920. In one embodiment, the plurality of waveform generation and modulation components 3930 is configured to generate a first plurality of waveforms and modulate the first plurality of waveforms based on at least information associated with the data signal. For example, the first plurality of waveforms is a plurality of base waveforms. In another example, the first plurality of waveforms corresponds to a plurality of frequency subbands within a predetermined frequency band. In one embodiment, the predetermined frequency band is continuous in the frequency domain. For example, the predetermined band is a TV channel band. In another embodiment, the predetermined frequency band is divided into a plurality of groups of subbands, which is further divided into the plurality of frequency subbands. For example, the bandwidth of the predetermined frequency band is equal to the sum of the bandwidths for the plurality of groups of subbands. In another example, the bandwidth of the predetermined frequency band is equal to the sum of the bandwidths for the plurality of frequency subbands.

In another embodiment, any two of the first plurality of waveforms are substantially orthogonal to each other. In yet another embodiment, each of the first plurality of waveforms has an one-to-one correspondence with one frequency subband selected from the plurality of frequency subbands. In yet another embodiment, each of the first plurality of waveforms corresponds to a waveform frequency spectrum associated with a spectral amplitude as a function of frequency. For example, the spectral amplitude equals substantially zero outside the corresponding frequency subband, and equals substantially a constant number within the corresponding frequency subband. In yet another embodiment, the first plurality of waveforms includes at least a second plurality of waveforms and a third plurality of waveforms, and the plurality of groups of subbands includes at least a first group of subbands and a second group of subbands.

As shown in FIG. 39, the plurality of waveform generation and modulation components 3930 includes n waveform generation and modulation components, such as waveform generation and modulation components 3932, 3934, 3936, and 3938 respectively. n is a positive integer larger than 1. In one embodiment, the waveform generation and modulation component 3932 is configured to generate and modulate the first plurality of waveforms corresponding to the first group of subbands, and the waveform generation and modulation component 3934 is configured to generate and modulate the second plurality of waveforms corresponding to the second group of subbands.

According to certain embodiments of the present invention, each of the waveform generation and modulation components, such as the components 3932, 3934, 3936, and 3938, includes a digital waveform generation and modulation unit, a plurality of digital-to-analog converters coupled to the digital waveform generation and modulation unit, and a clock signal generator configured to provide a plurality of clock signals to the plurality of digital-to-analog converters respectively. For example, the plurality of clock signals includes at least a first clock signal and a second clock signal, which are offset from each other by a predetermined time period.

According to some embodiments of the present invention, each of the waveform generation and modulation components, such as the components 3932, 3934, 3936, and 3938, includes a digital waveform generation and modulation unit, a plurality of digital-to-analog converters coupled to the digital waveform generation and modulation unit, and a plurality of delay components coupled to the plurality of digital-to-analog converters respectively. For example, the plurality of digital-to-analog converters includes a first digital-to-analog converter for outputting a first analog signal and a second digital-to-analog converter for outputting a second analog signal. In another example, the plurality of delay components includes at least a first delay component configured to perform a first delay to the first analog signal and a second delay component configured to perform a second delay to the second analog signal. The first delay and the second delay are different in magnitude. In one embodiment, the plurality of delay components are digital logic gates. In another embodiment, the plurality of delay components are delay lines.

The combination component 3940 is configured to receive the modulated first plurality of waveforms and generate a combined waveform signal for the modulated first plurality of waveforms. The combined waveform signal is transmitted by the antenna 3950.

Figure 40:
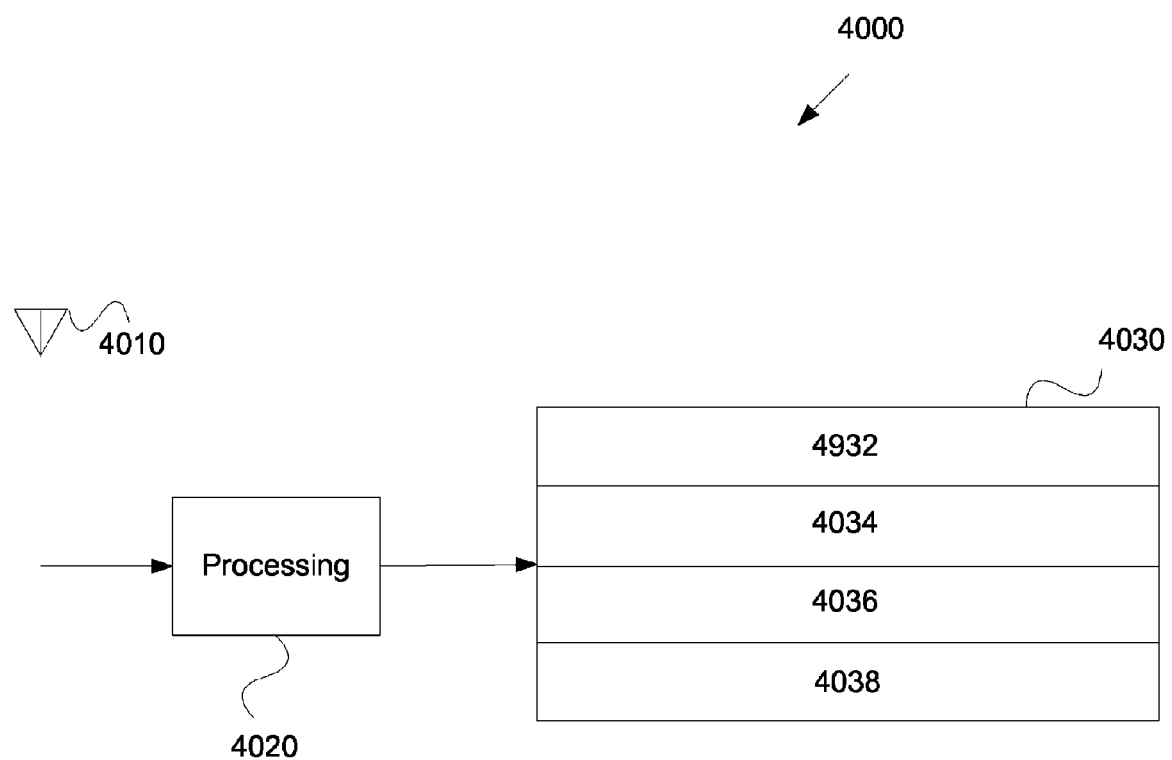
FIG. 40 is a simplified system for receiving data in a wireless network according to an embodiment of the present invention.

FIG. 40 is a simplified system for receiving data in a wireless network according to an embodiment of the present invention. This diagram is merely an example, which should not unduly limit the scope of the claims. One of ordinary skill in the art would recognize many variations, alternatives, and modifications. The system 4000 includes an antenna 4010, a processing component 4020, and a plurality of waveform generation and correlation components 4030. Although the above has been shown using a selected group of components for the system 4000, there can be many alternatives, modifications, and variations. For example, the plurality of waveform generation and correlation components 4030 is combined into or replaced by one waveform generation and correlation component. In another example, the system 4000 can perform the method 500. Other components may be inserted to those noted above. Depending upon the embodiment, the arrangement of components may be interchanged with others replaced. Further details of these components are found throughout the present specification and more particularly below.

The antenna 4010 is configured to receive a combined waveform, and is coupled to the processing component 4020. The processing component 4020 is configured to receive the combined waveform and generate a first plurality of modulated waveforms.

The plurality of waveform generation and correlation components 4030 is coupled to the processing component 4020 and configured to generate a second plurality of base waveforms and determine data carried by the first plurality of modulated waveforms based on at least information associated with the first plurality of modulated waveforms and the second plurality of base waveforms. For example, the second plurality of base waveforms corresponds to a plurality of frequency subbands respectively for a predetermined frequency band, and the predetermined frequency band is divided into a plurality of groups of subbands, which is further divided into the plurality of frequency subbands. In another example, the plurality of waveform generation and correlation components 4030 includes n waveform generation and correlation components, such as waveform generation and correlation components 4032, 4034, 4036, and 4038. n is a positive integer larger than 1.

In one embodiment, any two of the second plurality of base waveforms are substantially orthogonal to each other. In another embodiment, each of the second plurality of base waveforms corresponds to a waveform frequency spectrum associated with a spectral amplitude as a function of a frequency. In yet another embodiment, the spectral amplitude for the frequency spectrum equals substantially zero outside a frequency subband selected from the plurality of frequency subbands, and equals substantially a constant number within the frequency subband.

Figure 41:
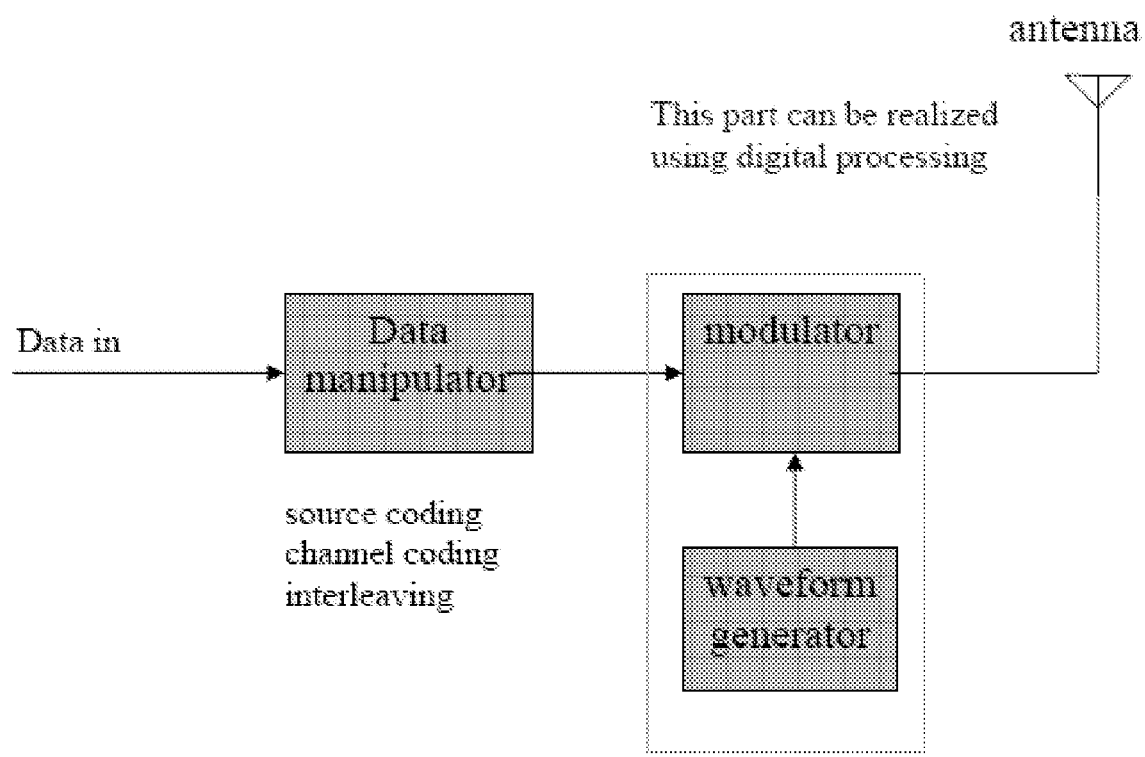
FIGS. 41 and 42 are simplified transmitter and receiver according to certain embodiments of the present invention.
Figure 42:
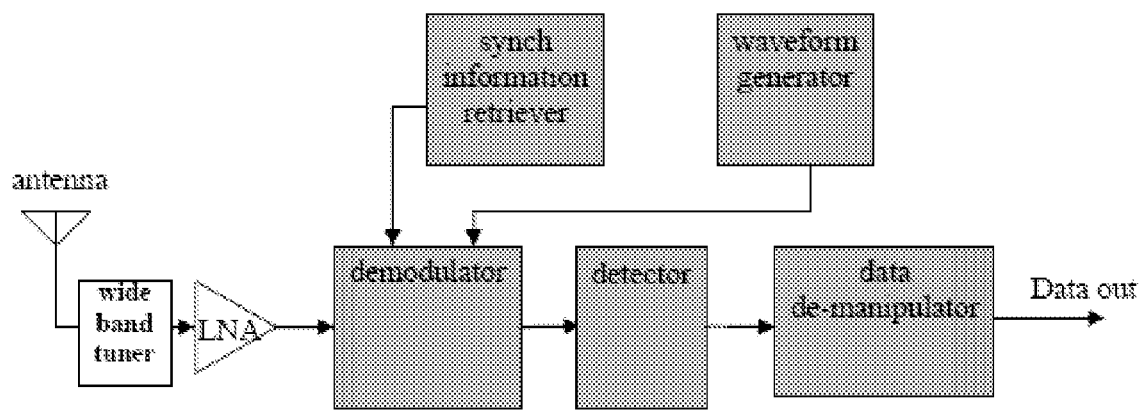

FIGS. 41 and 42 are simplified transmitter and receiver according to certain embodiments of the present invention. These diagrams are merely examples, which should not unduly limit the scope of the claims. One of ordinary skill in the art would recognize many variations, alternatives, and modifications.

According to some embodiments, the waveforms used have the following characteristics: regarding waveform shape, as explained in the above one main lobe and two side lobes of sinc function envelope waveforms are being used with durations which are inversely proportional to the bandwidth of subbands applied. As an example, for a bandwidth of a subband of 0.469 MHz, waveforms have duration of around 9 ns while their spectra are almost flat throughout the whole subbands.

To generate these waveforms, one can use digital methods by utilizing sample-and-hold function of ADCs and DACs. For certain embodiments, high sampling rates are needed. For example, around 100 Msamples/sec is needed in order to take 90 samples for 9-ns waveforms. In another example, these waveforms are generated in a digital way by using methods to make interleaved samples overlapped with various delays. These methods enable the waveforms to be generated with relatively lower sampling rate digital-to-analog converters (DACs) according to some embodiments.

In some embodiments, for the case that 90 samples are needed for each waveform, there are 16 waveforms per group for binary representation or 81 waveforms per group for ternary representation. Therefore, 1440 or 7290 sample information need to be stored in memory storage like read-only memory (ROM) per group. For example, 1.44 or 7.29 Kbytes ROM of memory storage is needed to store waveform information if 8 bits per sample is adopted for sample representation.

In certain embodiments, waveforms are generated using digital-to-analog converters (DACs) which have a sampling rate of 1 Msamples/sec. To achieve 100 Msamples/sec, various systems are used according to embodiments.

Figure 43:
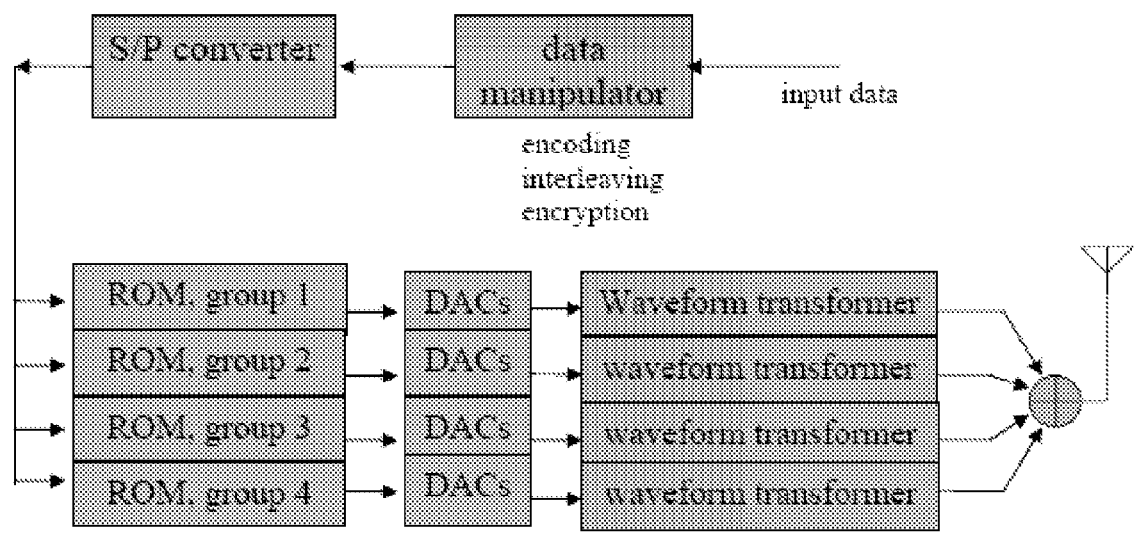
FIGS. 43 and 44 show simplified transmitter and receiver respectively according to embodiments of the present invention.
Figure 44:
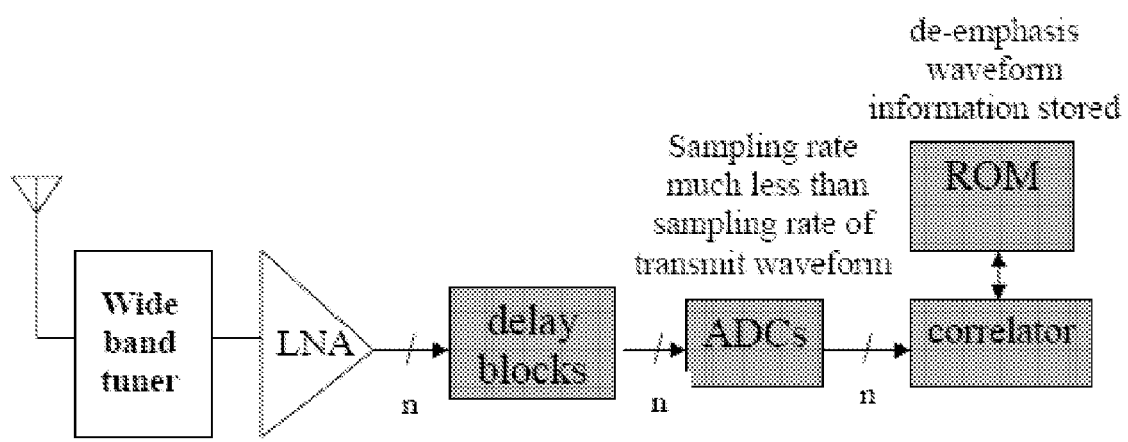

FIGS. 43 and 44 show simplified transmitter and receiver respectively according to embodiments of the present invention. These diagrams are merely examples, which should not unduly limit the scope of the claims. One of ordinary skill in the art would recognize many variations, alternatives, and modifications. As shown in FIGS. 43 and 44, multiple branches of DACs or ADCs are operated in parallel.

In FIG. 43, inputted data from the information source can be manipulated in the data manipulator by applying source encoding, channel encoding, interleaving, and/or encryption as needed. Then data in the stream from the output of the manipulator are serial-to-parallel converted to four ROMs as an example. Each symbol is inputted to one of four ROMs. Waveform information for one of four groups is sent from an ROM to a DAC. For example, the waveform information is converted into an analog signal corresponding to inputted symbols to the ROM. However, the DAC may have lower sampling rate than that for the transmitted waveform. Therefore multiple branches of DACs and waveform transformers are connected to each group in parallel. In a waveform transformer, the sampling rate for the transmitted waveform can be achieved with lower sampling rate of each DAC to generate the waveform to be transmitted. Therefore modulation is accomplished in the ROMs by manipulating waveforms as explained in the above. In one embodiment, the ROM includes a processing component and a memory component. For example, the memory component store information about one or more base waveforms, and the processing component can modulate the one or more base waveforms based on information received from the serial-to-parallel converter.

In FIG. 44, operations with the reverse order of those of the transmitter are performed to detect the information. At the receiver, the received signal is fed to multiple branches of delay blocks and ADCs. The output of ADCs are fed into ROM/correlator blocks. In a delay block, the received signal is delayed with a fixed amount of time for each branch, and is fed to an ADC which is operated at the lower sampling rate than the one of the transmitted waveforms. In the correlator, the sampled information from the ADCs is compared with information stored in ROM and the received information can be determined by such comparison.

Figure 45:
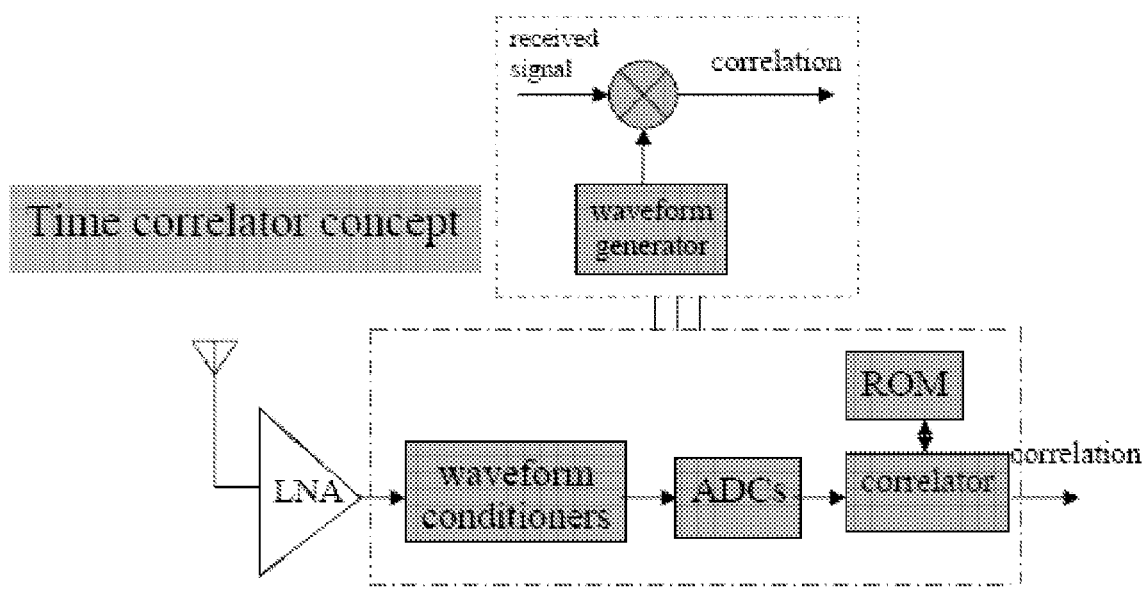
FIG. 45 is a simplified diagram showing a waveform conditioner for a receiver according to an embodiment of the present invention.

FIG. 45 is a simplified diagram showing a waveform conditioner for a receiver according to an embodiment of the present invention. This diagram is merely an example, which should not unduly limit the scope of the claims. One of ordinary skill in the art would recognize many variations, alternatives, and modifications.

A challenge is how to implement delay devices for the transmitter and the receiver as shown in FIGS. 43 and 44 respectively. According to certain embodiments, several implementation techniques can be used for waveform transformer/conditioner as follows. Waveform conditioner at the receiver can be implemented using similar techniques as used for waveform transformer. For example, only difference between these two is the reverse direction of signal flow.

Figure 46:
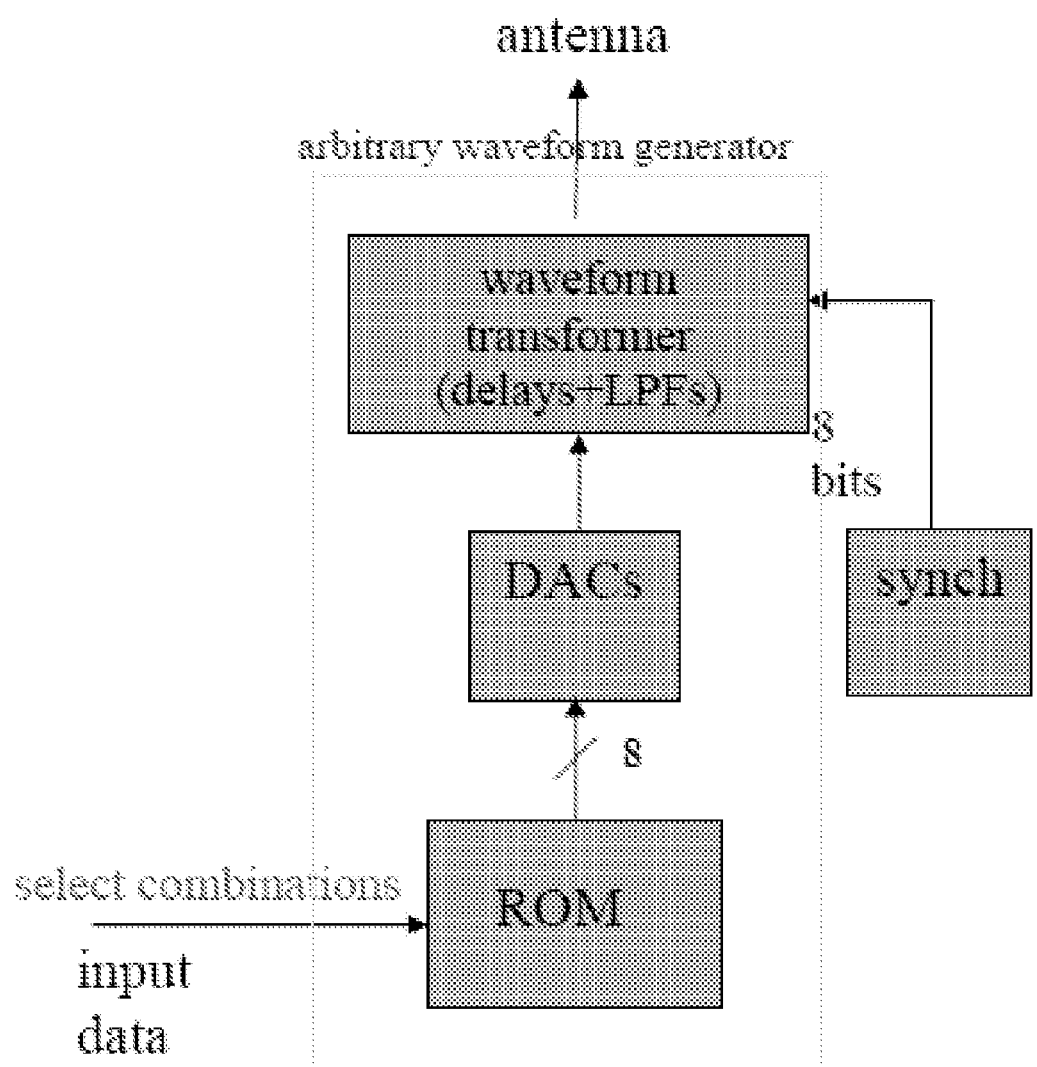
FIG. 46 is a simplified diagram showing waveform transformer/conditioner implementation using digital delays and low pass filters according to an embodiment of the present invention.

FIG. 46 is a simplified diagram showing waveform transformer/conditioner implementation using digital delays and low pass filters according to an embodiment of the present invention. This diagram is merely an example, which should not unduly limit the scope of the claims. One of ordinary skill in the art would recognize many variations, alternatives, and modifications. As shown in FIG. 46, the waveform transformer can be realized using delay locked loops (DLLs). For example, the waveform transformer includes DLLs and low pass filters (LPFs) as needed. In another example, each sample can be located appropriately for all samples to be shrunken in time to the extent that depends on cost, accuracy, and/or step size.

Figure 47:
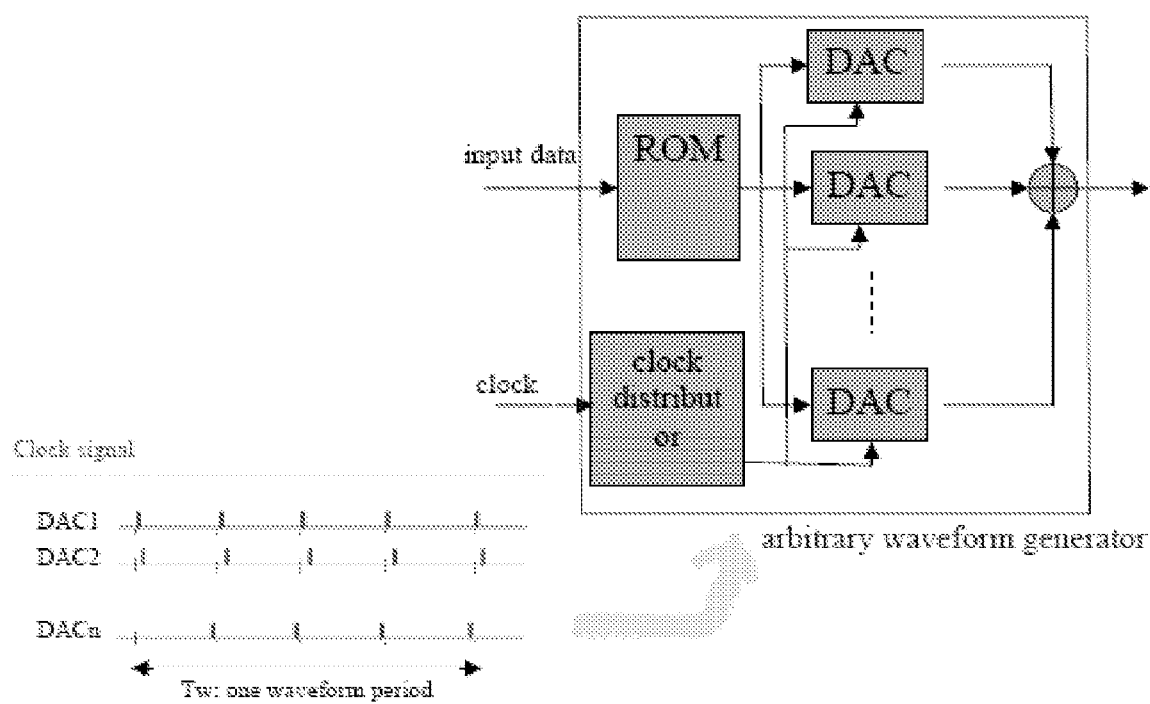
FIG. 47 is a simplified diagram showing waveform transformer/conditioner implementation using clock distributors according to another embodiment of the present invention.

FIG. 47 is a simplified diagram showing waveform transformer/conditioner implementation using clock distributors according to another embodiment of the present invention. This diagram is merely an example, which should not unduly limit the scope of the claims. One of ordinary skill in the art would recognize many variations, alternatives, and modifications. As shown in FIG. 47, different clock signals are used to make different samples be located appropriately at different locations in the time domain. For example, there is a bank of DACs with different enabling (clock) inputs. In one embodiment, for 100 samples/waveform, 25 DACs are needed for the signals of sampling rate of 1 Gsamples/sec to be realized with the rate of 40 Msamples/sec. In another embodiment, the clock distributor provides a clock synch signal to each DAC.

Figure 48:
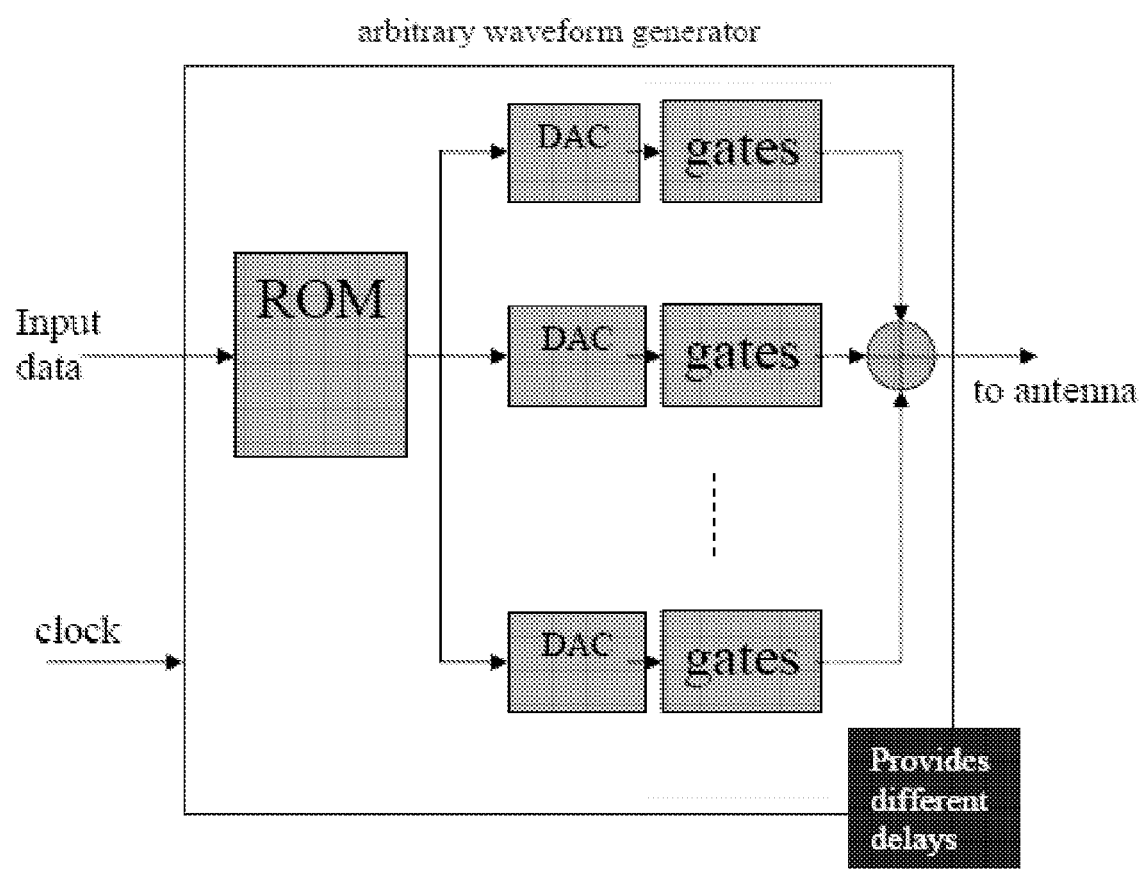
FIG. 48 is a simplified diagram showing waveform transformer/conditioner implementation using digital logic gates according to another embodiment of the present invention.

FIG. 48 is a simplified diagram showing waveform transformer/conditioner implementation using digital logic gates according to another embodiment of the present invention. This diagram is merely an example, which should not unduly limit the scope of the claims. One of ordinary skill in the art would recognize many variations, alternatives, and modifications. As shown in FIG. 48, logic gates are used so that different delays are applied to make samples be located appropriately at different locations in the time domain. For example, the implementation uses bank of different logic gates to provide different delays. In another example, each block of gates has different delay in this implementation.

Figure 49:
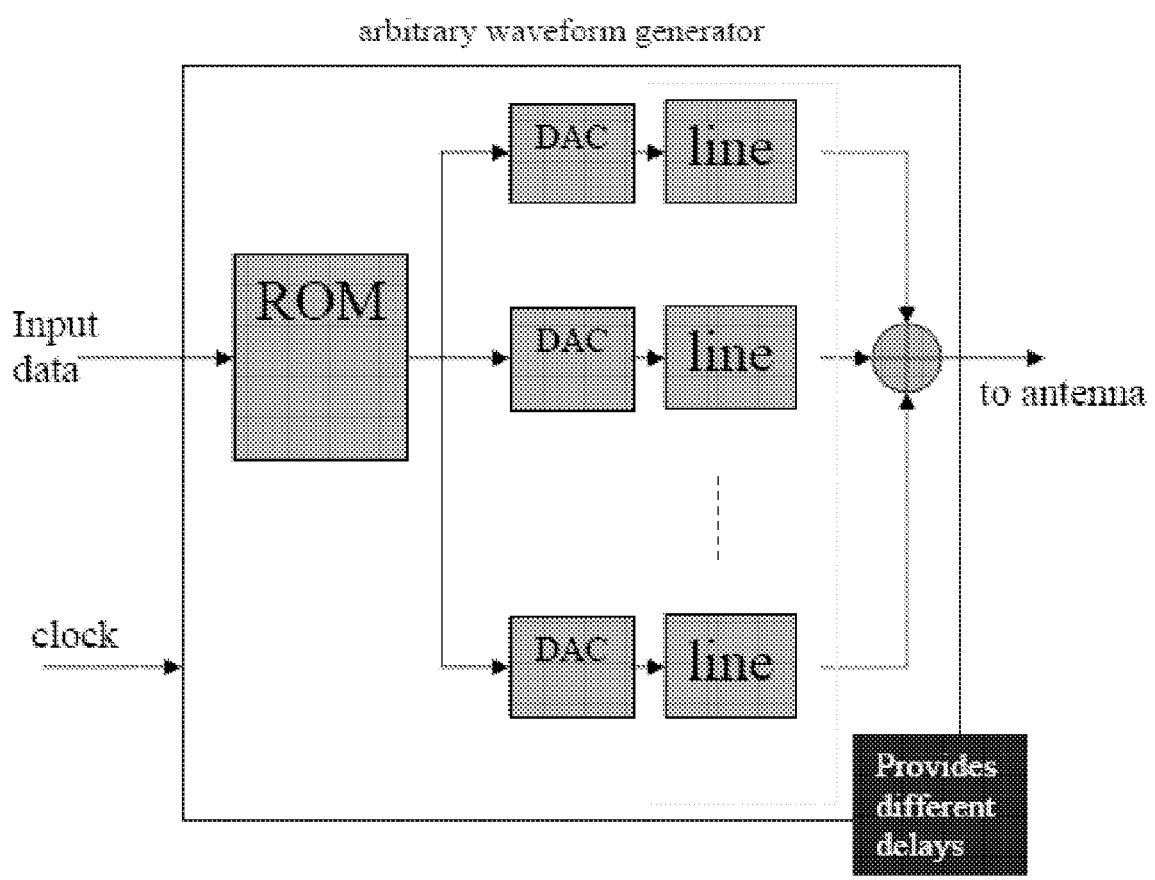
FIG. 49 is a simplified diagram showing waveform transformer/conditioner implementation using delay lines according to another embodiment of the present invention.

FIG. 49 is a simplified diagram showing waveform transformer/conditioner implementation using delay lines according to another embodiment of the present invention. This diagram is merely an example, which should not unduly limit the scope of the claims. One of ordinary skill in the art would recognize many variations, alternatives, and modifications. As shown in FIG. 49, delay lines are used so that different delays are applied to make samples be located appropriately at different locations in the time domain. For example, the implementation uses bank of delay lines to provide different delays. In another example, each block of gates has different delay in this implementation. The delay lines may be various transmission lines with various delays.

The present invention has various advantages additional to ones listed above. Certain embodiments can utilize more transmit power under frequency mask. For example, at least 3.8 dB more transmit power can be used by using full power under any frequency-power constraints with waveforms of some embodiments which can be adaptive to any frequency mask. Such implementation brings more spectrally efficient systems and more received signal power at the receiver. Hence, more chances can be given to intercept signals. Some embodiments of the present invention have very simple architecture. For example, a system architecture by which waveforms can be generated directly uses information stored in memory and process this information in digital methods through digital-to-analog converters (DACs) or analog-to-digital converters (ADCs). Such implementation does not need any analog devices (e.g., mixer, LO, and integrator in RF front end). In another example, the system can be implemented with low cost and low power consumption. Certain embodiments of the present invention can accomplish high out-of-band rejection. For example, waveforms used in some embodiments have steep out-of-band rejection. Since less guard band is needed for less interference to adjacent bands, more transmit power and effective bandwidth usage can be achieved. Thus high data rates also can be achieved. Some embodiments of the present invention can provide high adaptability to frequency, data rate, and/or transmit power requirements. For example, such adaptability enables high scalability in frequency, data rate, system configuration, and/or waveform.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for transmitting data in a wireless network, the method comprising:
generating a plurality of waveforms corresponding to a plurality of frequency subbands for a predetermined frequency band, the predetermined frequency band being divided into a plurality of groups of subbands, the plurality of groups of subbands being divided into the plurality of frequency subbands;
receiving a data signal;
processing information associated with the received data signal;
modulating the plurality of waveforms based on at least information associated with the received data signal;
transmitting the modulated plurality of waveforms;
wherein:
any two of the plurality of waveforms are substantially orthogonal to each other;
each of the plurality of waveforms corresponds to a waveform frequency spectrum associated with a spectral amplitude as a function of a frequency;
the spectral amplitude for the frequency spectrum equals substantially zero outside a frequency subband selected from the plurality of frequency subbands, and equals substantially a constant number within the frequency subband.

2. The method of claim 1 wherein:
the each of the plurality of waveforms corresponds to only the frequency subband;
the frequency subband corresponds to only the each of the plurality of waveforms.

3. The method of claim 1 wherein:
the predetermined frequency band corresponds to a first bandwidth;
each of the plurality of groups of subbands corresponds to a same second bandwidth;
each of the plurality of frequency subbands corresponds to a same third bandwidth.

4. The method of claim 3 wherein:
the first bandwidth is equal to the second bandwidth multiplied by the number of groups for the plurality of groups of subbands;
the first bandwidth is equal to the third bandwidth multiplied by the number of subbands for the plurality of frequency subbands.

5. The method of claim 1 wherein the predetermined band is a TV channelband.

6. The method of claim 1 wherein:
the generating a plurality of waveforms includes generating the each of the plurality of waveforms;
the generating the each of the plurality of waveforms includes:
  generating a first waveform in a time domain;
  modifying the first waveform in the time domain;
  determining a first frequency spectrum based on at least information associated with the modified first waveform;
  modifying the first frequency spectrum;
  determining a second waveform in the time domain based on at least information associated with the modified first frequency spectrum;
  modifying the second waveform in the time domain;
  determining a second frequency spectrum based on at least information associated with the modified second waveform;
  processing information associated with the second frequency spectrum;
  determining whether the second frequency spectrum satisfies one or more predetermined conditions.

7. The method of claim 6 wherein the generating the each of the plurality of waveforms further includes:
if the second frequency spectrum is determined not to satisfy the one or more predetermined conditions,
  modifying the second frequency spectrum;
  determining a third waveform in the time domain based on at least information associated with the modified second frequency spectrum;
  modifying the third waveform in the time domain;
  determining a third frequency spectrum based on at least information associated with the modified third waveform;
  processing information associated with the third frequency spectrum;
  determining whether the third frequency spectrum satisfies the one or more predetermined conditions.

8. The method of claim 6 wherein the generating the each of the plurality of waveforms further includes, if the second frequency spectrum is determined to satisfy the one or more predetermined conditions, determining that the second waveform is the each of the plurality of waveforms.

9. The method of claim 6 wherein:
the first frequency spectrum is associated with a first amplitude;
the modifying the first frequency spectrum includes:
  within the frequency subband, if the first amplitude is larger than a predetermined value, setting the first amplitude to the predetermined value;
  outside the frequency subband, if the first amplitude is larger than zero, setting the first amplitude to zero.

10. The method of claim 6 wherein:
the first waveform is associated with a second amplitude in the time domain;
the modifying the first waveform in the time domain includes, outside a predetermined time period, if the second amplitude is larger than zero in magnitude, setting the second amplitude to zero.

11. The method of claim 6 wherein:
the second waveform is associated with a third amplitude in the time domain;
the modifying the second waveform in the time domain includes, outside a predetermined time period, if the third amplitude is larger than zero in magnitude, setting the third amplitude to zero.

12. The method of claim 6 wherein:
the second frequency spectrum is associated with a fourth amplitude in the frequency domain;
the determining whether the second frequency spectrum satisfies one or more predetermined conditions includes, if the fourth amplitude is substantially equal to or smaller than a predetermined value within the frequency subband and if the fourth amplitude is substantially equal to zero in magnitude outside the frequency subband, determining the second frequency spectrum satisfies the one or more predetermined conditions.

13. The method of claim 1 wherein the modulating the plurality of waveforms includes modulating each of the plurality of waveforms based on at least one selected from a group consisting of an OOK scheme, an antipodal BPSK scheme, an OOK and antipodal BPSK scheme, and an n-level modulation and nQAM scheme.

14. The method of claim 1 wherein:
the data signal includes at least a first plurality of data from a first user and a second plurality of data from a second user;
transmitting the modulated plurality of waveforms includes transmitting, in parallel, the first plurality of data from the first user and the second plurality of data from the second user.

15. The method of claim 14 wherein the transmitting, in parallel, the first plurality of data from the first user and the second plurality of data from the second user includes:
transmitting, in parallel, the first plurality of data from the first user using at least in part each of the plurality of groups of subbands;
transmitting, in parallel, the second plurality of data from the second user using at least in part each of the plurality of groups of subbands.

16. The method of claim 14 wherein the transmitting, in parallel, the first plurality of data from the first user and the second plurality of data from the second user includes:
transmitting, in parallel, the first plurality of data from the first user using a first group only selected from the plurality of groups of subbands;
transmitting, in parallel, the second plurality of data from the second user using a second group only selected from the plurality of groups of subbands;
the first group and the second group are different.

17. The method of claim 1 wherein:
the data signal includes a plurality of data from a user and does not include any date from any other user;
transmitting the modulated plurality of waveforms includes transmitting, in parallel, the plurality of data from the user using all groups of the plurality of groups of subbands.

18. A system for transmitting data in a wireless network, the system comprising:
a data processing component configured to receive a data signal;
a serial-to-parallel converter coupled to the data processing component;
a plurality of waveform generation and modulation components coupled to the serial-to-parallel converter and configured to generate a first plurality of waveforms and modulate the first plurality of waveforms based on at least information associated with the data signal, the first plurality of waveforms corresponding to a first plurality of frequency subbands for a predetermined band, the predetermined band being divided into a plurality of groups of subbands, the plurality of groups of subbands being divided into the first plurality of frequency subbands;
a combination component configured to receive the modulated first plurality of waveforms and generate a combined waveform signal based on at least information associated with the modulated first plurality of waveforms;
an antenna configured to transmit the combined waveform;

wherein:
any two of the first plurality of waveforms are substantially orthogonal to each other;
each of the first plurality of waveforms corresponds to a waveform frequency spectrum associated with a spectral amplitude as a function of a frequency;
the spectral amplitude for the frequency spectrum equals substantially zero outside a frequency subband selected from the plurality of frequency subbands, and equals substantially a constant number within the frequency subband.

19. The system of claim 18 wherein:
the first plurality of waveforms includes at least a second plurality of waveforms and a third plurality of waveforms;
the plurality of groups of subbands includes at least a first group of subbands and a second group of subbands;
a plurality of waveform generation and modulation components includes at least a first waveform generation and modulation component and a second waveform generation and modulation component;
the first waveform generation and modulation component is configured to generate and modulate the first plurality of waveforms corresponding to the first group of subbands;
the second waveform generation and modulation component is configured to generate and modulate the second plurality of waveforms corresponding to the second group of subbands.

20. The system of claim 19 wherein the first waveform generation and modulation component comprises:
a digital waveform generation and modulation unit;
a plurality of digital-to-analog converters coupled to the digital waveform generation and modulation unit;
a clock signal generator configured to provide a plurality of clock signals to the plurality of digital-to-analog converters respectively;
wherein:
the plurality of clock signals includes at least a first clock signal and a second clock signal
the first clock signal and the second clock signal are offset from each other by a predetermined time period.

21. The system of claim 19 wherein the first waveform generation and modulation component comprises:
a digital waveform generation and modulation unit;
a plurality of digital-to-analog converters coupled to the digital waveform generation and modulation unit;
a plurality of delay components coupled to the plurality of digital-to-analog converters respectively;
wherein:
the plurality of digital-to-analog converters includes a first digital-to-analog converter for outputting a first analog signal and a second digital-to-analog converter for outputting a second analog signal;
the plurality of delay components includes at least a first delay component configured to perform a first delay to the first analog signal and a second delay component configured to perform a second delay to the second analog signal;
the first delay and the second delay are different in magnitude.

22. The system of claim 21 wherein the plurality of delay components are digital logic gates.

23. The system of claim 21 wherein the plurality of delay components are delay lines.

24. A method for receiving data in a wireless network, the method comprising:
receiving a signal including a first plurality of modulated waveforms, the first plurality of modulated waveforms corresponding to a plurality of frequency subbands respectively for a predetermined frequency band, the predetermined frequency band being divided into a plurality of groups of subbands, the plurality of groups of subbands being divided into the plurality of frequency subbands;
generating a second plurality of base waveforms corresponding to the plurality of frequency subbands respectively;
processing information associated with the first plurality of modulated waveforms and the second plurality of base waveforms;
determining data carried by the first plurality of modulated waveforms based on at least information associated with the first plurality of modulated waveforms and the second plurality of base waveforms;
wherein:
any two of the second plurality of base waveforms are substantially orthogonal to each other;
each of the second plurality of base waveforms corresponds to a waveform frequency spectrum associated with a spectral amplitude as a function of a frequency;
the spectral amplitude for the frequency spectrum equals substantially zero outside a frequency subband selected from the plurality of frequency subbands, and equals substantially a constant number within the frequency subband.

25. A system for receiving data in a wireless network, the system comprising:
an antenna configured to receive a combined waveform;
a processing component configured to receive the combined waveform and generate a first plurality of modulated waveforms;
a plurality of waveform generation and correlation components coupled to the processing component and configured to generate a second plurality of base waveforms and determine data carried by the first plurality of modulated waveforms based on at least information associated with the first plurality of modulated waveforms and the second plurality of base waveforms, the second plurality of base waveforms corresponding to a plurality of frequency subbands respectively for a predetermined frequency band, the predetermined frequency band being divided into a plurality of groups of subbands, the plurality of groups of subbands being divided into the plurality of frequency subbands;
wherein:
any two of the second plurality of base waveforms are substantially orthogonal to each other;
each of the second plurality of base waveforms corresponds to a waveform frequency spectrum associated with a spectral amplitude as a function of a frequency;
the spectral amplitude for the frequency spectrum equals substantially zero outside a frequency subband selected from the plurality of frequency subbands, and equals substantially a constant number within the frequency subband.

* * * * *